(12) United States Patent
Mazzeo et al.

(10) Patent No.: US 12,000,796 B2
(45) Date of Patent: Jun. 4, 2024

(54) CONTACT ELEMENTS FOR ACOUSTIC EXCITATION

(71) Applicant: Brigham Young University (BYU), Provo, UT (US)

(72) Inventors: Brian A. Mazzeo, Provo, UT (US); William Spencer Guthrie, Provo, UT (US)

(73) Assignee: Brigham Young University (BYU), Provo, UT (US)

( * ) Notice: Subject to any disclaimer, the term of this patent is extended or adjusted under 35 U.S.C. 154(b) by 0 days.

(21) Appl. No.: 17/817,240

(22) Filed: Aug. 3, 2022

(65) Prior Publication Data

US 2022/0381742 A1 Dec. 1, 2022

Related U.S. Application Data

(63) Continuation of application No. 16/488,530, filed as application No. PCT/US2018/019785 on Feb. 26, 2018, now Pat. No. 11,408,858.

(60) Provisional application No. 62/463,314, filed on Feb. 24, 2017.

(51) Int. Cl.
*G01N 29/04* (2006.01)
*G01N 29/24* (2006.01)
*G01N 29/34* (2006.01)

(52) U.S. Cl.
CPC ....... *G01N 29/045* (2013.01); *G01N 29/2493* (2013.01); *G01N 29/34* (2013.01); *G01N 2291/0258* (2013.01); *G01N 2291/0427* (2013.01)

(58) Field of Classification Search
CPC .. G01N 29/045; G01N 29/2493; G01N 29/34; G01N 2291/0258; G01N 2291/0427
USPC ............................................................ 73/594
See application file for complete search history.

(56) References Cited

U.S. PATENT DOCUMENTS

| | | | | |
|---|---|---|---|---|
| 907,104 | A * | 12/1908 | Brower | B60R 16/06 361/219 |
| 2,561,910 | A | 7/1951 | Coffey | |
| 3,361,225 | A | 1/1968 | Nichols | |
| 3,541,840 | A | 11/1970 | Phelan | |
| 4,202,216 | A | 5/1980 | Bull et al. | |
| 6,581,466 | B1 | 6/2003 | Costley et al. | |
| 8,671,760 | B2 | 3/2014 | Wallrath et al. | |
| 2015/0330876 | A1 | 11/2015 | Buhac | |
| 2016/0011088 | A1 | 1/2016 | Guthrie et al. | |
| 2016/0070026 | A1 | 3/2016 | Löffler-Mang et al. | |
| 2017/0292936 | A1* | 10/2017 | Bjerke | G01N 29/043 |

OTHER PUBLICATIONS

International Search Report and Written Opinion for International Application No. PCT/US2018/019785, mailed on May 16, 2018, 9 pages.

* cited by examiner

*Primary Examiner* — Lisa M Caputo
*Assistant Examiner* — Rose M Miller
(74) *Attorney, Agent, or Firm* — Brake Hughes Bellermann LLP

(57) ABSTRACT

A system includes: an acoustic exciter, a compliant material applied to the acoustic exciter to configure the acoustic exciter for triggering acoustic excitation of at least part of a substrate; a sensor configured to receive an acoustic response of the acoustic excitation; and circuitry configured to determine at least one characteristic of the substrate using the acoustic response.

18 Claims, 52 Drawing Sheets

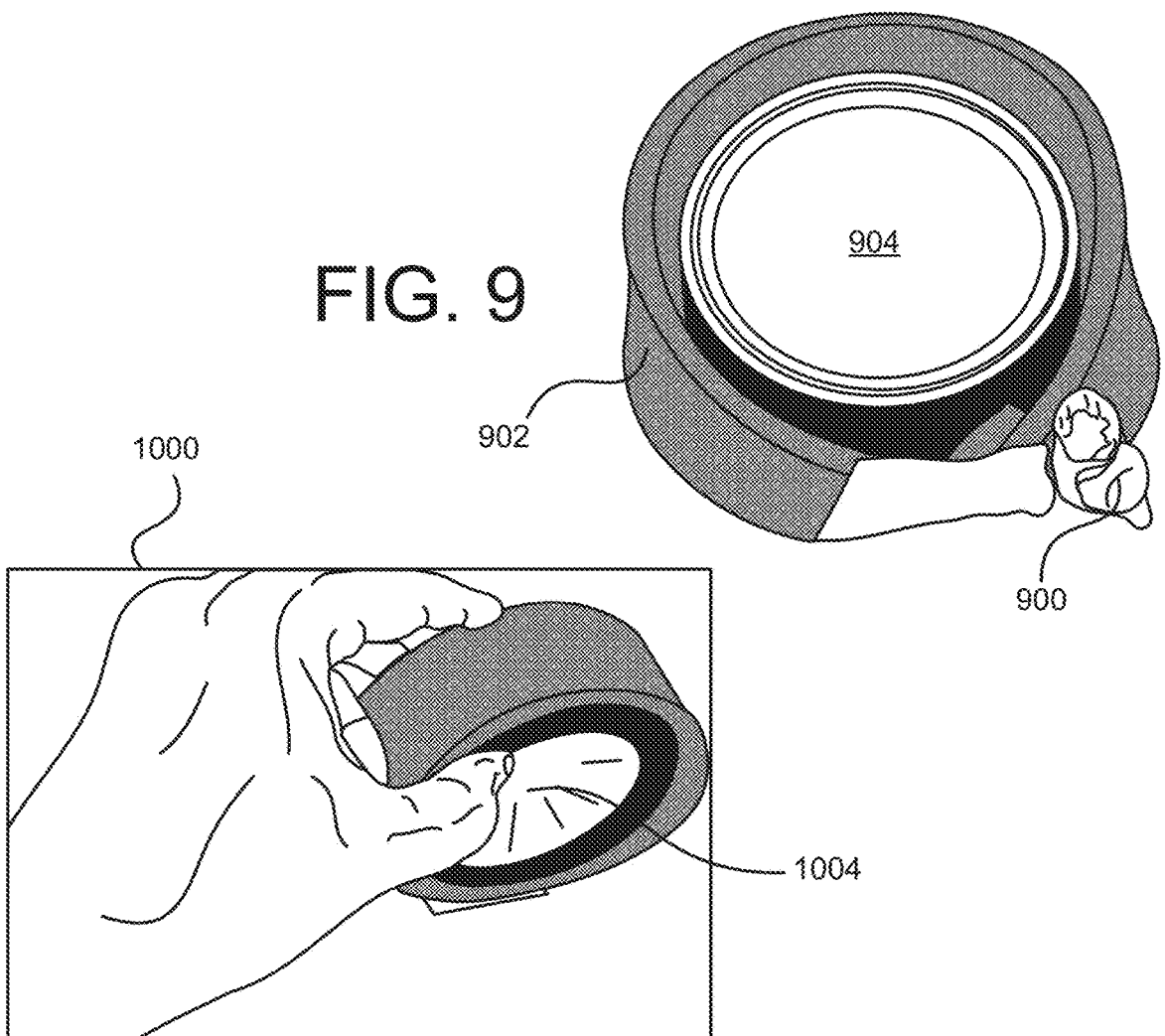
FIG. 9
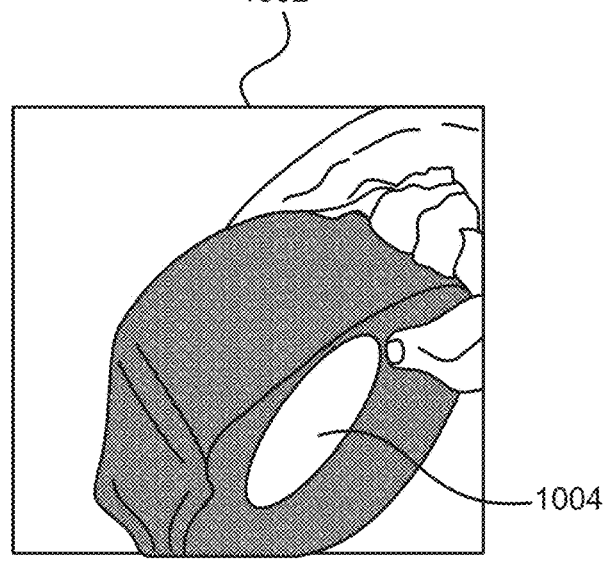
FIG. 10A
FIG. 10B

FIG. 29A
FIG. 29B
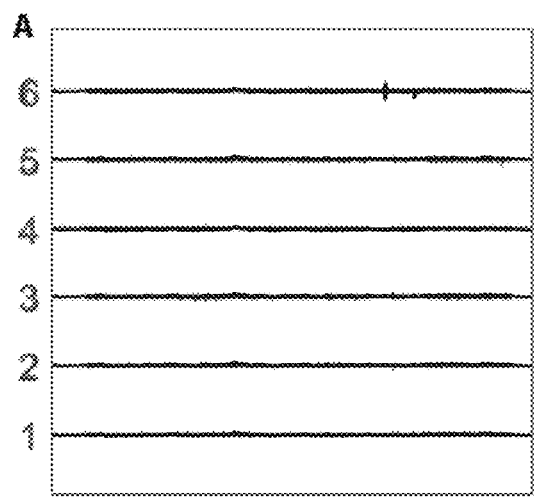
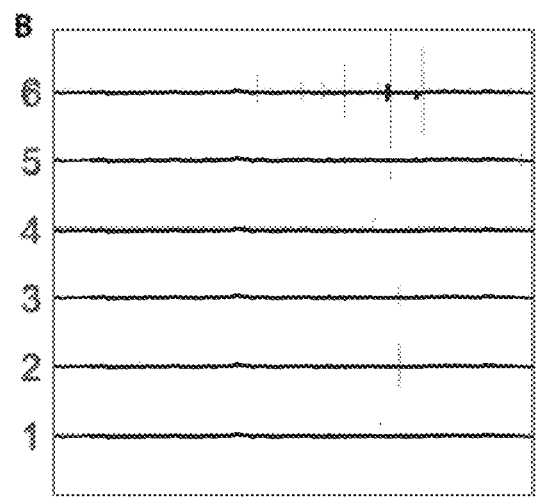
FIG. 29C
FIG. 29D
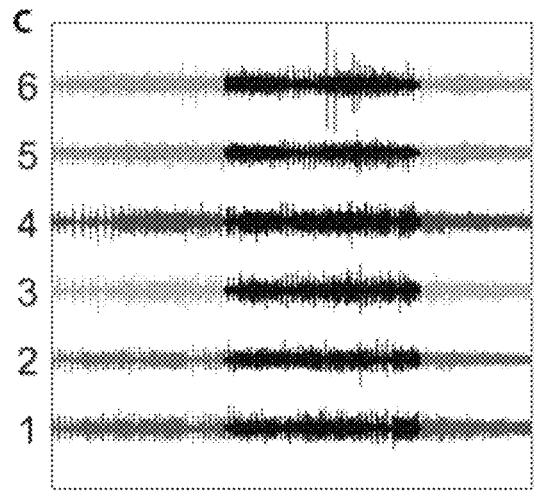
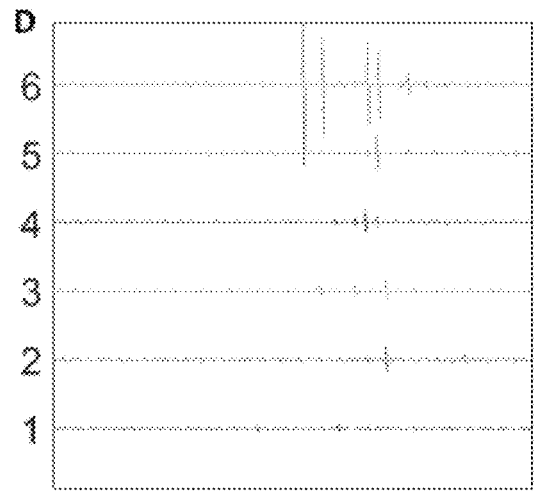

```
Time:1475602686.755998
b'LiDAR:290\r\n'
b'LiDAR:311\r\n'
b'LiDAR:291\r\n'
Time:1475602686.771999
b'LiDAR:301\r\n'
b'LiDAR:299\r\n'
b'LiDAR:310\r\n'
b'LiDAR:291\r\n'
b'LiDAR:283\r\n'
b'LiDAR:282\r\n'
b'LiDAR:275\r\n'
Time:1475602686.803000
b'LiDAR:257\r\n'
b'LiDAR:264\r\n'
b'LiDAR:275\r\n'
b'LiDAR:293\r\n'
Time:1475602686.819001
Start audio recording: 11
Time:1475602686.820001
F:11 N:1 1757385.685048 1757385.706000 1475602686.833002
F:11 N:2 1757385.694048 1757385.715000 1475602686.843003
F:11 N:3 1757385.704048 1757385.725000 1475602686.853003
F:11 N:4 1757385.714048 1757385.735000 1475602686.862004
b'LiDAR:311\r\n'
b'LiDAR:304\r\n'
b'LiDAR:286\r\n'
b'LiDAR:548\r\n'
b'LiDAR:566\r\n'
b'LiDAR:565\r\n'
b'LiDAR:537\r\n'
b'LiDAR:566\r\n'
Time:1475602686.865004
F:11 N:5 1757385.725048 1757385.746000 1475602686.873004
F:11 N:6 1757385.734048 1757385.755000 1475602686.883005
F:11 N:7 1757385.744048 1757385.765000 1475602686.893006
F:11 N:8 1757385.755048 1757385.776000 1475602686.903006
b'LiDAR:244\r\n'
b'LiDAR:235\r\n'
b'LiDAR:279\r\n'
b'LiDAR:249\r\n'
b'LiDAR:220\r\n'
b'LiDAR:233\r\n'
b'LiDAR:234\r\n'
b'LiDAR:249\r\n'
b'LiDAR:252\r\n'
b'LiDAR:242\r\n'
Time:1475602686.912007
F:11 N:9 1757385.764048 1757385.785000 1475602686.912007
F:11 N:10 1757385.774048 1757385.795000 1475602686.922007
b'$GPRMC,173805.30,A,4016.01074,N,11140.28229,W,20.467,186.97,041016,,,D*41\r\n'
b'$GPVTG,186.97,T,,M,20.467,N,37.906,K,D*35\r\n'
b'$GPGGA,173805.30,4016.01074,N,11140.28229,W,2,12,0.81,1428.7,M,-18.8,M,,0138*55\r\n'
b'$GPGSA,A,3,02,12,06,46,51,48,25,05,29,31,20,21,1.44,0.81,1.19*04\r\n'
b'$GPGSV,4,1,14,02,52,049,53,05,57,134,55,06,15,058,45,09,02,040,*77\r\n'
b'$GPGSV,4,2,14,12,58,188,56,19,02,104,,20,22,194,51,21,07,247,38*7D\r\n'
b'$GPGSV,4,3,14,25,61,277,54,29,41,306,53,31,09,311,39,46,41,159,49*70\r\n'
b'$GPGSV,4,4,14,48,39,211,53,51,43,173,54*79\r\n'
b'$GPGLL,4016.01074,N,11140.28229,W,173805.30,A,D*72\r\n'
Time:1475602686.928008
F:11 N:11 1757385.785048 1757385.806000 1475602686.933008
b'LiDAR:258\r\n'
b'LiDAR:217\r\n'
b'LiDAR:300\r\n'
b'LiDAR:291\r\n'
```

CONTACT ELEMENTS FOR ACOUSTIC EXCITATION

CROSS-REFERENCE TO RELATED APPLICATIONS

This application is a continuation of, and claims priority to, U.S. patent application Ser. No. 16/488,530 filed on Aug. 23, 2019, entitled "CONTACT ELEMENTS FOR ACOUSTIC EXCITATION ATTACHED VIA A COMPLIANT MATERIAL," which is a 35 U.S.C. § 371 National Phase Entry Application from PCT Application No. PCT/US2018/019785, filed on Feb. 26, 2018, entitled "CONTACT ELEMENTS FOR ACOUSTIC EXCITATION ATTACHED VIA A COMPLIANT MATERIAL", and designating the U.S., which claims the benefit of the filing date of U.S. Provisional Patent Application No. 62/463,314, filed on Feb. 24, 2017, entitled "CONTACT ELEMENTS FOR ACOUSTIC EXCITATION ATTACHED VIA A COMPLIANT MATERIAL", the disclosures of which are incorporated herein by reference in their entireties.

TECHNICAL FIELD

This document relates, generally, to contact elements for acoustic excitation attached via a compliant material.

BACKGROUND

Preservation and rehabilitation of aging infrastructure are some of the most pressing and expensive global challenges in the modern world. While solutions to this challenge have a political dimension, scientifically-validated assessment tools are needed to prioritize and program infrastructure projects, especially in an era of reduced budgets. Bridges are critical components in national and local transportation networks, and, of all the components of a bridge, the bridge deck deteriorates fastest due to repeated mechanical loading and exposure to corrosive elements. However, evaluation and rehabilitation of bridge decks is particularly challenging because bridge decks are often under traffic, access is limited, and expensive, disruptive traffic control is often necessary. In current practice, visual inspection is the only type of bridge evaluation that is performed routinely.

SUMMARY

In a first aspect, a system includes: an acoustic exciter; a compliant material applied to the acoustic exciter to configure the acoustic exciter for triggering acoustic excitation of at least part of a substrate; a sensor configured to receive an acoustic response of the acoustic excitation; and circuitry configured to determine at least one characteristic of the substrate using the acoustic response.

Implementations can include any or all of the following features. The acoustic exciter includes a contact element configured for triggering the acoustic excitation. The system includes multiple contact elements, the contact elements individually movable relative to the compliant material. At least some of the contact elements are chain links. The contact element is spherical. The compliant material includes a spring in contact with the contact element. The compliant material includes an adhesive material in contact with the contact element. The system further comprises a mesh that constrains the contact element against the compliant material. The system further comprises a wheel that includes at least part of the compliant material, the acoustic exciter positioned on a perimeter of the wheel. The system includes multiple acoustic exciters, and the acoustic exciters form a circumferential band on the perimeter of the wheel. The system further comprises cross ties to which the circumferential band is coupled. The system further comprises an active source configured to drive the wheel. The system further comprises a movable subsystem that includes at least the acoustic exciter and the compliant material, the movable subsystem configured to facilitate placement of the acoustic exciter in and out of contact with the substrate. The system includes multiple acoustic exciters and multiple sensors, wherein the circuitry is configured for multi-channel registration of respective acoustic responses received by the multiple sensors. The system further comprises a location detector, wherein the circuitry is further configured to identify the substrate using input from the location detector. The sensor includes a microphone.

In a second aspect, an apparatus includes: a wheel including a compliant material; and one or more circumferential bands of acoustic exciters positioned around a periphery of the wheel, wherein the compliant material configures the acoustic exciters for triggering acoustic excitation of at least part of a substrate.

Implementations can include any or all of the following features. The apparatus further comprises an active source configured to drive the wheel. The wheel includes a peripheral surface that has an approximately circular cross section, and wherein the at least one circumferential band is positioned around the peripheral surface. The apparatus further comprises cross ties traversing the peripheral surface, the acoustic exciters coupled to the cross ties. The apparatus includes at least two circumferential bands of the acoustic exciters positioned adjacent respective edges of the peripheral surface.

In a third aspect, a system includes: means for triggering acoustic excitation of at least part of a substrate; a compliant material applied to the means; and a sensor configured to receive an acoustic response of the acoustic excitation.

BRIEF DESCRIPTION OF DRAWINGS

FIG. 9 shows an example of a contact element on a compliant material wrapped around a rotatable object.

FIGS. 10A-B show examples of a rotatable object with a compliant layer with a hard contact element.

FIGS. 29A-D show examples of acoustic record and signal processing results.

FIG. 39J shows a snapshot of a log file.

DETAILED DESCRIPTION

Figure 1:
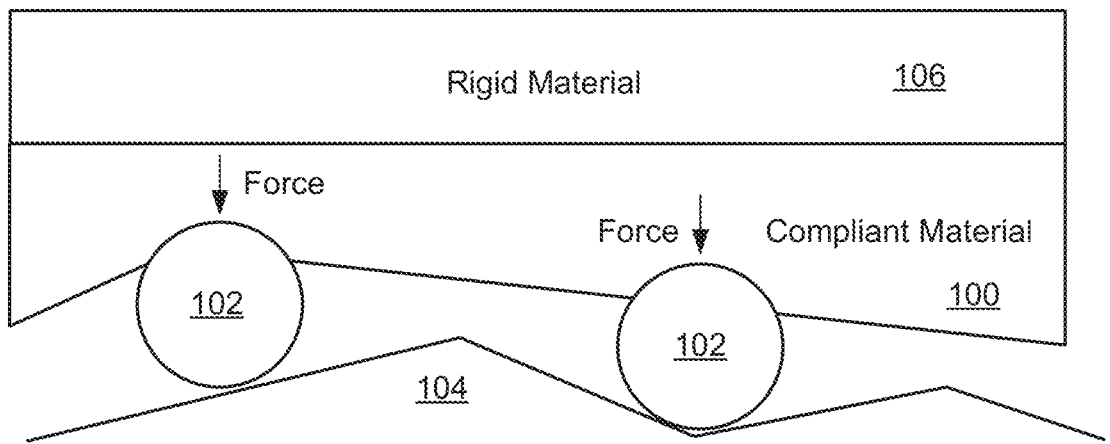
FIG. 1 shows an example of a compliant material holding materials against a surface.

The present disclosure relates to one or more acoustic exciters that acoustically excite a substrate, the acoustic exciter(s) attached via a compliant material. The present subject matter can make use of an ability to automatically perform data analysis of an acoustic response from a material to determine one or more characteristics of the material. In some implementations, it can be determined whether the material has subsurface cracking. For example, this can indicate that a delamination is present in the material.

In some implementations, detection and analysis of acoustic responses can be made that would allow inspections to proceed at speeds faster than the walking/slow driving speeds at which most acoustic inspections take place and which require substantial traffic control. For example, a new contact element coupling scheme can be used for interrogation of bridge decks to map delaminations while traveling at, for example, highway speeds such as 30 km/h, 55 km/h, 105 km/h, or 130 km/h. Other speeds can be used.

A more rapid and continuous excitation of a tested material can be provided. In some implementations, such speed can be due to a configuration of impactors mounted to a compliant material. Rebounding of an impactor can affect an effectiveness of the acoustic measurement. In some implementations, an effort is made to prevent an impactor from rebounding from the interrogated surface, or to minimize or reduce the occurrence of rebounding. For example, a compliant material applied to the impactor or acoustic exciter can allow the impactor/exciter to independently resonate without being too rigidly constrained. In some implementations, an acoustic exciter attached via a compliant material can generate the same or similar impact responses at higher speed as would an impactor without a compliant material at a lower speed. Another advantage can be that an acoustic exciter can allow or improve the use of the system on a rough or uneven surface. For example, surface irregularities of one or several centimeters can occur, such as in the occurrence of a pothole in the surface of a bridge deck.

Considering the many defects that occur within bridge decks, internal cracking known as delamination is a serious defect. In regions that experience routine application of deicing salts and in coastal regions, chlorides accumulate around the reinforcing steel in the bridge deck, causing rust. As the steel rusts, it expands, producing internal cracks within the concrete. Eventually the concrete spalls, and a pothole is formed. Significant rehabilitation is then necessary to restore reinforced concrete that has reached this advanced stage of deterioration. However, the earlier that detection of defects occurs, the more cost-effective and life-extending the rehabilitation of the bridge deck can be.

Beyond visual inspection, there are many different inspection technologies for inspection of bridges, but using them at normal traffic speeds is not possible. The implementations described herein have advantages over, for example, chain dragging and hammer sounding that can be used to characterize bridge decks and plan repairs. These manual sounding methods are extremely labor extensive and subjective, and they have safety risks inherent to the tasks. However, verification of high-speed techniques such as infrared thermography and ground penetrating radar often involves chain-dragging surveys for calibration and validation. Despite their prevalence in the industry, after decades of research, automated versions of sounding techniques still progress at slow speeds, requiring the use of traffic control.

For example, long chains that are suspended from one or both ends have substantial horizontal and vertical freedom that can cause collisions with the acoustic response measurement apparatus. While contact vibrational sensors could be used, they would require physical coupling to the interrogated material, which can be challenging to maintain at high speeds. Other methods, such as vibrometry using lasers, have complicated optics and are difficult to stabilize at high speeds.

As a particular example, the standard ASTM D4580 indicates that there are three main procedures, A, B, and C, which can be used to map delaminations in a bridge deck. According to the ASTM standard and inspection literature, in general, all of the interrogation elements include hard objects coupled to hard objects that either strike or are dragged across a surface. These hard elements generally consist of chain links or rods or other steel devices. These approaches can suffer from the above limitations and/or other shortcomings.

Applications of examples described herein are not limited to bridge decks. Any concrete or other material made of homogenous or heterogeneous materials with the propensity to crack or disband, such as parking structures, roofs, dams, runways, etc. are within the scope of possible applications. For example, concrete roadways may have some reinforcing elements, and this technique would be particularly useful for monitoring potentially long sections (many miles) of these types of roadways. Additionally, the implementations described herein can be used to detect the degree of disbondment of overlays, such as epoxy or microsilica overlays, that are applied to concrete bridge decks.

Examples described herein illustrate that having a compliant material can substantially constrain the movement of contact elements when they are being dragged or rotated across a surface in such a way as to increase the number and frequency of contacts and to reduce the time that contact elements may depart substantially from the surface. These elements can have contact times and forces that are generated stochastically by the interaction of the contact element (dependent on its stiffness with the compliant material attached) and the surface to be interrogated, which appears advantageous in exciting flexural modes associated with defects. In practice, when multiple elements are involved, the individual contacts and their responses may not be easily resolved in the acoustic record because so many acoustic elements interact with the surface substantially simultaneously so that the responses combine in such a way that resolving individual contact events in the acoustic record resulting from these multiple interactions can be difficult.

FIG. 1 shows an example of a compliant material 100 holding materials 102 against a surface 104. The materials 102 can serve for triggering acoustic excitation of the surface 104. The materials 102 can be made from a hard material, including, but not limited to, a metal. The materials 102 can be spherical or cylindrical, to name just two examples. The compliant material 100 can be attached to or supported by a rigid material 106 including, but not limited to, metal, wood, or a synthetic material. The compliant material 100 provides a restoring force to keep the materials 102 in place against the surface 104. The compliant material 100 may also or instead provide lateral forces to keep the distance between the materials 102 relatively constant.

The compliant material 100, optionally attached to a harder material (e.g., the rigid material 106) can confine the materials 102 in their position through spring-like restoration forces (due to elasticity of the compliant material) and also permit the materials 102 some movement when other forces are applied, but less movement than if the materials were unconstrained. This is particularly important for keeping objects in contact with the surface 104. The compliant material 100 can include, but is not limited to, a synthetic material (e.g., a polymer), an organic material, or a fabric. The material can allow (due to flexing) relative motion of one or more exciters with elastic deformation. A compliant material needs to be able to reliably return to its original position/state in order to provide continuing service over thousands of impacts. Materials could include strings, rubber webbing, woven or nonwoven materials with elastic properties, to name just a few examples. The exciter(s) could be held by viscous forces such that the damping would be higher, as in the case of embedding the acoustic exciting elements in a gel or other semi-solid. The compliant materials can include a sheet (e.g., a membrane) and/or it can include a linear element, to name just two examples. For example, the exciter(s) can be mounted to or embedded in a compliant membrane. The compliant material 100 may include discrete components (as in the case of springs or a suspension of a car—for example, the shocks and struts) or it may include a material, such as a sheet of rubber or foam (generally below a Young's modulus of ~10 GPa) as might be used to hold delicate instruments in a protective case. For example, the compliant material 100 can include compressible foam, steel wool, and/or polymers (e.g., rubber). As is envisioned in the present disclosure, having a compliant mechanism including a material that holds harder contact elements (here, the materials 102) against the surface 104 could be desirable, rather than leaving them relatively unconstrained.

There can be a significant advantage to having multiple contact elements (e.g., materials 102). For example, this can involve dragging a chain to produce many individual contact events, as opposed to a sheet of the same metal and size that is dragged across the surface. Via mode conversion and mutual vibration and resonance, the individual stochastic contacts can better excite the flexural modes that are characteristic of the delaminated structures than when excited by a single rigid item. However, the contact element, chain element or elements, or mesh without a compliant material attached to it providing restoring force can more easily rebound off the structure in a direction perpendicular (e.g., substantially perpendicular) to the line of travel of the contact element as it is dragged across the surface and strikes either small or large irregularities on the surface. Some restoring element (in this example, the compliant material 100) can keep the materials 102 closer to the surface 104 (more than only the force of gravity or attachment to other hard materials) and reduce the amount of time that the materials 102 are away from the surface 104 when they are subjected to a force that moves them away from the surface 104. Reducing the amount of time away from the surface increases the number and frequency of interactions with the surface, which translates into more complete coverage of the area to be interrogated. When traveling at high speeds, for example, a speed of 65 km/h, a small departure from the surface for a duration of 100 milliseconds can translate to a gap in the information record corresponding to a distance of 1.8 meters. Reducing the duration by half, for example, means the gap would be a distance of less than 1 meter. Thus, for 20 cm distances, the element should not depart from the surface for more than 10 milliseconds. At highway speeds, keeping elements in close contact with the interrogated surface is essential, even if that reduction in time away from the surface is measured in time units much smaller than seconds (e.g., milliseconds).

The above example illustrates that a system can include an acoustic exciter (e.g., the materials 102), and a compliant material (e.g., the compliant material 100) applied to the acoustic exciter to configure the acoustic exciter for triggering acoustic excitation of at least part of a substrate (e.g., the surface 104). Such a system can also include a sensor (not shown) configured to receive an acoustic response of the acoustic excitation, and circuitry (not shown) configured to determine at least one characteristic of the substrate using the acoustic response. Examples of sensors and circuitry, and further examples of acoustic exciters, are described below.

The above example also illustrates that an acoustic exciter can include a contact element (e.g., of spherical and/or cylindrical shape) that is configured for triggering the acoustic excitation. For example, each of multiple contact elements (here, the materials 102) can be individually movable relative to the compliant material 100. The materials 102 can serve for triggering acoustic excitation of at least part of a substrate, here the surface 104.

Figure 2:
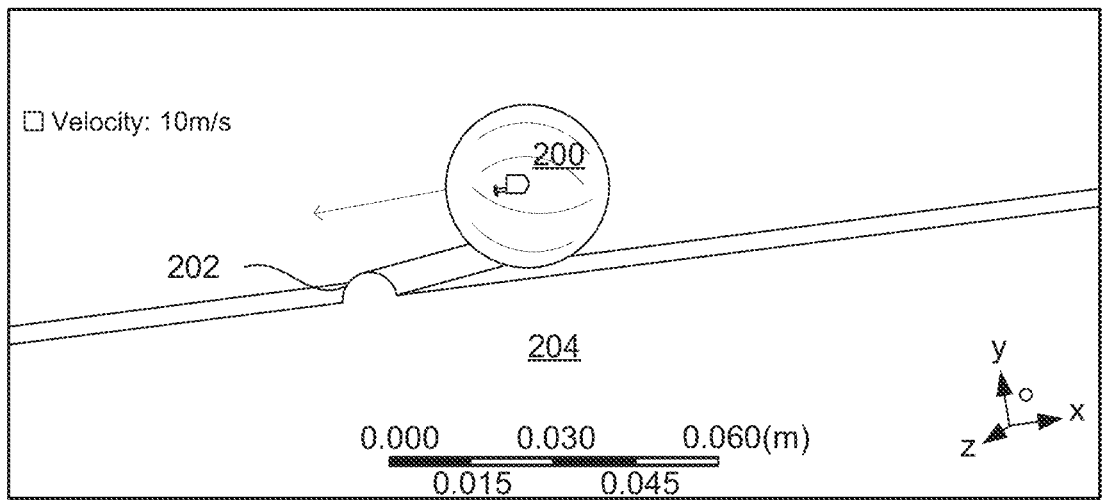
FIG. 2 shows an example of a contact element striking a bump on a concrete surface.

FIG. 2 shows an example of a contact element 200 striking a bump 202 on a surface 204 (e.g., of concrete). This can illustrate a model of a system that represents the forces in this or similar situations. The contact element 200 can serve for triggering acoustic excitation of at least part of a substrate (here the bump 202 and/or the surface 204). The contact element 200 (e.g., a steel ball) can be traveling at high speed (e.g., 10 m/s=36 km/hr) and can strike the bump 202 (or depression in the surface 204) or other surface element. This bump 202 on (or depression in) the surface 204 can have an effective radius that relates to its total size, geometry, and impacted profile. Significant energy can then be transferred during collision (heat and sound through deformations of the materials and surrounding air), which dissipates the mechanical energy of the contact event.

After contact with the bump 202 (or depression in the surface 204), the contact element 200 can follow a trajectory that is related to the effective radius of the impacted structural element, e.g. bump 202. The trajectory response of the impacting object can result in the object path being at an angle ranging from 0 degrees to 180 degrees in relation to the approaching path in the X-Y plane. In this case, the contact element 200 approaches in the X direction and then, as a result of the collision, has a substantial velocity component in the Y direction after the collision. For example, the angle formed between the X and Y components of the velocity form the angle of the response. In some implementations, if the bump 202 is very small (small effective radius) compared to the contact element, the trajectory response can be substantially close to 0 degrees. If the bump 202 is very large (large effective radius) compared to the contact element 200, then the trajectory response can be close to 180 degrees. If all the energy is transferred to a direction perpendicular to the horizontal direction, the trajectory response will be 90 degrees. The trajectory away from the surface 204 means that the contact element 200 will not be mechanically transferring energy into the surface unless and until it again comes into contact with the surface 204.

Figure 3A:
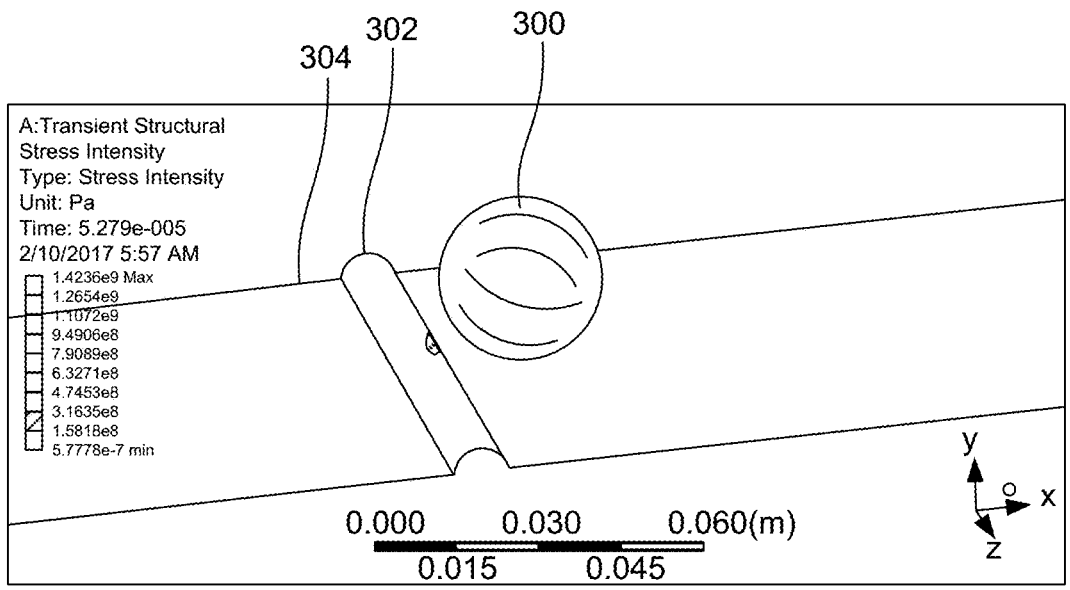
FIGS. 3A-B show an example of calculated stress intensity and calculated elastic strain, respectively.
Figure 3B:
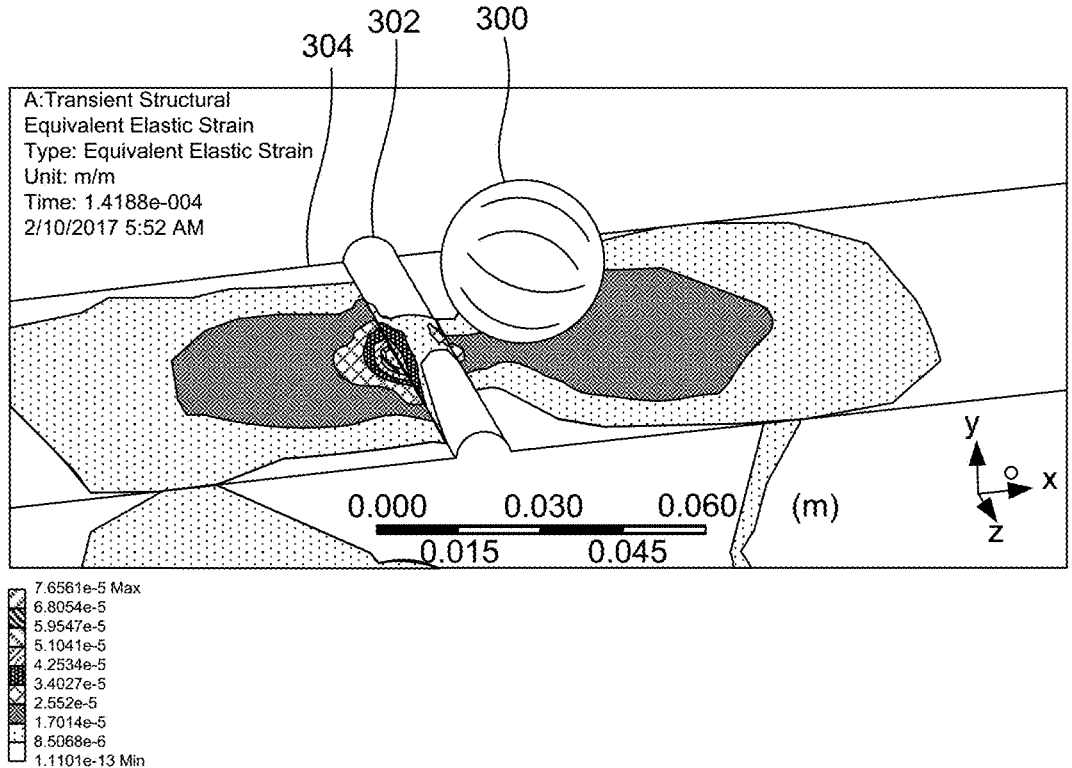

FIGS. 3A-B show an example of calculated stress intensity and calculated elastic strain, respectively. In this example, a numerical simulation can be performed of a contact element 300 striking a concrete surface element 302 (e.g., a bump) on a surface 304. The contact element 300 can serve for triggering acoustic excitation of at least part of a substrate (here, the concrete surface element 302 and/or the surface 304). For example, FIG. 3A shows the calculated stress intensity very soon after impact occurs. For example, FIG. 3B shows calculated elastic strain on the concrete surface element 302 after contact with the contact element 300 (e.g., a steel sphere) soon after contact. As is shown in representations of stress and strain after the contact element 300 strikes the concrete surface element 302, the stress intensity from a small steel ball (radius of 1.5 cm) traveling at 10 m/s striking a bump radius of 0.5 cm can be very large (on the order of GPa) and produce strains in materials that are significant for these material systems (on the order of 10-5).

As far as confinement of the contact element 300 is concerned, in a perfectly elastic collision with a material (e.g., the concrete surface element 302), the contact element 300 will retain its velocity, even though it may be traveling in a different direction. For example, the contact element 300 may be traveling at 10 m/s horizontal to the surface 304 and then after the collision may be traveling 10 m/s in a direction perpendicular to the surface. In this case, perfect conservation of energy may occur. In practice, and in the laboratory and field, the coefficient of restitution indicates the relative velocity after the collision as compared to before the collision. This can be between 0 and 1 for normal impacts. In configurations with steel objects striking concrete, coefficients of restitution between 0.64 and 0.82 for steel impacting concrete have been measured.

Assuming a coefficient of restitution of 1 (which would have the highest perpendicular velocity), the goal can be to reduce this high velocity perpendicular to the material surface so that the contact element 300 spends very little time away from the surface 304 and reduces lost coverage of the material being interrogated.

The following analysis can help to understand what some of the requirements on a spring-type element can be. Here, damping (relevant to many compliant materials) will be ignored, and the example focuses on the spring constant in order to determine some basic parameters necessary to keep an object close to the surface. From Hooke's law it is known that, for an ideal spring $$F = m\frac{d^2x}{dt^2} = -kx,$$

where F is the force acting on a body of mass m, x is the displacement of the spring, t is time, and k is the spring constant. When this is solved, a sinusoidal solution is the result that can be represented as A cos(ωt), where any phase offset is eliminated in this simple analysis. The period can be given by $$T = \frac{2\pi}{\omega} = 2\pi\sqrt{\frac{m}{k}}.$$

In this example, where the mass is leaving the surface and coming back to the surface, one can calculate the half-period of an oscillation, and that will give the relevant noncontact time of $$t_{nc} = \frac{T}{2} = \pi\sqrt{\frac{m}{k}}.$$

There is a relationship between the mass of the contact element and that of the spring constant holding the contact element on the surface. The actual velocity of the contact events may not be important in this ideal case (though non-linearity will definitely occur at substantial velocities). For example, the amplitude of the oscillation is not considered here.

Based on the above analysis, one may seek to keep contact elements substantially close to the surface with a noncontact time at a maximum of 10 milliseconds (e.g., as shown in the analysis above at high speeds, for less than 20 cm non-interaction time) in some implementations. For example, for a mass of 8.4 g, a spring constant of approximately k>

$$k > \frac{m\pi^2}{t_{nc}^2}$$

may be used. For this case, this yields a spring constant of at least 0.829 N/mm. A stiffer spring would reduce the time constant even more and is generally desirable.

Figure 4A:
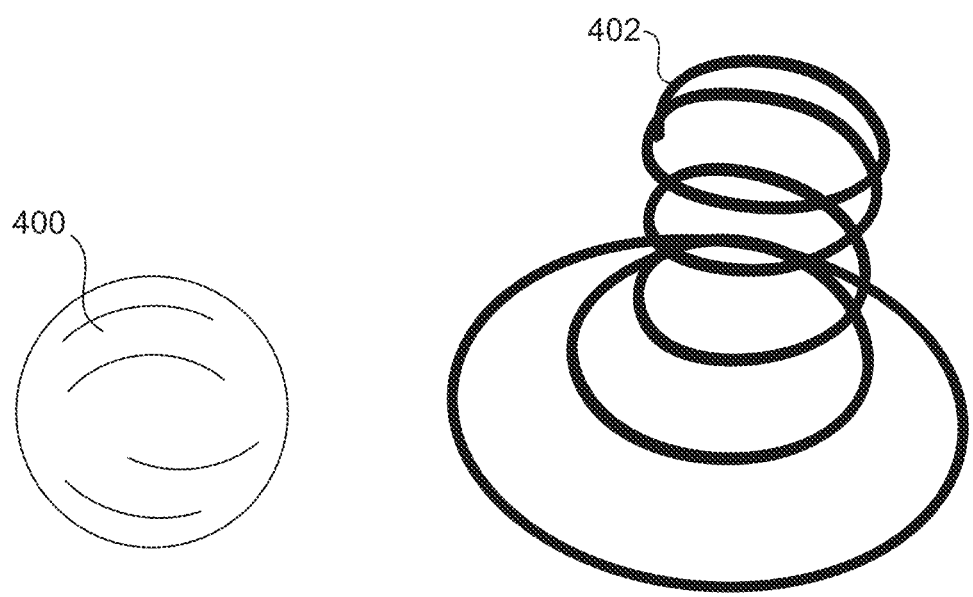
FIGS. 4A-B show examples of a contact element and spring.
Figure 4B:
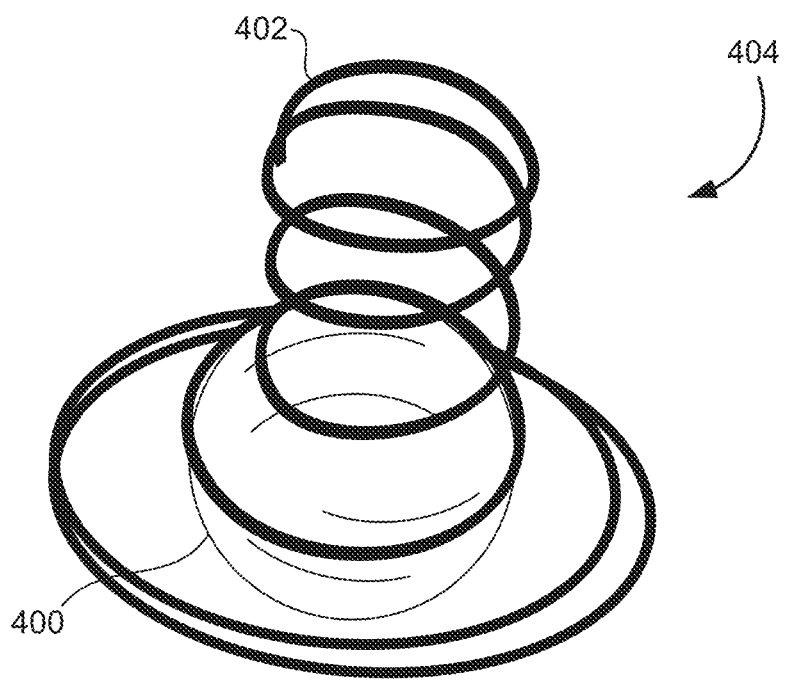

FIGS. 4A-B show examples of a contact element 400 and a spring 402. The contact element 400 can serve for triggering acoustic excitation of at least part of a surface. The spring 402 may be stiffer than the spring in the above calculations. Here, the spring 402 is a coiled, flanged spring (also known as a conical spring). For example, this can allow for some confined lateral movement of the contact element 400 as it interacts with a surface (e.g., a rough concrete surface. A substantially straight spring could be used to hold the contact element 400. FIG. 4B shows a configuration of the contact element 400 and the spring 402 designed to hold the contact element 400 in contact with a surface 404 (e.g., as the contact element 400 traverses the rough features associated with a concrete surface).

Figure 5:
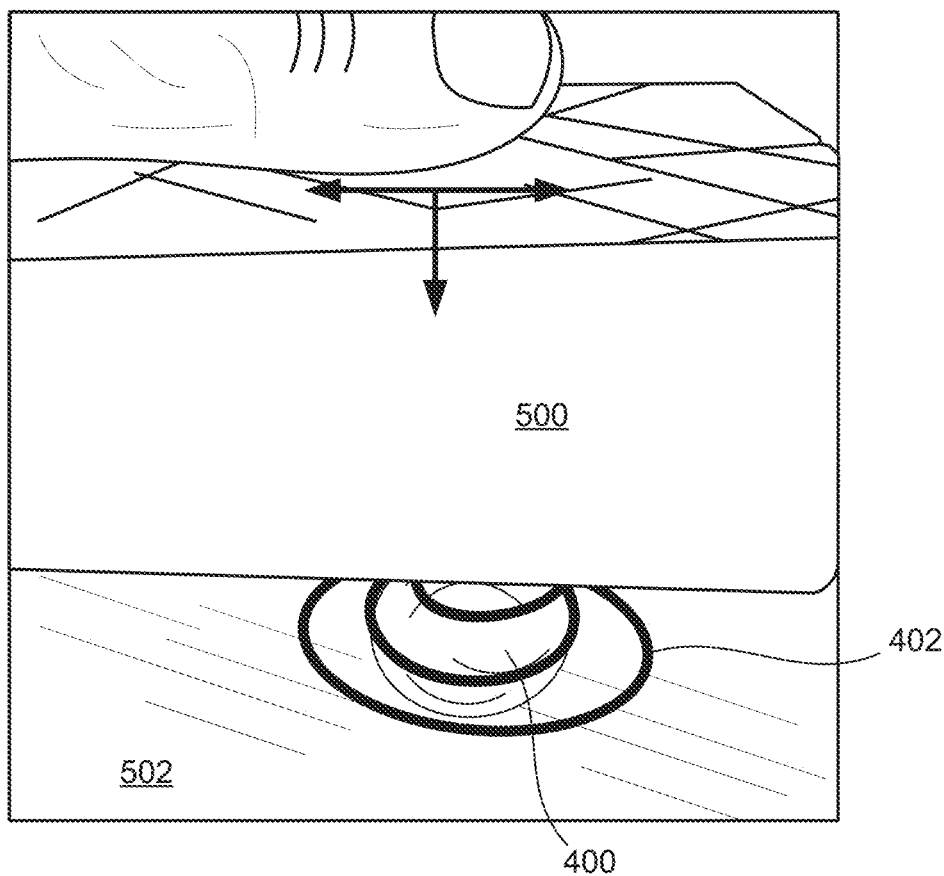
FIG. 5 shows an example of a substantially stiff and massive material with spring attached to contact element.

In these configurations it is important that the material to which the spring is attached must be stiff enough (i.e. massive and independently supported) to allow the spring to compress and move along the surface with the contact element without moving substantially itself. A human hand can provide this, for manual operation of a contact element attached with a spring, but, as shown in FIG. 5, a material, block of material, or set of elements connected together, can provide this support to which the spring and contact element are attached.

The spring constant of the spring 402 can provide enough restoring force so that the contact element 400 is held substantially in contact with the surface with a maximum departure time on the order of 10 milliseconds, even when it encounters objects in its path. More demanding applications may require a lower maximum departure time.

In terms of the displacement of the contact element 400 with the spring 402 having the type discussed here, the potential energy in the spring is given by $U = \frac{1}{2}kx^2$. If all the kinetic energy of the object $$\left(\frac{1}{2}mv^2\right)$$

is converted into displacement in the spring, one can calculate that $$x = \sqrt{\frac{m}{k}} v.$$

Thus, for a contact element of mass 10 g, a spring constant of 1 N/mm, and a velocity of 10 m/s one can have an ideal total displacement of 3.16 cm. That may not be too large of a maximum amplitude to handle for a spring attached to a stiff material as it travels over a surface. Stiffer springs (e.g., having a larger spring constant) can be used to significantly reduce the maximum total displacement. Thus, the spring 402 can keep the contact element 400 near the surface (e.g., generally less than three diameters of the contact element away) for less than 10 milliseconds after collision events. In some systems that operate at slower speeds or less resolution, less than 100 milliseconds may be acceptable.

The contact element 400 is spherical in the above examples. In some implementations, a contact element can have another shape. For example, and without limitation, a contact element can be prismatic, triangular, or oval.

FIG. 5 shows an example of a substantially stiff and massive material 500 with the spring 402 attached to the contact element 400. The contact element 400 can traverse over a surface 502, which can be rough. The material 500 can move (e.g., being pushed by hand) and the spring 402 moves with the material 500. The spring 402 can be attached by an adhesive strip and/or any bonding agent, including, but not limited to, glue, epoxy, or physical connection like slots on the material 500. The spring 402 is here flared and holds the contact element 400 in place as it moves over the surface 502. Accordingly, the contact element 400 can serve for triggering acoustic excitation of at least part of the surface 502. The above examples illustrates that a compliant material can include a spring (e.g., the spring 402) in contact with the contact element(s) (e.g., the contact element 400).

That is, a spring element can be included in an implementation to keep the contact elements near the surface for short times (e.g., less than one hundred milliseconds, or less than ten milliseconds). Damping elements can reduce oscillations of the contact element and spring system. Instead of a discrete spring, a compliant material or materials could be used that provide the necessary spring constant to keep the element in contact with the material surface. An effective spring constant of greater than 0.1 N/mm can thus be supplied by such a material.

Figure 6:
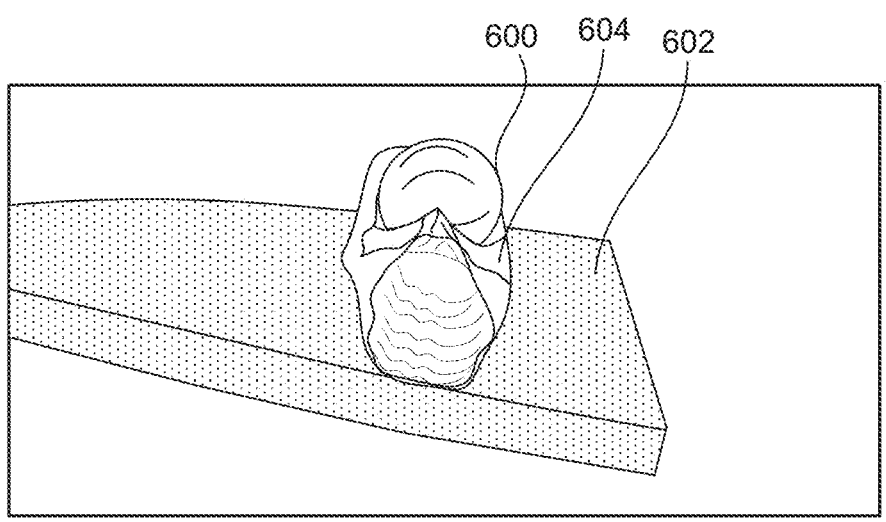
FIG. 6 shows an example of a contact element attached to a compliant substrate via an adhesive strip.

FIG. 6 shows an example of a contact element 600 attached to a compliant substrate 602 via an adhesive strip 604. The contact element 600 (e.g., a metal ball) can serve for triggering acoustic excitation of at least part of a surface. Here, the adhesive strip 604 includes a loop of tape with adhesive. Other adhesives, flexible intermediates, and/or bonding agents could be used to mount the contact element 600, including, but not limited to glue, epoxy, and/or putty. The contact element 600 can be constrained by the attachment to the compliant substrate 602 and can have significant freedom of movement. The compliant substrate can be any suitable material including, but not limited to, a thin piece of a very hard material with a large Young's modulus (>1 GPa) or a thicker piece of material that has a smaller Young's modulus (e.g. a foam with modulus <1 GPa). The stiffness of the compliant substrate 602 can be such as to allow significant movement of the contact element 600 and also to constrain its motion, particularly in directions perpendicular to the surface of the material being interrogated. This arrangement can be flipped upside down in operation so the contact element 600 (e.g., a hard material such as metal) would be in contact with the surface. A substantially rigid body (e.g., an operator's hand) can move the assembly over the surface.

The apparatus of the contact element 600, the compliant substrate 602 and the adhesive strip 604 can perform acoustic excitation. For example, the contact element 600 can be dragged across a surface, making contact in a stochastic fashion. Contact events and non-contact events can be driven randomly by forces native to the contact element and surface, in the sense that the specific timing, intensity, and duration of the contact event are not controlled explicitly by any outside apparatus or system. The contact element 600 can be an object whose surface interacts mechanically with the surface of the material to be interrogated in such a way as to introduce physical vibrations within the interrogated material. The contact element 600 can include, but is not limited to, a cylindrical, rod-shaped, spherical, elliptical, or rounded object like a chain link. The contact element 600 can be made of a hard material, for example, steel. A contact element can be made of plastic, to name another example. Many advantages can be observed in terms of excitation of vibrational modes if the contact element 600 is made of a softer material (e.g. Young's modulus less than 10 GPa) such that the interaction results in transfer of mechanical energy into the interrogated material.

Figure 7:
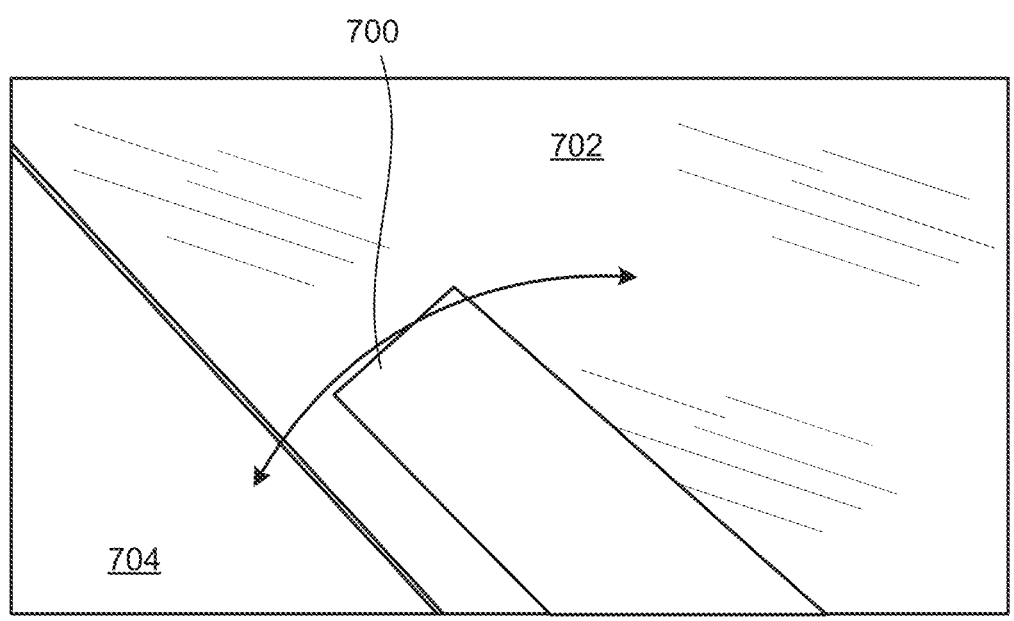
FIG. 7 shows an example of a foam element with a single contact element being dragged across intact concrete.

FIG. 7 shows an example of a foam element 700 with a single contact element (not shown) being dragged across intact concrete. The contact element can be moved mechanically across and in relatively continuous contact with multiple (e.g., two) test materials placed adjacent to each other.

Figure 8A:
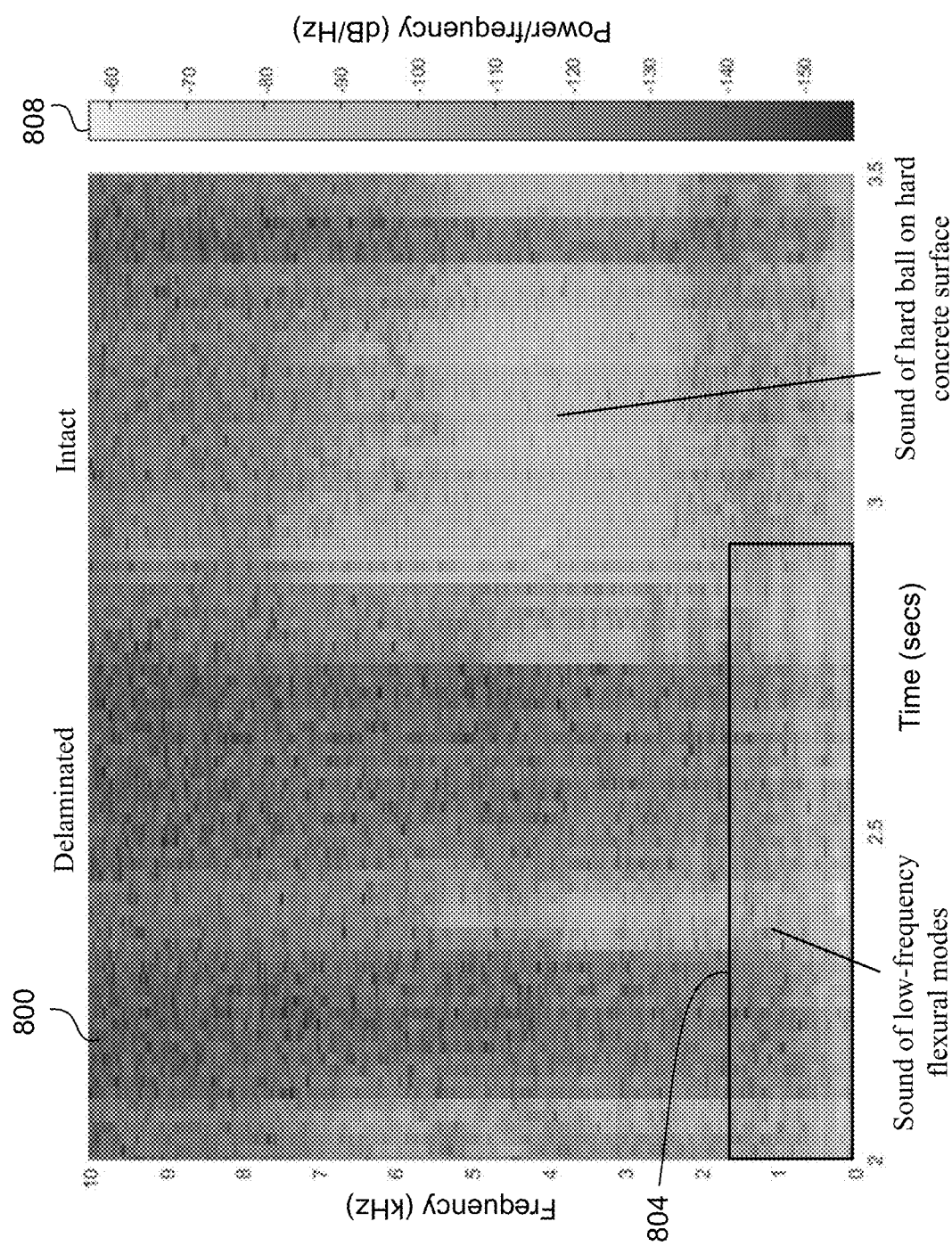
FIGS. 8A-B show examples of spectrograms of low-frequency flexural modes.
Figure 8B:
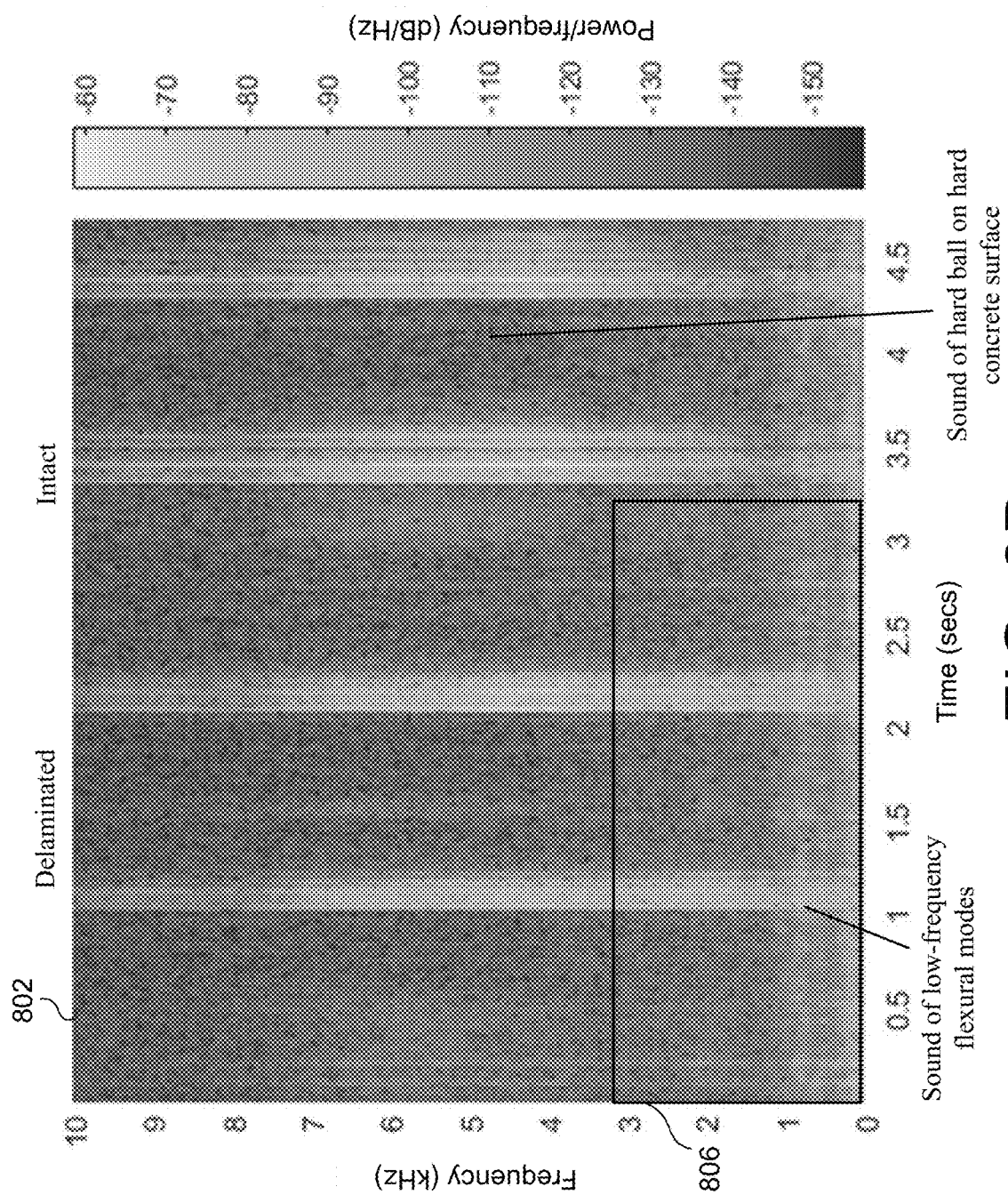

Here, a material of the surface 702 includes intact concrete, and another material of the surface 704 includes distressed, delaminated concrete. The acoustic response is pronounced as the contact element is dragged across both surfaces or as the contact element is raised and dropped on the surface. Spectrograms of the acoustic signal are shown in FIGS. 8A-B, which illustrate the acoustic differences that are perceived when processing sound emitted from the contact element as it moves across the different surfaces.

In this configuration, the contact element is attached to a compliant material (e.g., the compliant substrate 602 and/or the foam element 700) in a planar configuration. A planar configuration is not essential for the compliant material. For example, curves or other geometric shapes may exist between the mounting of the contact elements. The contact elements need to be able to conform substantially to a surface, and many materials to be interrogated at high speed may be substantially planar. As one end of the foam is raised, the contact element is then attached to a curved configuration.

The above examples illustrate that attaching a hard contact element to a compliant material or compliant system (e.g., the compliant substrate 602 and/or the foam element 700) can mechanically constrain the movement of the contact elements. For example, this can be important because, as the speed of a chain or other acoustic exciter against a surface increases, increased forces can develop that drive the contact elements away from the contact surface. The contact events are generated stochastically when an element like this is dragged across the surface, and as such the interaction of the contact element and the surface is driven by surface texture and by the contact element, including vibrations that may be induced by the contact element on the surface. The above examples also illustrate that a compliant material (e.g., the compliant substrate 602 and/or the foam element 700) can include an adhesive material in contact with the contact element(s) (e.g., the contact element 600).

When an acoustic exciter such as any of the impactors or contact elements described herein acoustically excites a substrate, an acoustic response can be generated by the substrate. Such an acoustic response can be captured by one or more sensors (e.g., a microphone) and can be stored as an analog and/or digital signal. One or more processing techniques can be applied to the data of such a signal, for example as described below.

FIGS. 8A-B show examples of spectrograms 800 and 802 of low-frequency flexural modes. In some implementations, the flexural modes can be associated with distressed/delaminated concrete versus the sound of intact concrete. The spectrogram 800 shows results of dragging a contact element (e.g., as shown in FIG. 7) across surfaces (e.g., the surfaces 702 and 704). The spectrogram 802 shows results of dropping a contact element (e.g., a metal ball) on the surfaces. Frequency is shown on the vertical axis, and time is shown on the horizontal axis. Because the contact element in both spectrograms 800 and 802 first interrogated the delaminated area and thereafter the intact area, the left side of each spectrogram is labeled "delaminated", and the right side is marked "intact".

The quick succession of contact events during the drop events (spectrogram 802) is due to the compliant material to which the contact element is attached. This can stand in contrast to continued, unconstrained bouncing of a contact element, which not only increases the time between contact events but also introduces additional horizontal motions (i.e., the contact element has to be caught after bouncing). The constrained bounce also differentiates the acoustic response from a single impact event. For example, there is conflation and summation of the signals due to the multiple contacts in quick succession, particularly before any dominant resonant modes that may or may not be present have fully decayed. Thus, the acoustic response of the contact event for this type of constrained system is somewhere between the chain drag and a single impact. For example, the acoustic response of the contact event is a hybrid response.

A box 804 has here been added to the spectrogram 800, and a corresponding box 806 to the spectrogram 802. These boxes 804 and 806 can correspond to identification of particular characteristics of the interrogated material. For example, the box 804 and/or 806 can represent an acoustic response that indicates a possible delamination in the sampled material. The acoustic analysis can take into account intensities of the acoustic response as indicated by a scale 808. For example, the box 804 has here been placed on components of the acoustic response in the frequency range of 0 to 2 kHz because these components have a relatively higher intensity than elsewhere in the delaminated or the intact areas. For example, the low-frequency components of the signal of the acoustic response can indicate that there are thin membranes in the interrogated material that are vibrating at such frequencies. Similarly, the box 806 has been placed in the spectrogram 802 to indicate that certain low-frequency components of the acoustic response—particularly, those generated on the delaminated side-indicate the presence of delamination or other structural irregularities. In short, the acoustic response here corresponds to two impacts on the delaminated side and two impacts on the intact side, and the impacts on the delaminated side have relatively more energy in the low frequency range (e.g., 0 to 3 kHz) than the impacts on the intact side.

Data from multiple runs can be fused together to make maps. This is the approach that was taken, for example, with the impact-echo data in the previous example. For example, the acoustic responses of multiple (e.g., four) different runs can be fused together algorithmically. The same area can then be interrogated with a known transverse offset between two passes. This may increase the resolution and accuracy of the data interpretation and subsequent mapping. Additionally or instead, dynamic thresholding can be used to accommodate different concrete conditions, for example, temperature, moisture, and/or rebar depth, in addition to speed and types of exciters.

Estimation of various statistics, such as the percent delamination of segments or of the entire material (e.g., a deck) can be done. The delamination percentage can then be subsequently used to enable better engineering decisions about rehabilitation. The delamination percentage is often an important parameter in such engineering decisions.

In some implementations, it can be possible to use signal processing techniques based on machine learning to additionally process the data and extract relevant features from the audio record. For example, a machine learning technique can be applied to the data and/or signals of acoustic responses in order to learn (e.g., develop algorithms or pattern recognition) how to identify material that may have one or more particular characteristics (e.g., due to being delaminated). Acoustic data can be particularly amenable to this type of analysis.

Ideas described herein can be extended to a geometry in which the compliant material is wrapped around, or attached to, a rotating element, such as a wheel or rotating frame. The compliant material could be the tire of the wheel itself, but in this instance the compliant material could be an additional layer, as shown in FIG. 9. Here the individual contact element is seen to be attached to the compliant material, which is then wrapped around the tire surface. Although there are structures that have hard elements embedded in a compliant material, this arrangement can be specifically engineered so that the contact elements produce the desired acoustic response from the concrete in order to interrogate it. For example, generally larger-mass impactors (i.e. thicker chain elements for the chain drag) can be preferred to excite the acoustic modes indicative of delaminations.

FIG. 9 shows an example of a contact element 900 on a compliant material 902 wrapped around a rotatable object 904. The contact element 900 can serve for triggering an acoustic excitation of at least part of a substrate. While a single contact element 900 could be sufficient, many other arrangements of contact elements could be used. In some implementations, a plurality of contact elements of different sizes and/or materials can be used. For example, this can provide different excitation profiles. In some implementations, contact elements could be distributed in predefined geometric shapes, e.g. in rows or staggered rows. In some implementations, contact elements could be distributed in a substantially random order, such as being adhered in a random configuration in patches or around the entire surface of a rotatable object.

FIGS. 10A-B show examples of a rotatable object with a compliant layer with a hard contact element. Particularly, screen shots 1000 and 1002 show a rotating element 1004 (e.g., a wheel). The rotating element 1004 has a contact element (e.g., any of the contact elements described herein) that can serve for triggering an acoustic excitation of at least part of a substrate. Dragging and rotation of the rotating element 1004 produces acoustic responses that clearly differentiate intact and delaminated concrete. This wheel, when dragged, includes both responses due to dragging as well as responses due to a large initial contact force as the hard element comes into contact with the surface. Both contact types are advantageous as far as acoustic discrimination between concrete conditions is concerned.

The above examples illustrate that a system can include a wheel (e.g., the rotatable object 904) that includes at least part of the compliant material (e.g., the compliant material 902) and that the acoustic exciter(s) (e.g., the contact element 900) can be positioned on a perimeter of the wheel.

Figure 11:
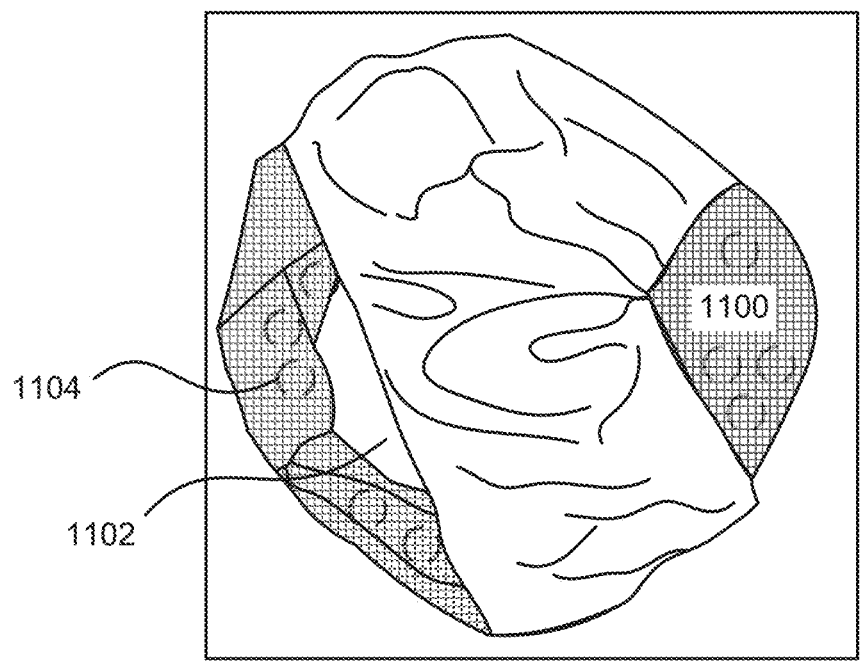
FIGS. 11-16 show examples of a mesh attached around a wheel to form a cage around the entire wheel.
Figure 12:
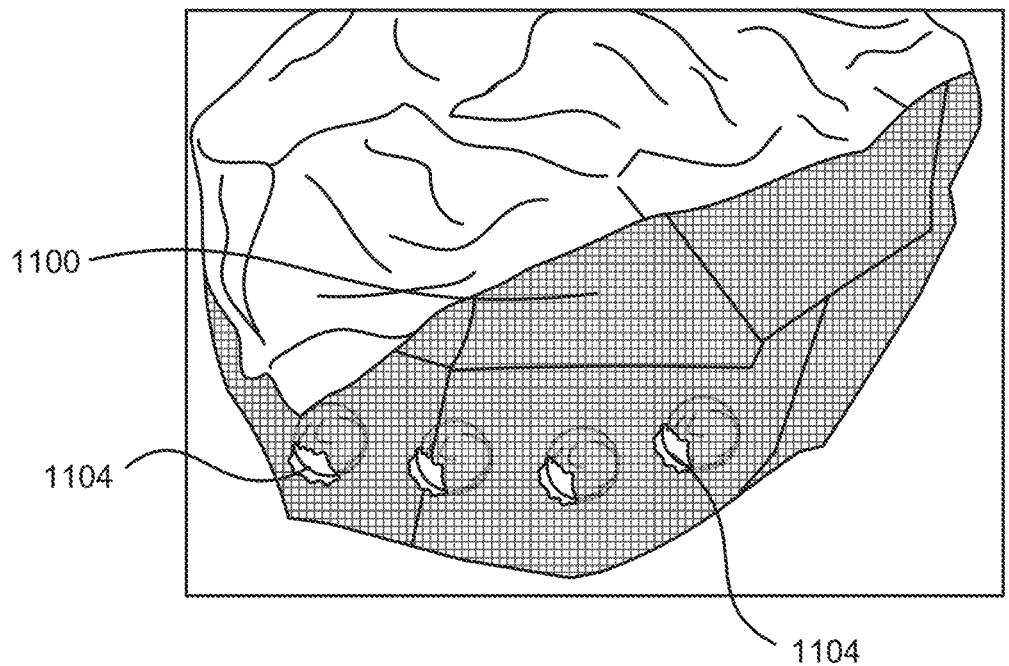
Figure 13:
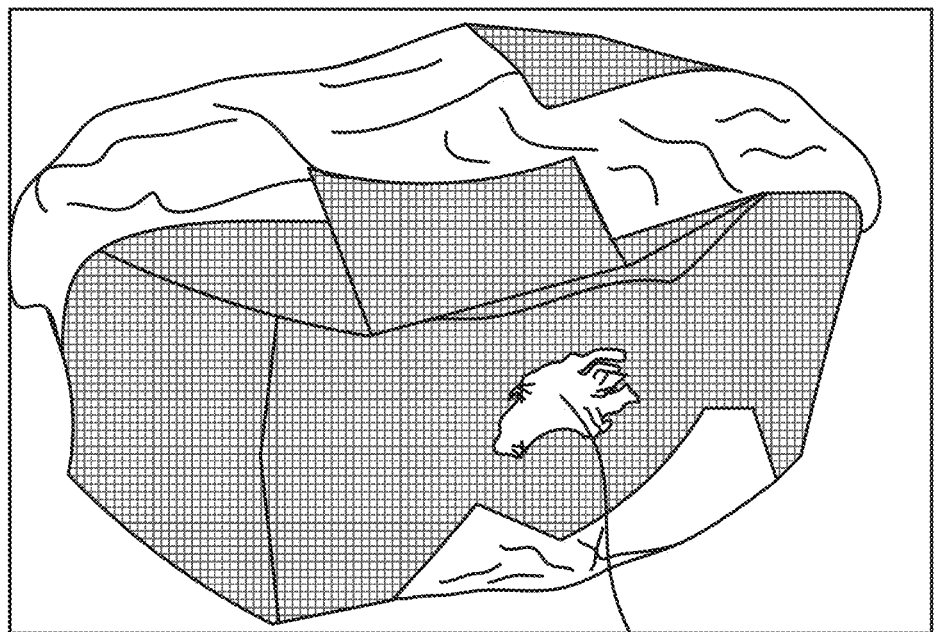
Figure 14:
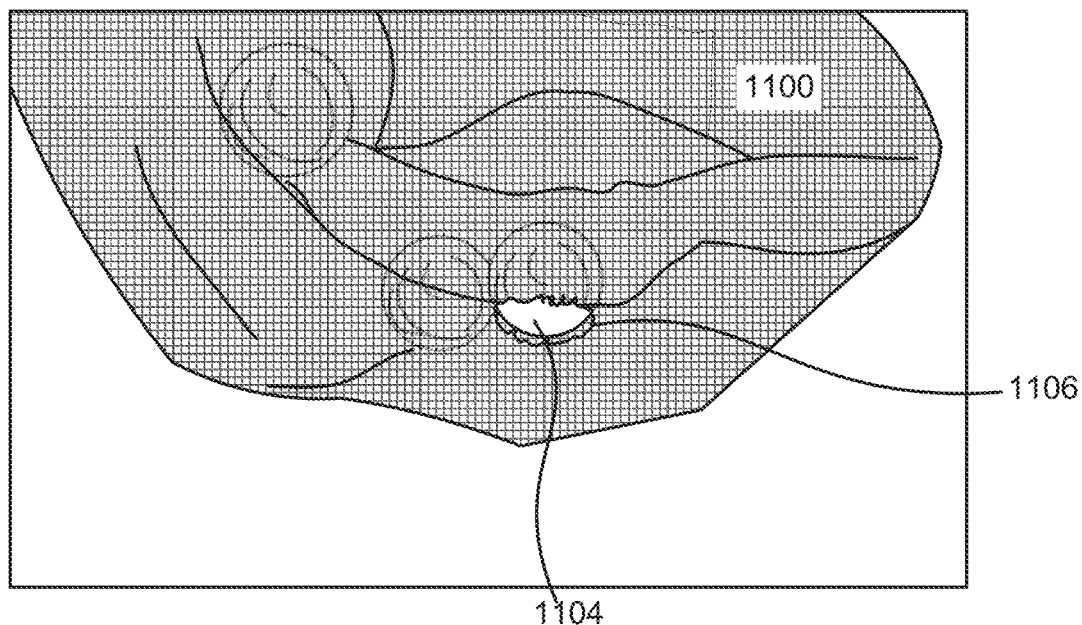
Figure 15:
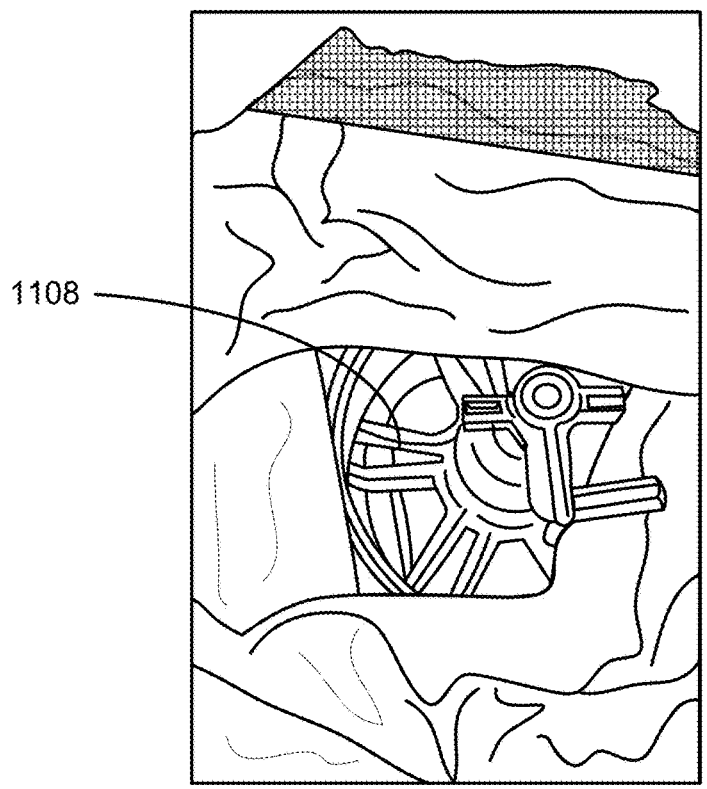
Figure 16:
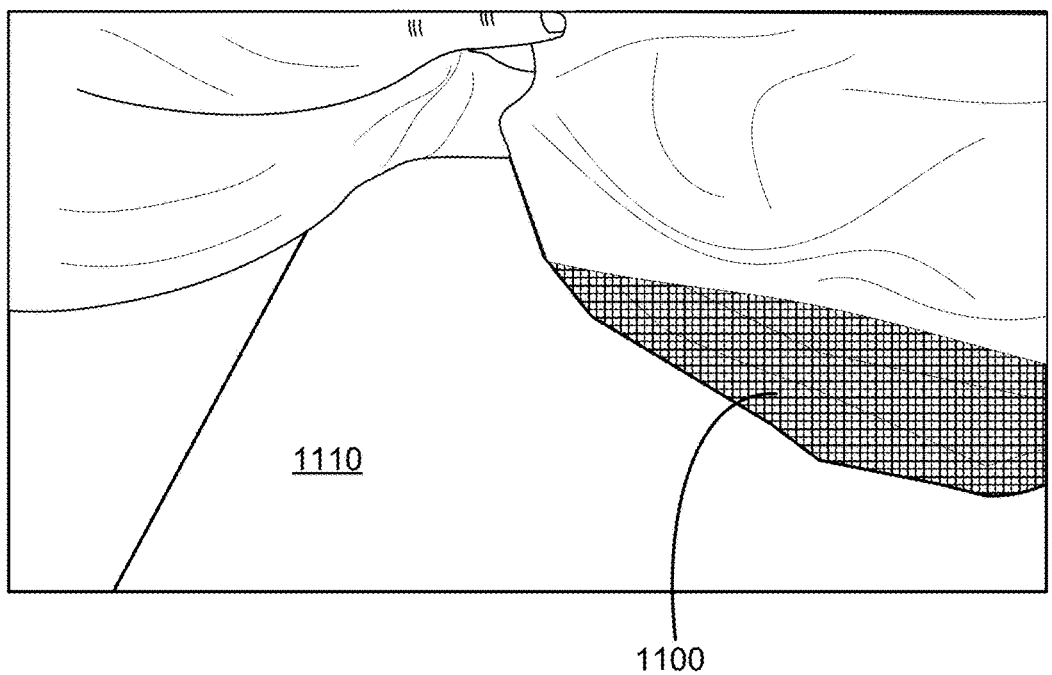

FIGS. 11-16 show examples of a mesh 1100 attached around a wheel 1102 to form a cage around the entire wheel. FIG. 11 shows that the mesh 1100 is attached around the wheel 1102 such that the mesh 1100 forms a cage around the entire wheel. The mesh is here attached to the center of the wheel via tape, but any other way of attaching the mesh 1100 can be used. Ball bearings 1104 inside the mesh 1100 are free to move around the entirety of the wheel. The ball bearings can serve for triggering acoustic excitation of at least part of a material. FIG. 12 shows the ball bearings 1104 within the mesh 1100 that goes around the wheel. The ball bearings 1104 are constrained to move within the mesh 1100 and generally move according to gravity and/or rotation and/or interaction with the surface over which the wheel and mesh are rotating. FIG. 13 shows holes 1106 in some places on the mesh 1100 that are towards the surface to be interrogated. For example, the holes 1106 are apertures to allow the contact elements (here, ball bearings 1104) to interact more directly with the surface. FIG. 14 shows the ball bearing 1104 protruding through the hole 1106 in the mesh 1100 but not leaving the mesh 1100. This can allow significant interaction with a surface by the contact element (ball bearing 1104) without any material between the contact element and the surface. The wheel 1102 can have a textured rubber tire surface. FIG. 15 shows spokes 1108 of the wheel 1102 (e.g., an interior tire element). FIG. 16 shows a screen shot demonstrating the use of the mesh 1100 to constrain the contact elements, which interact with a surface 1110 via holes in the mesh 1100, for example as described above. This arrangement can produce some scratching sounds (when the mesh 110 is a metal mesh) in addition to the acoustic response of the contact elements interacting with the surface 1110 (e.g., a concrete surface). The differences in concrete could still be discerned. These examples illustrate that a system can include a mesh (e.g., the mesh 1100) that constrains the contact element(s) (e.g., the ball bearings 1104) against a compliant material (e.g., the wheel 1102).

In the embodiment of FIGS. 11-16, the contact elements (here, ball bearings 1104) are constrained by a material substantially surrounding the rotatable element (here the mesh 1100) which may be rigid or flexible or loose. The mesh 110 here serves as a cover attached around a rotating surface (e.g., the wheel 1102). The mesh 110 can be made from plastic and/or metal and/or other compliant or non-compliant material that allows for interaction of the contact elements through apertures in the material. As another example, the material of the mesh 1100 can be thin enough and flexible enough to allow for interaction through it. In this arrangement, the contact elements can even replace each other in positions along the surface of the rotating element. One or more holes (e.g., the hole 1106) in the mesh 1100 is made big enough to allow for substantial contact of the ball bearings with a surface, but is not so large as to allow the bearings to be easily extracted from the assembly. While spheres work in this arrangement as contact elements that interact through the apertures in the mesh, other shapes such as cylinders or polyhedrals could serve as contact elements.

Examples below relate to active excitation by using flexibly coupled rotating contact elements. A rotating element can be a significant advantage in practice because it would allow for further dimensional constraint of contact elements. In some implementations, acoustic measurement equipment placed nearby would not be in danger of being struck by fast-moving elements that are not constrained. The interrogated material surface vibrates, and the air medium transmits these vibrations to sensors that translate the movement of the air medium into electrical signals representing these movements. This air-coupled sensor can be based on a piezoelectric element, e.g. a microphone. Because a microphone can be used to pick up the responses and multiple channels are desired, the requirement to put microphones further away in this type of case opposes the requirement of minimizing cross-channel interference and the desire to place microphones as close as possible to the interface of the contact elements with the interrogated surface. In addition, because of material compliance, additional associated shock suppression, and/or suspension of the contact elements, such an apparatus can provide increased time of contact on rough surfaces, such as concrete, at higher speeds. For example, such speeds can include 30 km/h, 55 km/h, 105 km/h, or 130 km/h.

FIGS. 17-20 show examples of a trailer 1700 with rotating chain elements that are driven by a motor. A variety of devices can be used to perform active acoustic excitation of concrete delamination defects in bridge decks based on the idea of a rotating contact element with stochastic contact events that are actively driven by a motorized frame. For example, one such apparatus includes flexibly connected contact elements in a rotational configuration. The apparatus can include or exclude inner support, flexible, compliant, or otherwise. This apparatus can include a compliant material that can be rotated.

Given the understanding that was achieved by using compliant mechanisms as part of the apparatus, this apparatus demonstrates contact elements attached around a rotating compliant element of some type. In some implementations, the principles of actively driven rotation can be applied to a variety of embodiments.

Figure 17:
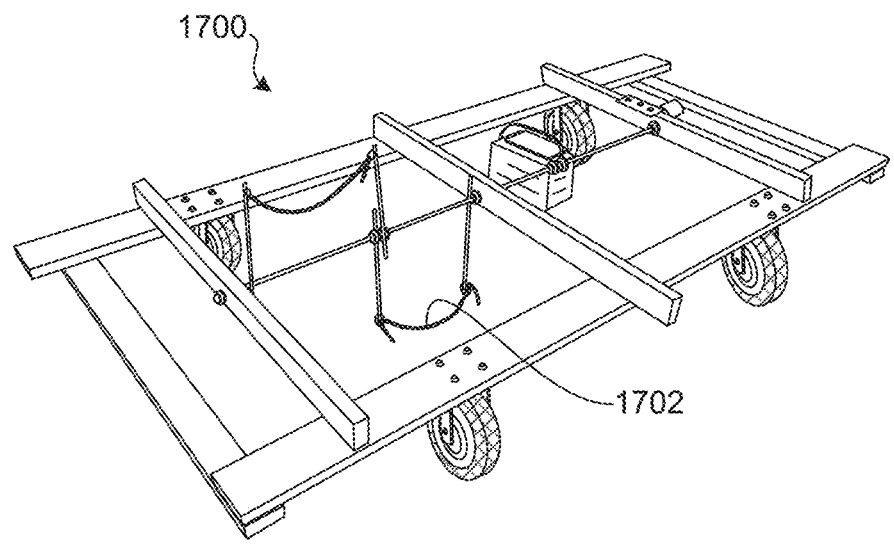
FIGS. 17-20 show examples of a trailer with rotating chain elements that are driven by a motor.
Figure 18:
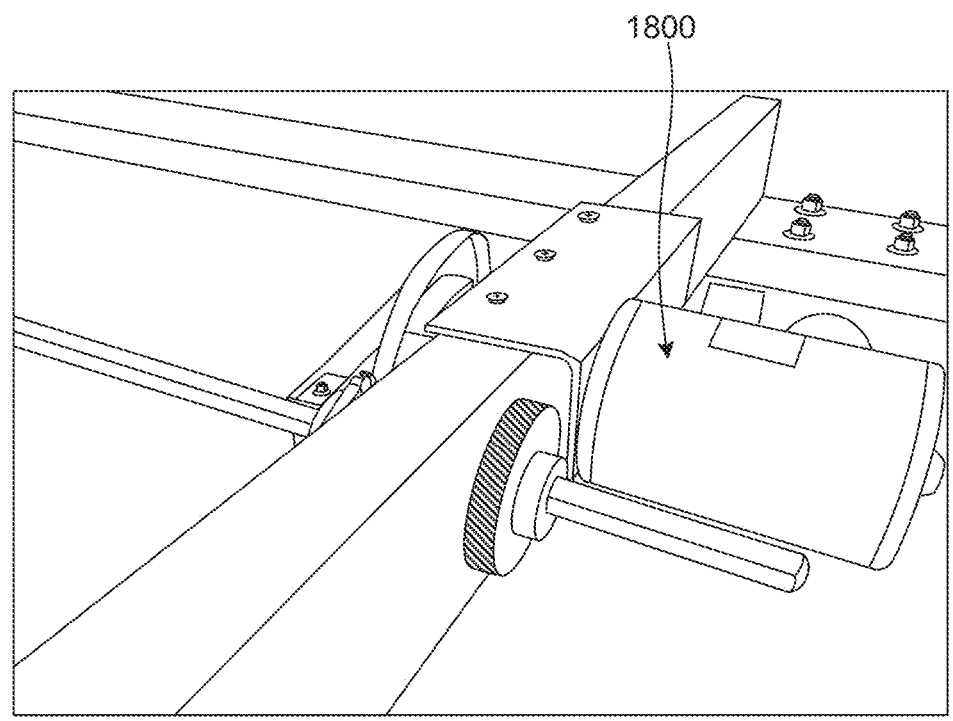
Figure 19:
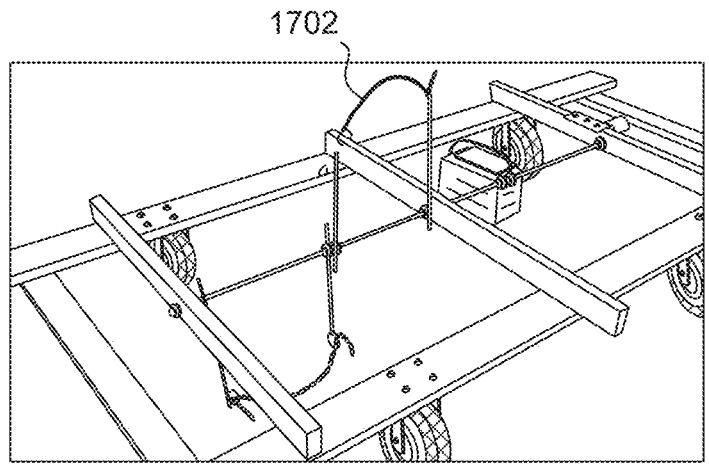

FIG. 17 shows that the trailer 1700 can include a frame that could rotate one or more flexible chains 1702 in a substantially circular path around a rod. The flexible chains 1702 can serve for triggering acoustic excitation of at least part of a material. The trailer has rotating chain elements formed by the flexible chains 1702 that are driven by a motor. A constellation of chain elements could be constructed using the metal rods to support many different arrangements of chains, for example, to create a cylinder of chains (without an internal support, such as a tire). The arrangement is such that the chain repeatedly contacts the surface (e.g., the concrete surface) while being spun around the rod to which it is connected. FIG. 18 shows a motor 1800 that can be driven by a battery or other power source and the gear system used to drive the hexagonal rod to which the flexible chain 1702 is attached. FIG. 19 shows that the flexible chain 1702 strikes the material surface (here, the surface of a concrete slab) and then bounces off in an erratic manner. The initial strike could excite acoustic responses associated with defects. However, with the exception of a few repeated bounces that occur only in relatively few instances, there is very little dragging in this configuration. The lack of contact resulting from bouncing would not occur with a tire element or other compliant material to which the chain was mounted. Rather, use of a compliant material would force more contact with the surface and keep the chains more dimensionally stable during their rotation around an axis. In some implementations, holding the contact elements (e.g., flexible chain 1700) in a circular configuration at all speeds but still retaining relatively independent vibration (around a circular, compliant, rotating element, i.e. a tire) may be desirable.

In some implementations, chains strung across a rotating frame are not the only configuration that can produce acoustic responses. Cables (steel wire) with contact elements (balls, links) in various arrangements are also capable of generating acoustic responses. Stiff elements, e.g. a rod, with contact elements with some independence of movement spaced along them also can produce acoustic responses associated with defects.

Figure 20:
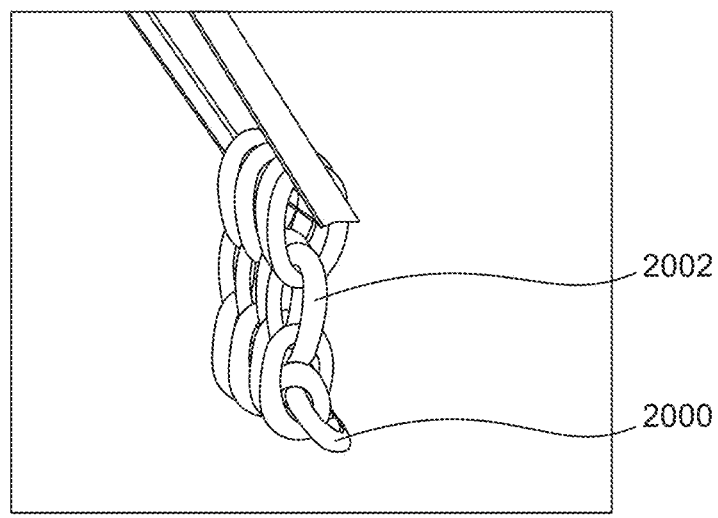

For example, FIG. 20 shows a snapshot of multiple contact elements 2000, each one including four links 2002. The contact elements 2000 can serve for triggering acoustic excitation of at least part of a surface. The contact elements 2000 are positioned along a stiff rod that rotates around and brings the plurality of contact elements 2000 into mechanical interaction with a surface. While some aspects of the contact event are governed by the overall rotation, the individual contact elements have multiple degrees of freedom and interact stochastically with the surface.

When traveling at high speeds, reducing the time that the contact element spends away from the interrogated surface can be important. For example, a steel ball with a mass of 18.8 grams and a radius of 8.3 mm can be released from an aperture 10 cm above a concrete surface. The speeds of impact on intact and delaminated surfaces can be calculated. For the ball impacting an intact section at 1.62 m/s, the rebound speed is 1.03 m/s. For the ball impacting a delaminated section at 1.35 m/s, the rebound speed is 1.11 m/s. Notably, these impactors then spend substantial time away from the concrete surface.

Figure 21:
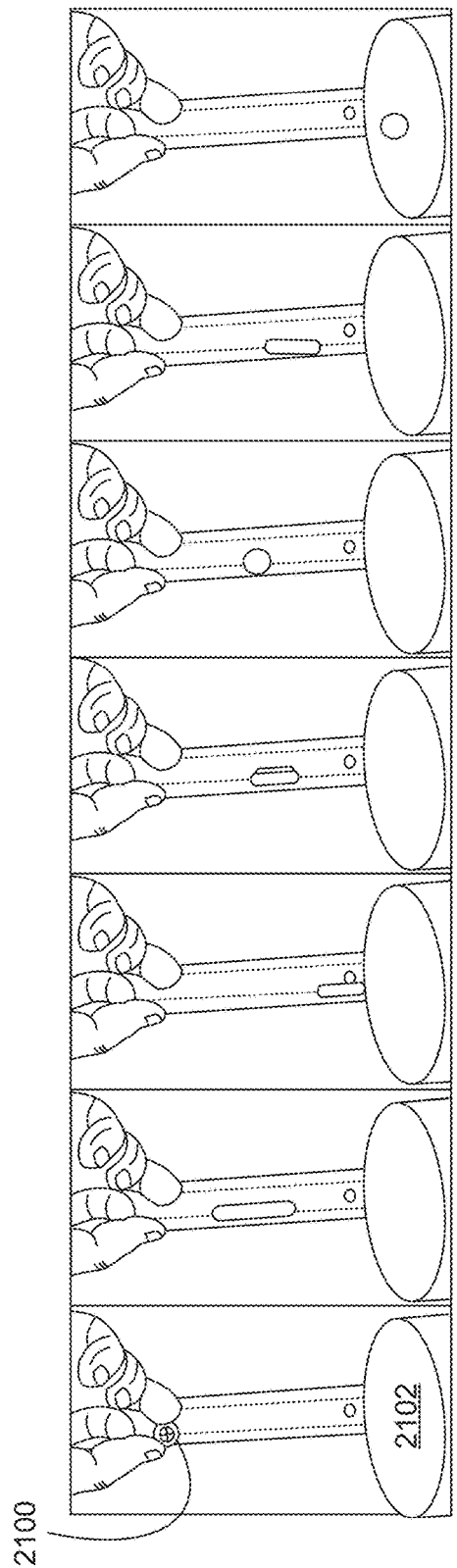
FIG. 21 shows examples of a small contact element of radius ~1.1 cm dropped onto a concrete sample.

FIG. 21 shows examples of a small contact element 2100 of radius ~1.1 cm dropped onto a concrete sample 2102. The small contact element 2100 can serve for triggering acoustic excitation of at least part of a substrate. This excitation can be performed with impactors of 8.4 grams. The small contact element 2100 bounces repeatedly and spends significant time away from the surface of the concrete sample 2102.

Figure 22:
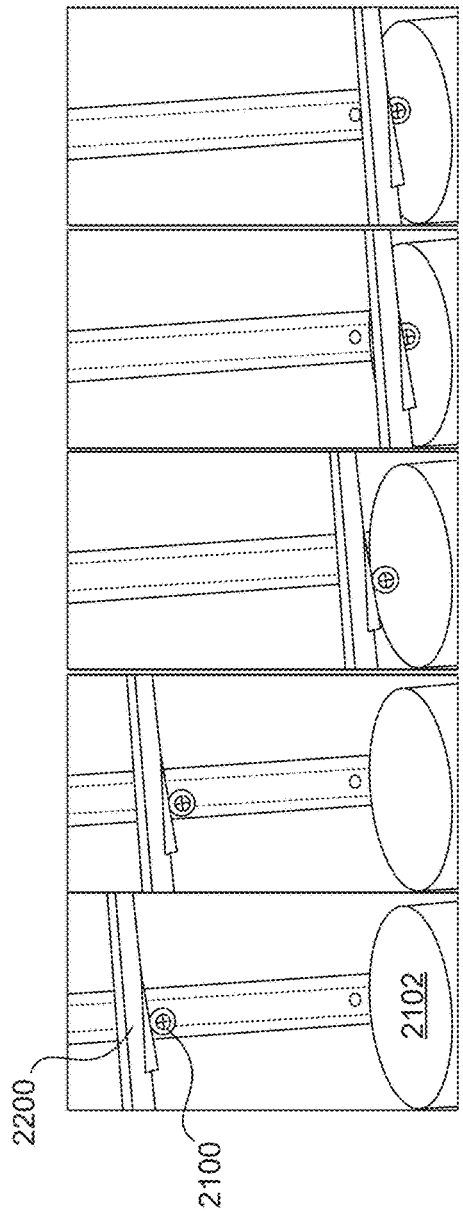
FIG. 22 shows examples of a small contact element of radius ~1.1 cm attached to a compliant element via an adhesive.

A foam implementation of a spring-like damping material can be used. For example, this can accelerate the ball to the surface and constrain its movement. FIG. 22 shows examples of the small contact element 2100 of radius ~1.1 cm attached to a compliant element 2200 (e.g., a foam element) via an adhesive. The small contact element 2100 is forced to the surface of the concrete sample 2102 and, because of the compliant element, cannot bounce significantly. Rather, the motion of the small contact element 2100 is significantly damped.

Figure 23:
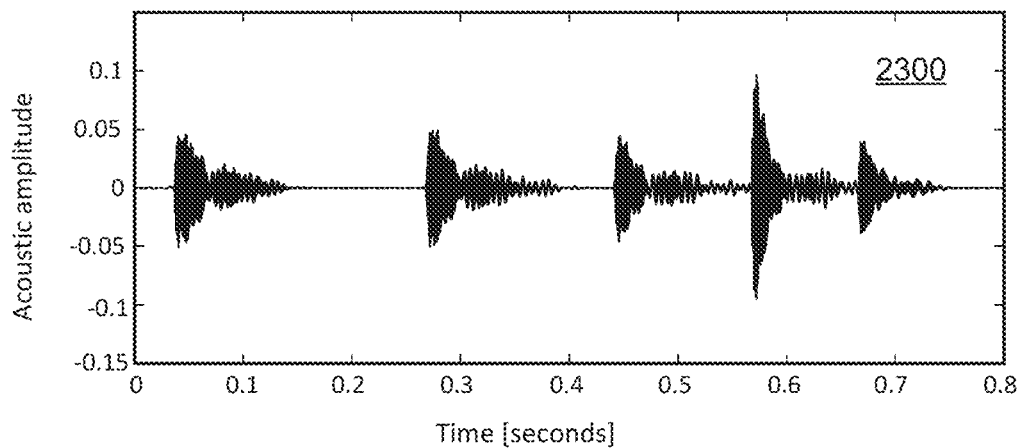
FIG. 23 shows an example of an acoustic response when an unconstrained contact element is dropped and repeatedly bounces on the surface of the concrete sample.
Figure 24:
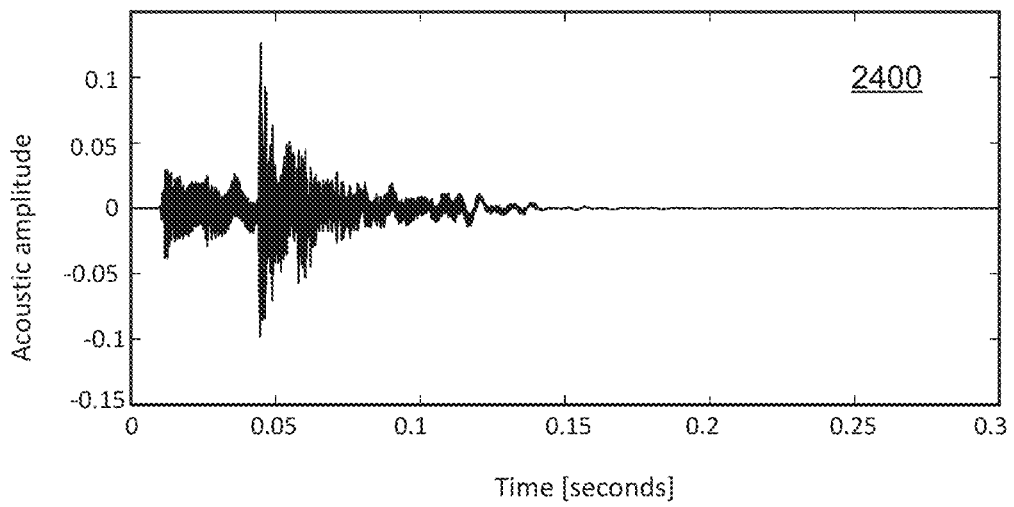
FIG. 24 shows an example of an acoustic response when a constrained contact element is accelerated towards a surface.

The acoustic responses during both of these tests can be recorded and analyzed. FIG. 23 shows an example of an acoustic response 2300 when the small contact element 2100 is unconstrained and dropped on the surface of the concrete sample and repeatedly bounces thereon. Because of the rough surface, not all the bounces are perpendicular to the surface, and the element eventually falls off the surface. There is significant time (>100 milliseconds) between contact events. FIG. 24 shows an example of an acoustic response 2400 when the small contact element 2100 constrained by the compliant element 2200 is accelerated towards the surface of the concrete sample 2102. No additional bounces are represented in the acoustic record. It appears that the time between all contact events is less than 100 milliseconds (the data indicate much less than 50 milliseconds between repeated contacts). For example, the small contact element 2100 constrained by the compliant element 2200 is held substantially to the surface (no rebounds greater than 100 milliseconds) after the initial impact and produces a single acoustic response composed of many interactions with the surface in a short period of time.

As mentioned elsewhere herein, when a contact element is traveling at high speeds, for example, a speed of 65 km/h, a small departure from the surface for a duration of 100 milliseconds translates to a gap in the information record corresponding to a distance of 1.8 meters. Reducing the duration by half, for example, means the gap would be a distance of less than 1 meter. Reduction to less than 10 milliseconds in thus desirable so that the information gap is substantially less than 20 centimeters. At highway speeds, keeping elements in close contact with the interrogated surface is essential, even if that reduction in time away from the surface is measured in time units much smaller than seconds (e.g. milliseconds).

Figure 25:
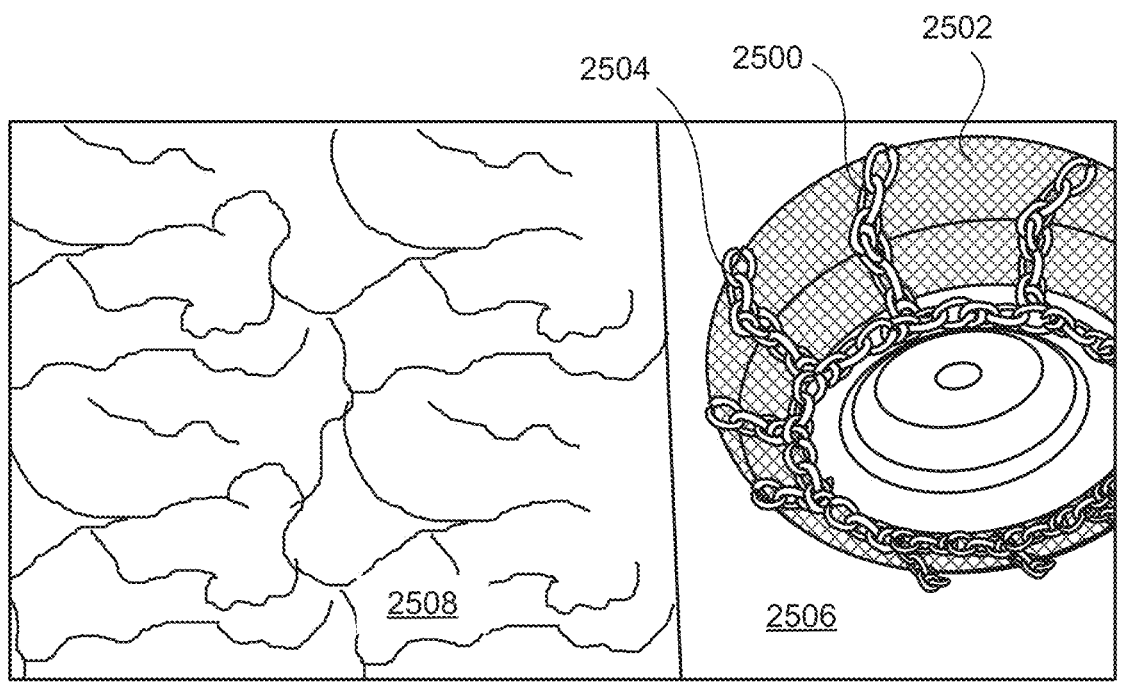
FIGS. 25-27 show examples of using chains on tires to excite acoustic responses associated with delamination in a substrate.
Figure 26:
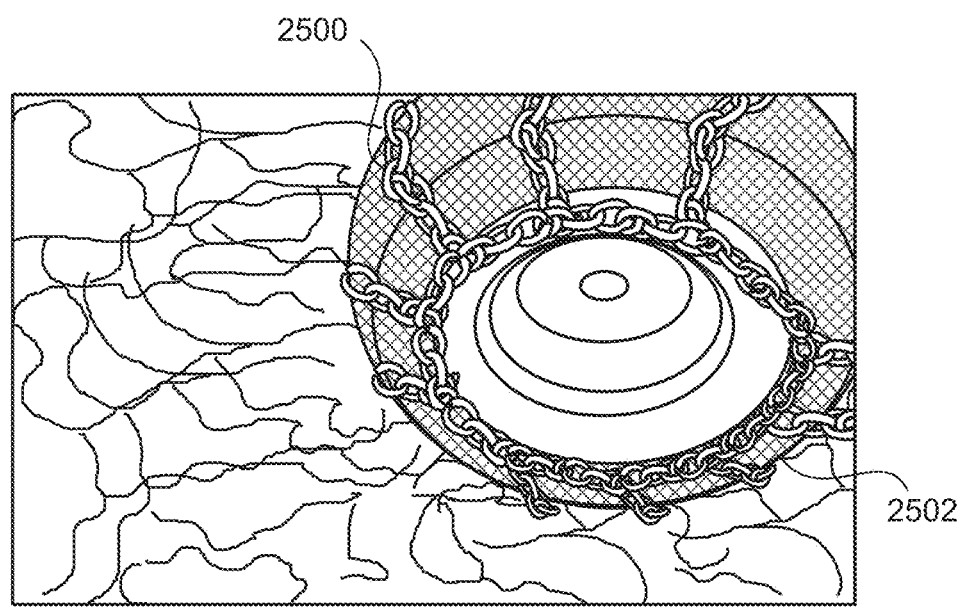
Figure 27:
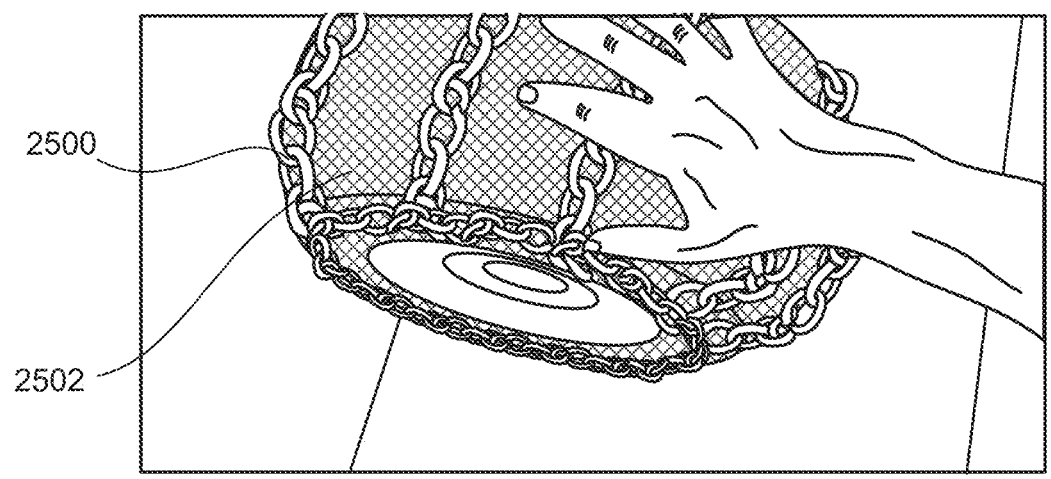

FIGS. 25-27 show examples of using chains 2500 on tires 2502 to excite acoustic responses associated with delamination in a substrate. Each of the chains includes acoustic exciters in the form of links 2504 that can serve for triggering acoustic excitation of at least part of a surface. Given the configuration with chains actively driven in a circular fashion as shown in FIGS. 17-19 and the resulting acoustic responses, it may be desirable to be able to keep the contact elements in a circular configuration at all speeds, but also to have a compliant material form the rotational body to which the contact elements are attached to allow for relatively free vibration of the contact elements.

FIG. 25 shows use of the chains 2500 on tires 2502 to excite acoustic responses associated with delaminations. The wheel passes from an intact surface 2506 to a delaminated surface 2508 (e.g., either or both surfaces can be concrete.) The difference in acoustic responses between intact and delaminated concrete is audible. FIGS. 26-27 show other stages of a demonstration involving the chains 2500 on the tires 2502.

In some implementations, the chains 2500 (e.g., a tire chain) can be placed around the tire 2502 with enough tension to keep them relatively tightly in their configuration around the tire 2502 but not so tight as to restrict the movement of the chains and/or the links 2504 completely. The tire can be deflated to put the chains on and then re-inflated to a specified pressure that provides the desired level of compliance. The tire and chain assembly can then be rolled over different material types (e.g., intact and delaminated concrete). Differences in material condition are audibly different (e.g., to a sound detection device and/or to a listening operator). Manually operating an apparatus based on this configuration of contact elements around a compliant material is therefore possible. This concept, in some implementations, can be extended to a multi-channel configuration that can be deployed at highway speeds.

The above examples illustrate that a system can include contact elements that are chain links (e.g., the links 2504). The chain(s) can have any of a number of patterns on the wheel. For example, the chain can provide cross members that extend in a radial fashion from one side of the wheel, across the periphery of the wheel, and then extend radially in the opposite direction on the other side of the wheel. The exciters could be cantilevered off the tire treads or otherwise positioned on the sides of the tire tread. The chain(s) can have a circumferential band that extends along the periphery around the surface (e.g., the tire treads) of the wheel. For example, the chain(s) can have a circumferential band that extends along the side(s) of the wheel. For example, the chain can have a diamond pattern that crosses over the surface (e.g., the tire treads) of the wheel. The chain(s) itself can be a common chain that is readily available. However, larger chain links may be desirable to produce longer contact times that will enhance the acoustic response from delaminations within the deck. This may require manufacture of customized tire chains with specific links for acoustic excitation, which could be readily accomplished as the design is deployed in a wider context.

The following examples relate to wide (e.g., full-lane-width) acoustic sounding of a road surface (e.g., a bridge deck). In some implementations, full-lane-width acoustic inspection and mapping of defects in a bridge deck can be achieved at normal traffic speeds using, for example, tire chain(s) on wheel(s).

Figure 28A:
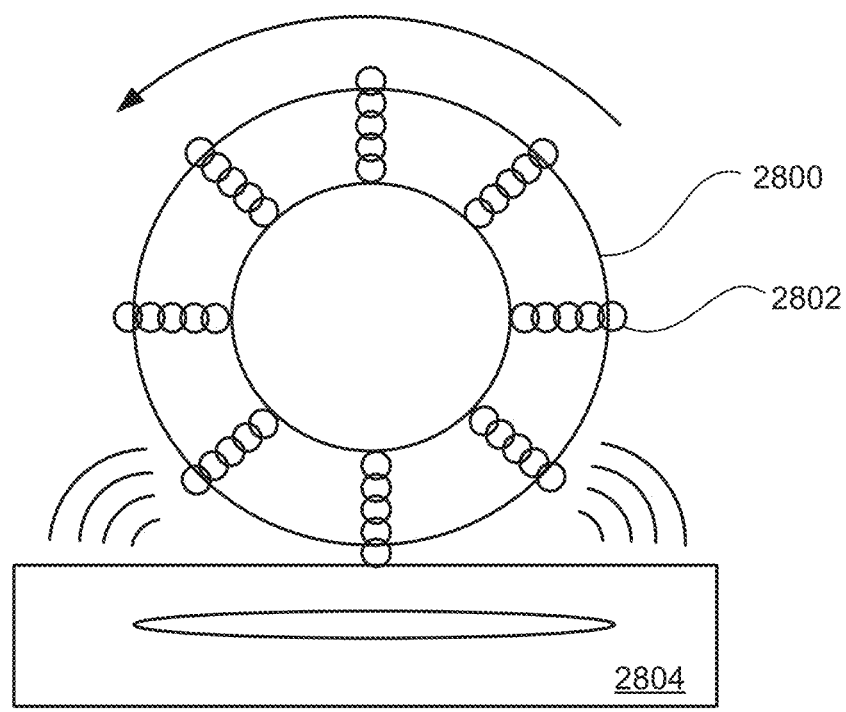
FIGS. 28A-C show examples of a rapid sounding approach for delamination defect detection.
Figure 28B:
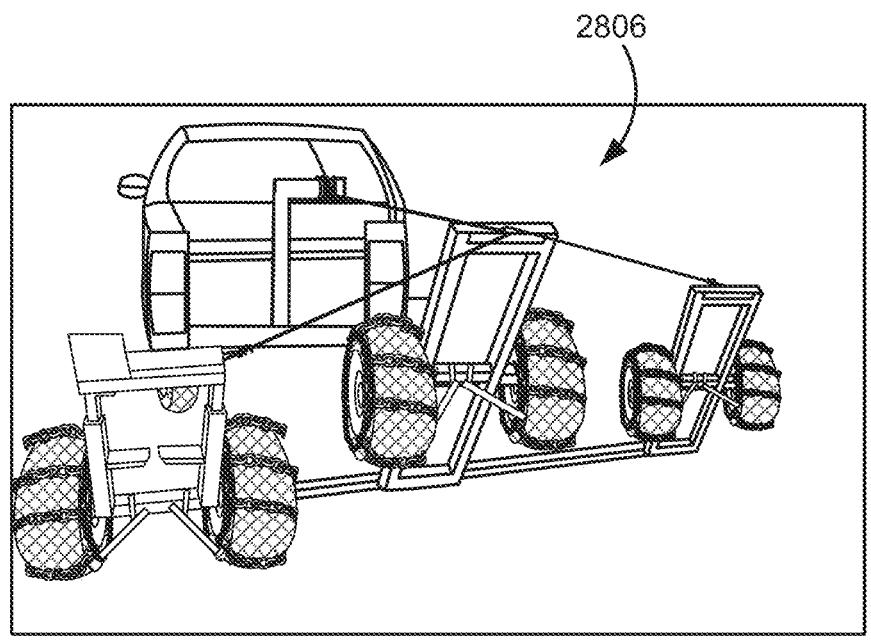
Figure 28C:
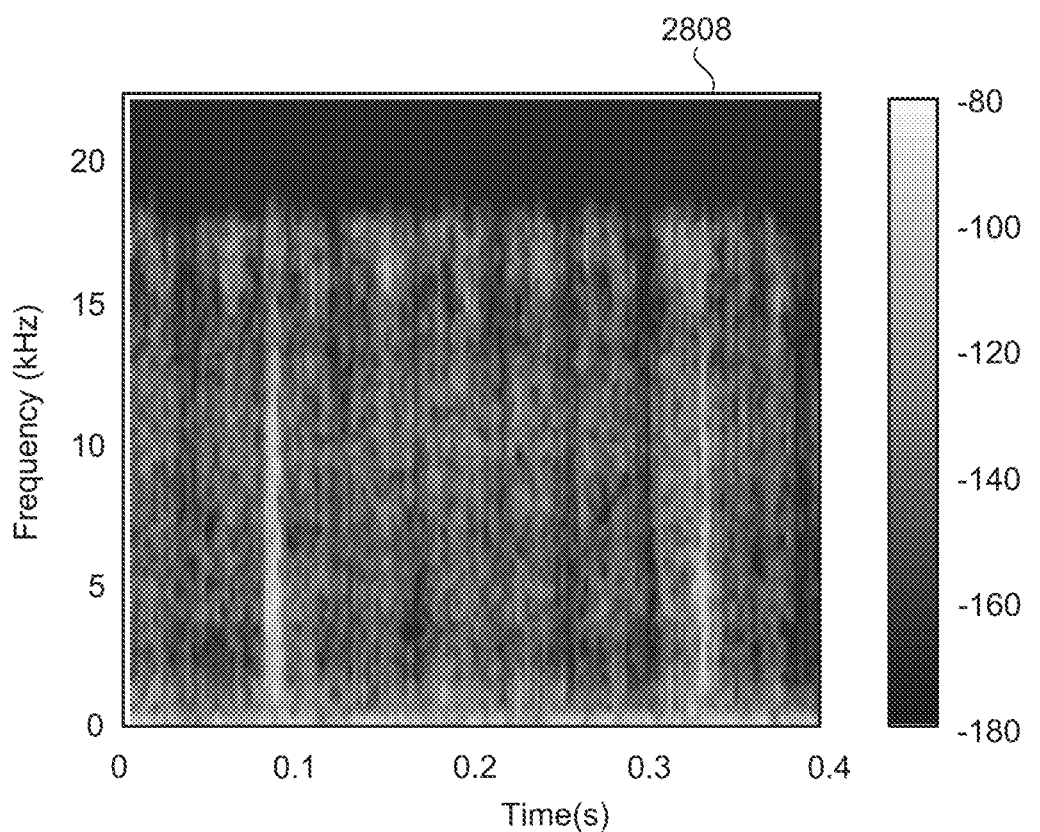

FIGS. 28A-C show examples of a rapid sounding approach for delamination defect detection. This can provide an overview of a rapid sounding approach for defect detection in surfaces, such as bridge decks. FIG. 28A shows a tire 2800 with chains 2802 repeatedly mechanically coupled to the surface of the bridge decks 2804. The acoustic response of the bridge deck may include an altered response that indicates the presence of subsurface cracking in the bridge deck known as delamination. FIG. 28B shows a trailer 2806 that includes six tires with chains and six microphones directed at the surface of the concrete where chain contacts occur. In some implementations, the entire trailer connected to a hitch and the movable elements of the trailer can be raised for travel and lowered for interrogation of surface (e.g., a bridge deck or highway pavement). FIG. 28C shows a spectrogram 2808 of the acoustic response of the trailer 2806 when the trailer 2806 was moving at a speed of 54 km/h. The units of the spectrogram 2808 are in dB. Repeated contact events of the chains are displayed. Two responses associated with delaminations are visible.

Achieving repeated mechanical contact of hard objects to excite flexural modes of concrete from a moving platform at normal traffic speeds is difficult because most elements in contact with road surfaces are designed to minimize noise and vibration. As explored above, it would be advantageous to have a contact element(s) that is constrained by a compliant material around a rotating element to deliberately produce noise and vibration that can be analyzed to identify material defects in the material over which it passes. Air-coupled acoustic responses then can be analyzed and maps of defects produced.

Parallel chains (across a tire tread or other compliant material, e.g. rubber or plastic), in an arrangement designed to rotate can be a configuration used to produce repeated, consistent (though stochastic) mechanical contacts constrained by a flexible membrane (the tire 2800) as shown in FIG. 28A. Other arrangements such as rods or bars of hard material such as metal straps can produce acoustic responses, and different arrangements of chains such as V's and multiple crosses and varied geometric patterns other than parallel arrangements can produce acoustic responses; nonetheless, parallel chains produce a good response in practice.

These steel chain links can then excite flexural response modes associated with delaminations through both dragging and striking the surface in a stochastic fashion—there is limited ability to exactly control the timing (because spacing of the chains can vary around the perimeter of the tire and can change during use due to movement induced by the shear stress placed on the chains upon impact with the surface being tested). Tightening of chains does dimensionally constrain the chains to the tires substantially and can reduce some variation in contact time separations and distance between contact events, but the chains on the tires have significant freedom of movement in operation. The chains in this arrangement generate interpretable acoustic responses. The use of tire chains that are already designed for vehicular use is also a significant advantage over other techniques in which a new apparatus would need to be road-tested.

Single or multiple hard contact elements could be placed around other materials, such as solid natural or synthetic rubber, plastic, foams, metal, wood, composites, or other single or layered materials that could constitute a rotational element. For example, metal rods, balls, other link elements, or other relatively hard materials could be deployed around a solid rubber rotating element or thin flexible membrane around a harder element (i.e. a tire, inflated or solid, around a rim). In practice a reduced stiffness such as that included in a pressure-inflated tire and attached suspension system results in more continuous contact with the deck surface. The trajectory of the hard contact element after striking the surface of the bridge is dampened by the softer elements holding the impactors to the rotating element, and thus the entire rotating composite element does not bounce as significantly during the fast rotations associated with moving at highway speeds.

An additional and critical consideration is the type of acoustic excitation that is achieved by the stiffness characteristics of the whole system and particularly the stiffness of the hard contact elements in their configuration around the rotating element. A reduced stiffness of the impactor elements (as is the case with chains around tires, or flexible rods with brass impactors instead of steel rods with steel impactors) results in longer contact times (mutual contact vibration) with the concrete during the contact event itself, thus imparting more energy into the low-frequency flexural modes that are the most prominent acoustic signal associated with delamination. As demonstrated in the material presented above, a strong reason that this technique is more successful than other methods that use a continuous piece of metal, like a gear, is that the chain elements have the ability to contact and vibrate freely with the surface, instead of requiring the entire rotating element to be of a single material and thus vibrate as, more or less, a continuous solid. While in some implementations there is not a specific pressure that is required to hold the contact elements to the surface, the chains are tightened so that when the tire is not in contact with a surface, and the tire is spun by hand so it rotates freely, the chain elements do not move substantially so there is not substantial visible or audible separation of the chains from the tire surface. Furthermore, impacts associated with compression of the chain links against the compliant tire are quiet so they do not cause acoustic interference with the acoustic response generated by the impacts associated with compression of the chain links against the tested surface (concrete). The thin, flexible membrane (tire) appears to support relatively independent motions and vibrations of the contact elements. Traveling at high speeds results in a small separation of the chains from the tire surfaces because of inertial (centrifugal) forces. The mechanical separation, or flexible linkage, or flexible, deformable, or reduced Young's modulus coupling (generally less than ~10 GPa), of the contact elements from/around the rotating support is thus a critical aspect of this invention. The rotating element and/or support might be made of a soft material such as rubber (or air-filled as in a tire) or it may simply include a rotating frame (air-filled) to which the flexibly coupled contact elements are attached. The support enhances the acoustic response and results in more continuous excitations along the surface (e.g., deck surface).

In the case of chains around a rotating element, there is also the additional advantage of repeated interactions with the concrete surface because they may be at least partially dragged as they pass across the deck surface after initial contact. Chains provide multiple interactions across the surface because they include many contact elements flexibly coupled together. Furthermore, the contact events are inherently stochastic in this configuration because spacing and contact duration and timing will change as the assembly rotates and deforms as it travels along the surface. Other similar elements, such as beads, rods, or balls on wires, could also be used (and have been used in other disclosed iterations) but may not be preferred.

In addition, pairs of the channels in the demonstrated implementation can move independently (e.g., FIG. 28B) because two channels and their associated wheels are each mounted on a metal frame attached to a main bar by a pair of hinges. This arrangement of channel pairs results in additional flexibility, and, if a single element strikes a material that causes a single channel to move upward and thus temporarily lose contact with the surface, the other channel pairs and contact elements maintain their contact with the surface, resulting in more complete mapping of the surface. Also, mechanically pairing the channels means that the extra weight derived from two tires (compared to one) further resists upward movement of a channel pair in the first place (when only one channel strikes a bump). Each of the individual channels could also be made to be coupled to the supporting vehicle independently of the others.

Solutions that have been explored in the past using completely stiff materials or layers or composites or combinations of those materials, such as gears from a single solid material, even when using a ball bearing hub, do not provide excitation as ideal as the preferred embodiment presented here and additionally do not maintain contact along a surface when traveling at high speed because of the lack of restoring forces (other than gravity) in the system. It also appears that using a larger size of tires (greater than 150-mm diameter in this case) yields a contact mechanism characterized by the chain elements contacting the surface at an angle more tangential to the surface (resulting in less vertical forces) and has increased dragging than using smaller-diameter gears as impactors. Considerations, as outlined above, about the contact element configuration, relatively free vibration, and the energy coupling can be taken into account in some implementations.

An embodiment in the form of a full-lane-width interrogation system can be constructed as shown in FIG. 28B. In this implementation, six (in other implementations, more or fewer could be used) microphones are connected to a multi-channel digitizer with a large dynamic range and flat frequency response across the expected audio range. The dynamic range was important so that the trailer would be able to successfully capture acoustic responses without changing amplifier settings as the trailer moved at speeds ranging from ~10 km/h to ~55 km/h (the upper speed was only limited by the posted roadway speed limits; it was not inherently limited).

A representative spectrogram of the acoustic response over 0.4 seconds when the trailer was traveling at 54 km/h is shown in FIG. 28C. This spectrogram shows many different features unique to the measurement approach. The individual contacts (initial strike and dragging) of the chain links occur at a rate of approximately 170 contacts per second. Coupled with the speed of the vehicle, these data imply that contacts occur at an average separation of about 9 cm. Because the chain is striking and being dragged across the surface of the deck, the acoustic response is broad with a bandwidth spanning about 17 kHz. A low-frequency response below 1 kHz also appears to be associated with each contact. It is visually evident that two contact events that occur at 86 ms and at 326 ms are significant. These contact events have substantial energy with a bandwidth of about 13 kHz that is clearly different than the other contact events. These contact events are the ones that are associated with internal delaminations of the bridge decks. The human ear is also able to clearly distinguish these contact events as being different from the surrounding contact events. In the demonstrated apparatus, the directional microphones are placed close to the contact locations so that very little ambient noise is captured relative to the contact event response. This close placement of the microphones is facilitated at high speeds because the contact elements are relatively constrained around the compliant material (the tire). The sounds of vehicles passing by the apparatus and the sounds of vehicles under the bridge are negligible in the acoustic record.

A psychoacoustic signal processing approach is used to guide the detection algorithms. Perceived acoustic sharpness increases as the spectral bandwidth of a sound increases from 1 khz up to 10 kHz. Thus, it is not surprising that the acoustic response associated with hammer strikes and hard objects striking a surface is perceived as a sharp sound. The signal processing strategy thus differentiates the different types of contact event responses.

Results of the signal processing strategy can be processed. FIGS. 29A-D show examples of acoustic record and signal processing results. FIG. 29A shows a raw acoustic record from all six channels of a trailer pass at 9.75 km/h. A region 2900 for each channel corresponds to the bridge deck including the approach slabs. FIG. 29B shows results from signal processing algorithms applied to the raw acoustic data at 9.75 km/h. These data correspond only to the audio samples associated with the bridge deck. The channel responses indicate that the acoustic responses from channel to channel are well isolated. FIG. 29C shows a raw acoustic record from all six channels for a trailer pass at 54.2 km/h. A region 2902 for each channel corresponds to the bridge deck including the approach slabs. The amplitude of the acoustic data is much larger than that observed at slower speeds. FIG. 29D shows results from signal processing algorithms applied to the raw acoustic data at 54.2 km/h. These data correspond only to the audio samples associated with the bridge deck. Normalization of the data yields amplitudes similar to that of the data processed from passes at lower speeds.

For example, the shapes of spikes in FIGS. 29B and 29D are about the same, at least the amplitudes thereof. In some implementations, the algorithm automatically responds to receiving input acoustic responses gathered at different speeds. Here, the spikes indicate possible delamination. In some implementations, adaptive filtering can be used on the fly, for example with long recorded segments in which the speed may vary more as opposed to, say, a case when the speed is relatively constant as the vehicle traversed the deck. Thus, baseline noise and acoustic energy information can be obtained and used dynamically to adjust the thresholds and normalization. This can be somewhat captured by operations to be described below with reference to FIG. 32.

The raw data in FIGS. 29A and 29C demonstrate that the amplitudes of the acoustic response are sensitive to the speed of the vehicle. As the speed of the trailer increases, the contact speed and frequency of the chains striking and being dragged across the concrete surface also increases substantially, and the responses are louder. Because of this influence on the amplitude of the acoustic response, the acoustic data for each pass are normalized by the average energy per sample from each inspection pass. This normalization procedure also permits the use of inexpensive microphones that do not require calibration prior to being used in this application. The lengths of the acoustic records for these runs are also substantially different. As is highlighted in the figures, estimated position information is used to determine the starting and stopping points in the data that correspond to the trailer tires being over the bridge deck. This post-processing procedure gives operators much more lenience in starting and stopping recording because, as long as the recording starts before the trailer is on the bridge deck and the recording stops after the trailer has left the bridge deck, the post-processing algorithms can determine when the trailer entered and exited the bridge deck and therefore isolate the data of interest.

Processing the signals produces plots as shown in FIGS. 29B and 29D. A dramatic reduction of the noise is evident and allows for even rudimentary visual interpretation of the signals associated with delaminations. The plots indicate that adjacent channels (1 and 2, 3 and 4, 5 and 6) do not have equivalent responses at the same times. For example, this demonstrates that the acoustic isolation between the different channels is sufficient for simultaneous data acquisition across the full lane width (because this arrangement allows for close placement of the microphones to the surface). Because a threshold is used to differentiate responses, the receiver-operator characteristics can be fine-tuned for varying sensitivity. FIGS. 29A-D demonstrate that the same algorithm can be used for analyzing data collected at low speeds and high speeds in real-world circumstances. The suitability of the algorithm for low and high speeds is unique for data interpretation and is achieved because of normalization of the acoustic record.

Figure 30A:
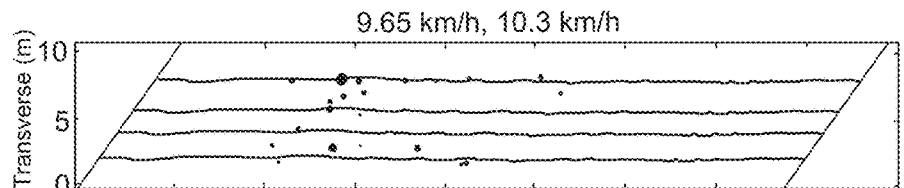
FIGS. 30A-H show examples of delamination defect maps.
Figure 30B:
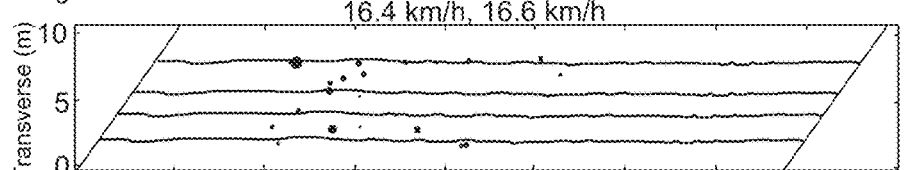
Figure 30C:
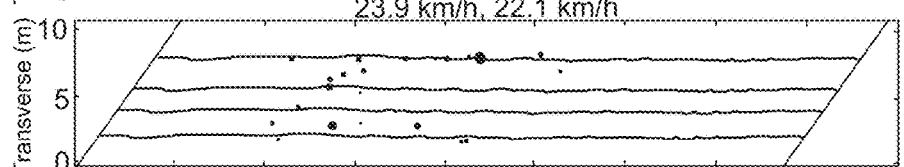
Figure 30D:
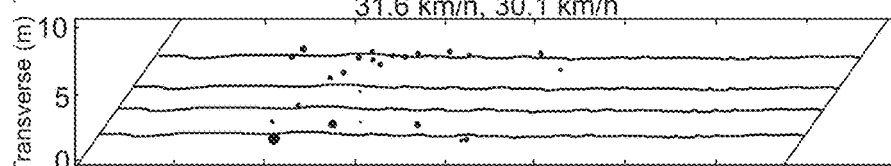
Figure 30E:
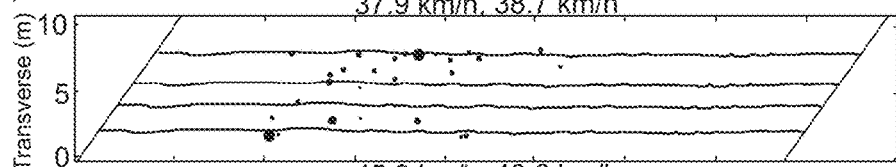
Figure 30F:
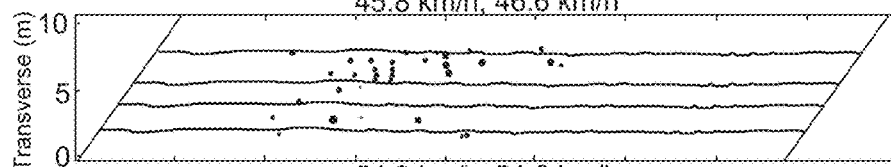
Figure 30G:
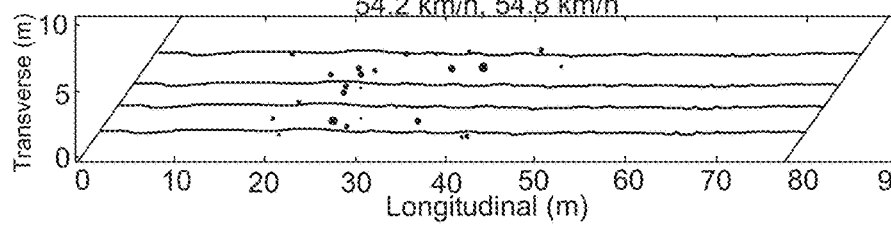
Figure 30H:
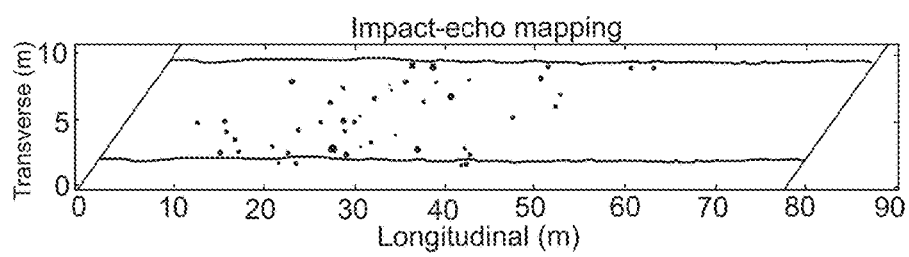

FIGS. 30A-H show examples of delamination defect maps. FIGS. 30A-G contain maps created from northbound and southbound passes. For each map, the first number is the speed of the northbound pass (bottom pass on each map), and the second number is the speed of the southbound pass (top pass on each map). The indicated areas correspond to the area that the trailer passed over. Larger circles are associated with defects with higher acoustic energy. FIG. 30H shows a defect map generated from multi-channel impact-echo apparatus. Four interleaved passes of the impact-echo apparatus were used to create this map. The indicated area corresponds to the area that the apparatus passed over. Markings are correlated with delamination defects.

In this example, the data represent acoustic responses generated by acoustic excitation of a bridge deck. Visualizing impact-echo data and plotting it on maps can be important. The maps in this disclosure show not only the location but also the relative severity of impact responses associated with delamination. Some responses are much stronger than others. In FIGS. 30A-H, the radius of each circle plotted indicates the square root of the relative energy above the set threshold. This approach also allows for visual interpretation of outliers that may be evident in the data. FIG. 30A shows data for southbound and northbound scanning passes. Even though the speeds vary by almost a factor of five, the data are consistent in terms of identifying areas of the deck that exhibit delamination. Notably, even the lowest acquisition speed documented here is faster than the fastest acoustic techniques recorded in the literature to date.

One of the hardest aspects of bridge evaluation is the lack of "ground truth." Ideally, cores could be taken of the entire bridge to determine the internal defects that exist. However, this is practically impossible. Additionally, because prior techniques, such as manual chain dragging, may be highly subjective, one technician may report very different levels of delamination, especially in areas where the damage is high. To provide an alternative measure for demonstrating the effectiveness of the data obtained by the high-speed scanner, impact-echo testing can be used. Impact-echo testing is a reliable technique, albeit much slower, for detecting delaminations. FIG. 30H is a plot of probable delaminations as measured using an automated impact-echo testing machine. The impact-echo testing required approximately two hours. FIG. 30H is highly correlated with the data in FIGS. 30A-G. The impact-echo data were also taken across the entire width of the deck and show edge effects that were not captured by the high-speed apparatus traveling down the centers of the lanes. Importantly, the impact-echo data show that the delamination defects in the bridge deck are concentrated from about 20 to 50 m across the deck. From the results of the impact-echo testing, the self-correlation between the different high-speed scans, and the results of manual chain dragging at selected locations on the deck, the accuracy of the high-speed approach is demonstrated. It is important to note that the automated, high-speed approach took minutes (and sometimes just seconds) to acquire the data in the field, and plotting the defect maps was achieved with post-processing algorithms in a matter of seconds.

The use of chains on tires for performing high-speed excitation and obtaining acoustic measurements together with the signal processing scheme presented here can allow a large area to be scanned at high speed without the need for traffic control. The data are of sufficiently high resolution to plan for project-level rehabilitation (approximately 1-meter spacing across the deck including shoulders may be typical for this type of work), and this approach could be expandable to a greater number of channels for even higher spatial resolution. Multiple passes can also be made with deliberately different transverse offsets with each pass to develop data sets that can be joined to achieve a higher spatial resolution. Furthermore, the collected data can be readily reduced to a single metric, such as the percentage of the deck area that is delaminated, to support network-level analyses that are used to prioritize rehabilitation of different bridge decks.

Fusing data with other rapid nondestructive techniques can result in more accurate diagnosis than one technique alone. For example, inspection results from unmanned aerial vehicles can supplement this approach. Data obtained from different sources can be overlaid on maps and images for comparison. Beyond impact-echo data, specific other types of test data that could be overlaid with data from the high-speed scanner include resistivity data, half-cell potential data, infrared imaging data, and smoothness data, for example.

Because of the great economic need to maintain and preserve infrastructure, new technologies such as those described herein are in high demand. With readily available components used to create a compliant interface to which contact elements are attached for stochastically exciting the flexural acoustic modes of concrete bridge decks, the present disclosure demonstrates that acoustic interrogation of infrastructure elements such as bridge decks can be achieved at normal traffic speeds.

Figure 31:
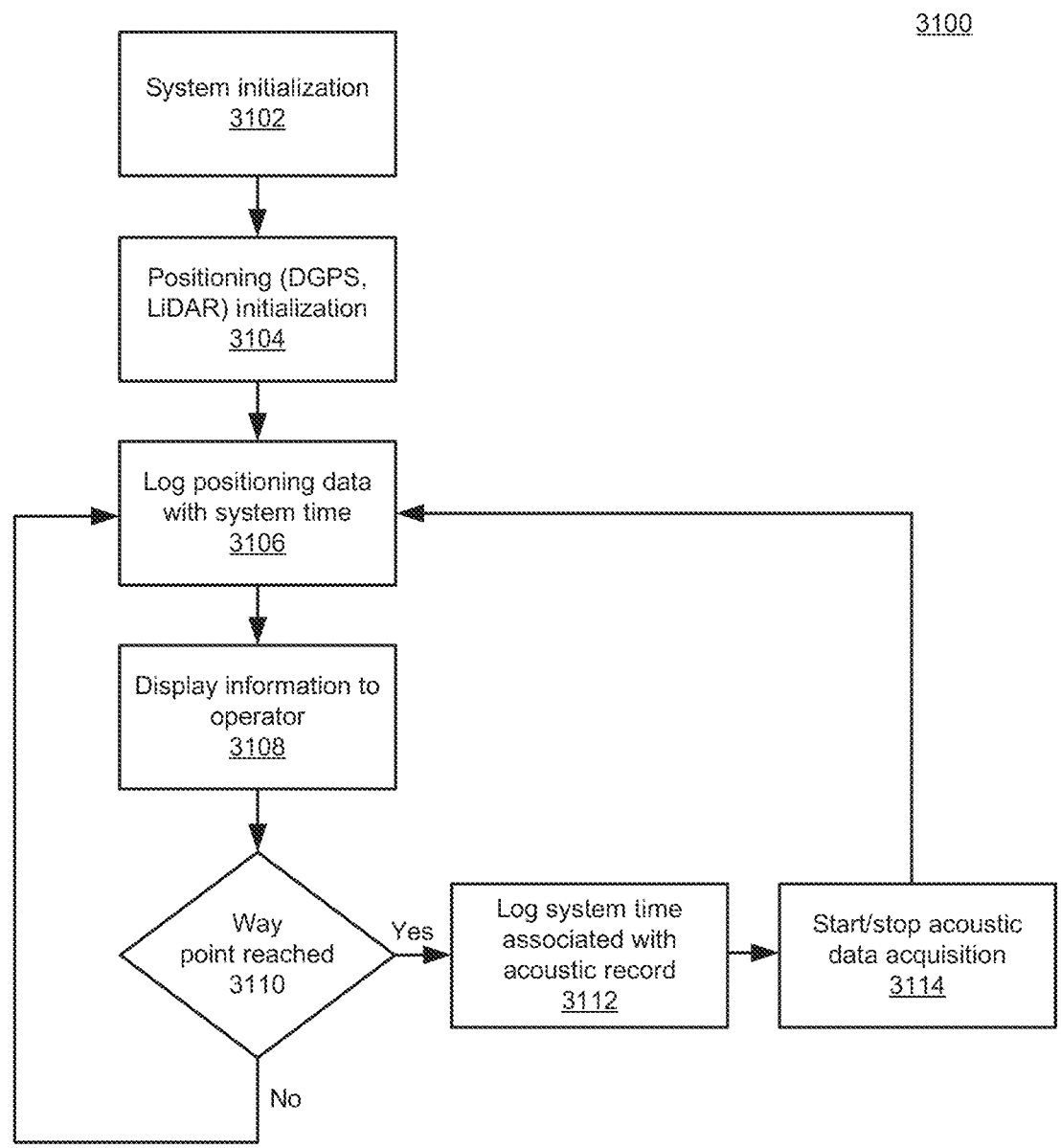
FIG. 31 shows an example of a diagram illustrating how data can be acquired in the field.

FIG. 31 shows an example of a diagram illustrating how data can be acquired in the field. The following describes an example of an apparatus that can be used for gathering the data.

A complete trailer can be constructed to carry out the rapid nondestructive testing outlined previously. The trailer can include an assemblage of three trailers. The trailer pieces can be cut and welded back together so that a center-to-center wheel spacing of 50.8 cm (or another wheel spacing) can be achieved. These three modified trailers can then be attached by hinges to a common steel (e.g., square) bar. The bar can be extendable with locking bolts or pins so the overall width of the trailer can be reduced to within approximately 2 meters. The steel bar can be extendable to create a distance of 50.8 cm between all of the tires when the trailer is fully extended.

In some implementations, an apparatus can be expanded to be as wide as a standard lane or, with a wide-vehicle permit, even wider than a standard lane (3.7 meters). Less than all of the apparatus, for example half the apparatus, can be deployed. For example, this can be applied if only a shoulder were to be interrogated. If each of the different pairs of channels can be deployed semi-independently, different channel arrangements are possible. In addition, offset rows of wheels (separated in the longitudinal direction) could be implemented to increase the area of interrogation.

The three trailer segments can be attached to each other by steel cables to a common connection point. A winch (e.g., an 1100 kg-rated winch) equipped with a steel cable can be used to raise and lower the hinged trailer portions by attachment directly to the common connection point.

A set of tire chains (e.g., 4.80×4.00×8 2-link) can be mounted securely around each of the six tires. For each pair of tires, a pair of directional microphones can be mounted so that they can be directed towards the impact point where the chains would strike the bridge deck surface. All (or a portion) of the microphones can be connected by cables (e.g., XLR cables) to an audio interface. The sampling rate for the audio can be 44.1 kHz. The audio interface can be connected to an attached laptop computer using a cable (e.g., USB cable).

For positioning, differential global positioning system (DGPS) data can be obtained through a GPS unit. The GPS unit can be connected to an attached laptop computer using a cable (e.g., USB cable). Additionally, position information can also be obtained through, for example, LiDAR. A board can be used to interface to the LiDAR module. This board can also be connected to an attached laptop computer using a cable (e.g., USB cable).

In some configurations, acquisition of audio and position data can all be coordinated on a computer (e.g., laptop) through a custom interface (e.g., Python interface) and graphical user interface. All of the streams of data can be synchronized to the computer universal time so that audio samples can be associated with interpolated position information through data post-processing In a process 3100, a system can be initialized at 3102. At 3104, position can be initialized. For example, this can involve a DGPS and/or a LiDAR system. At 3106, positioning data can be logged with system time. At 3108, information can be displayed to an operator. At 3110, it can be determined whether a waypoint has been reached. Waypoints may be preprogrammed or may be determined by a user dynamically in the field, such as just before entering a bridge deck area or just after leaving a bridge deck area. If a waypoint has not been reached at 3110, the process 3100 can return to 3106. If a waypoint has been reached at 3110, system time associated with the acoustic record can be logged at 3112. At 3114, acoustic data acquisition can be started or stopped.

Figure 32:
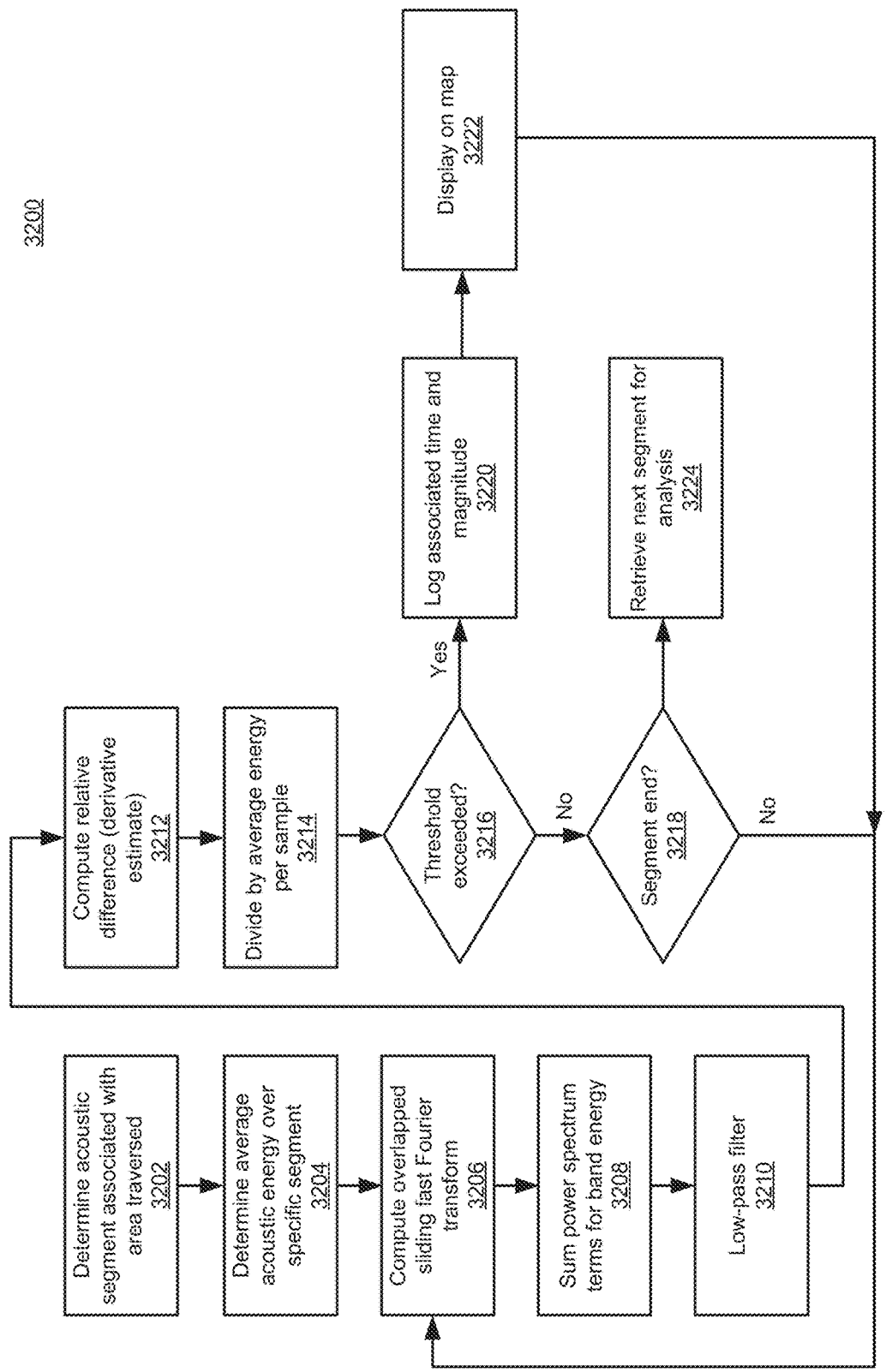
FIG. 32 shows an example of processing of acoustic data associated with areas.

FIG. 32 shows an example of processing of acoustic data associated with areas. For example, the areas can be on a bridge deck or any other surface to be interrogated. The areas can be large or small, depending on the driver's speed, the area of interest, and the variability of the driver's speed. Normalization can occur at many different places (for example, before FFT computation); however, that step can be necessary to be able to process signals that are recorded at different speeds (which results in different amplitudes of the acoustic response) and to account for other differences including, but not limited to, different amplitudes resulting from different microphone spacing relative to the surface, microphone spacing relative to the contact element interface with the surface, differences in microphone sensitivity, and/or differences in microphone amplification. Different combinations of time-domain and frequency-domain processing could achieve similar results in this signal-processing scheme.

All post-processing of data can be performed using a program such as MATLAB. In post-processing of the data, position information can be used to determine the universal computer time when the first trailer wheel crossed onto the bridge and when the last trailer wheel crossed off of the bridge. These times can then be used to cut down the acoustic data to smaller segments that only include the relevant samples corresponding to positions when the excitation would be on the bridge deck.

Processing of the acoustic data can include first computing the average energy per sample for the entire acoustic record. This can be important because different traveling speeds can result in different acoustic magnitudes. Additionally, for cost reduction, microphones may not be calibrated and/or the audio interface may not be a calibrated unit. So, the first step can be to determine the average energy.

In one implementation, a spectrogram including 256-point rectangular-window discrete Fourier transforms can be computed, with an overlap window of 150 points. For a sampling rate of 44 kHz, 256 points corresponds to approximately 5.8 ms, which at 65 km/h corresponds to a distance of approximately 10 centimeters (which is on the order of the spacing of the chains). Too many points would lead to blurring of data spatially, and too few points could result in lower resolution. These parameters can be modified but were chosen specifically for this implementation because they perform well in this implementation. The power spectrum estimates for the frequencies between 1.5 kHz and 9 kHz can then be summed together to give a band energy for each of these 256-point segments. Again, these frequencies can be slightly modified, but they represent expected frequencies of acoustic responses for the material and geometrical parameters common to delaminations in concrete bridge decks. For systems of other materials and geometrical parameters and features, these frequencies can be different. A low-pass filter can then be applied to this vector of sums to remove any spurious signals. The difference of adjacent elements of this vector can then be computed and divided by the average energy per sample to form a feature vector. Features that are greater than a predetermined threshold can then be collected. The time of selected features in the acoustic record can be used to plot the features on a map of the bridge deck. The size of the plotted feature can be determined by the square root of the ratio of the feature value divided by the threshold. For all data in this analysis, the same threshold can be used for all data. This is shown in FIG. 32. Having the same threshold for all of the data is advantageous when processing multiple data and making comparisons. However, the threshold can be different based on different material, weather, speed, or other geometric considerations, as well as trade-offs between the false alarm rate and power of detection desired for given areas of material and the intended use of the data.

Algorithms can normalize impacts at different speeds. This can allow the system to obtain similar or compatible data whether the speed at which the acoustic response was collected was a high, medium, or low speed. The dynamic range can be high. For example, traversing the bridge deck (or other surface) at 10 km/h can be relatively quiet. For example, traversing the bridge deck (or other surface) at 50 km/h can be relatively noisy.

In a process 3200 shown in FIG. 32, an acoustic segment associated with the area traversed can be determined at 3202. For example, the system can chop up the signal in time so that it is associated with the particular area of interest.

At 3204, an average acoustic energy over the specific segment can be determined. For example, the average can change because of the speed.

At 3206, an overlapped, sliding fast Fourier transform can be computed. For example, a spectrogram can be generated.

At 3208, power spectrum terms for the band energy can be summed. For example, spectrum terms from the spectrogram can be summed.

At 3210, a low-pass filter can be applied. In some implementations, this is not application of a low-pass filter in the traditional sense. For example, the low-pass filter may not be applied directly to the acoustics. Rather, the low-pass filter can be applied to the relatively noisy time waveform (energy versus time) in a low-frequency region.

In some implementations, more than one channel of acoustic exciter can be used. This can involve using multiple sensors such as microphones. The microphones can be placed either closer or farther away, and that will influence responses. Multiple microphones can be used to interrogate a single impact location. In this implementation, the microphones have a directional acoustic receiver pattern so that they can filter out ambient noises and other responses from adjacent channels. This could also be performed using beamforming techniques using multiple microphones to determine the acoustic responses during impacts.

FIGS. 33A-D show examples of images from a run. These examples involve a truck 3300 that tows a trailer 3302 having multiple acoustic exciters 3304. For example, each of the acoustic exciters 3304 can include a wheel provided with impactors (e.g., chain links). The chain links can serve for triggering acoustic excitation of at least part of a surface (e.g., the road surface). Microphones can be provided for the respective acoustic exciters 3304. In some implementations, the shown configuration can have six of the acoustic exciters 3304, six microphones (one for each of the acoustic exciters 3304). For example, each microphone can deliver a signal into a respective channel of the detection system, and the implementation can then be considered a six-channel configuration. In some implementations, two or more microphones or other sensors can feed into the same channel. For the data, the measurements can be taken without stopping on either approach or departure from the bridge deck.

Figure 33A:
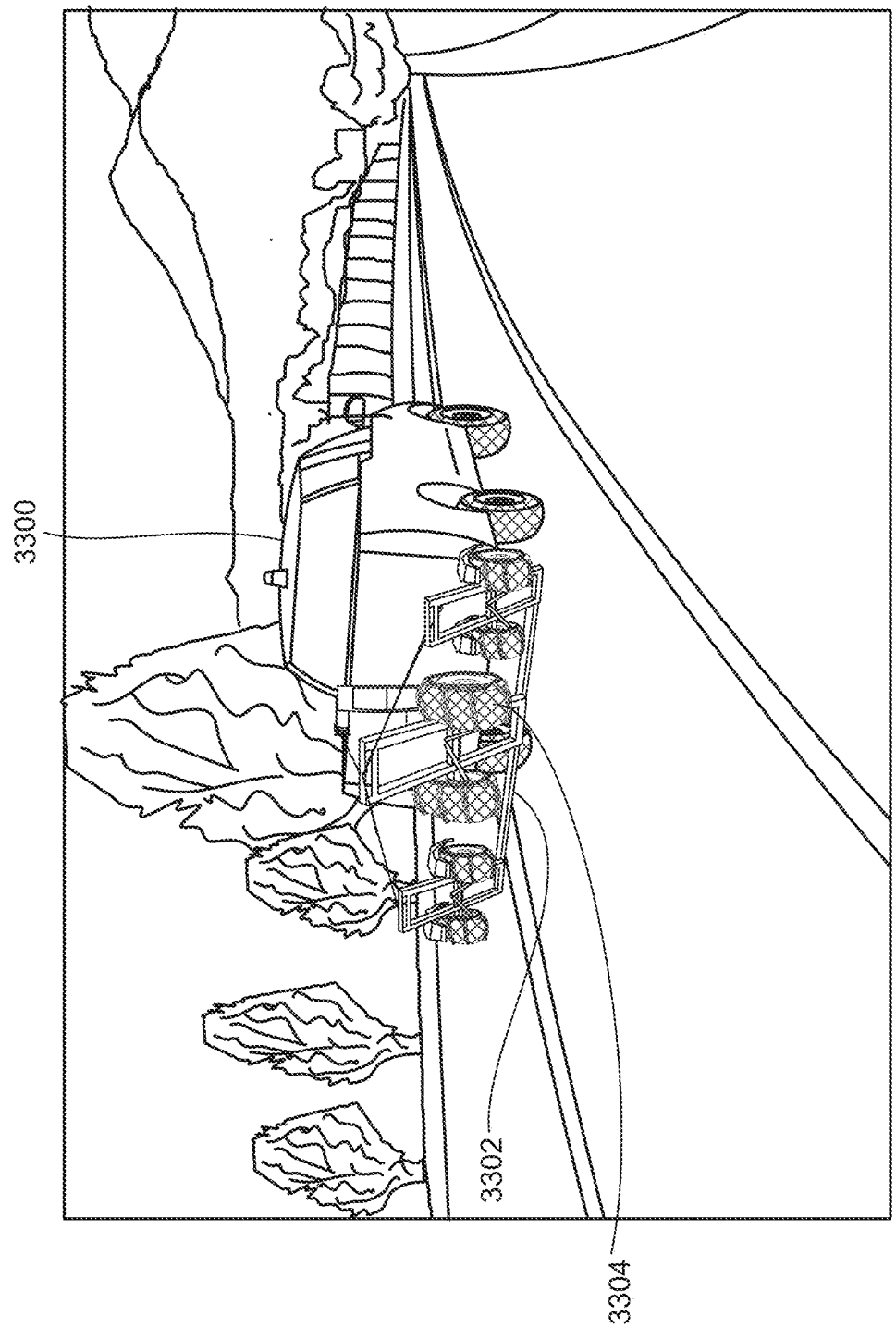
FIGS. 33A-D show examples of images from a run.
Figure 33B:
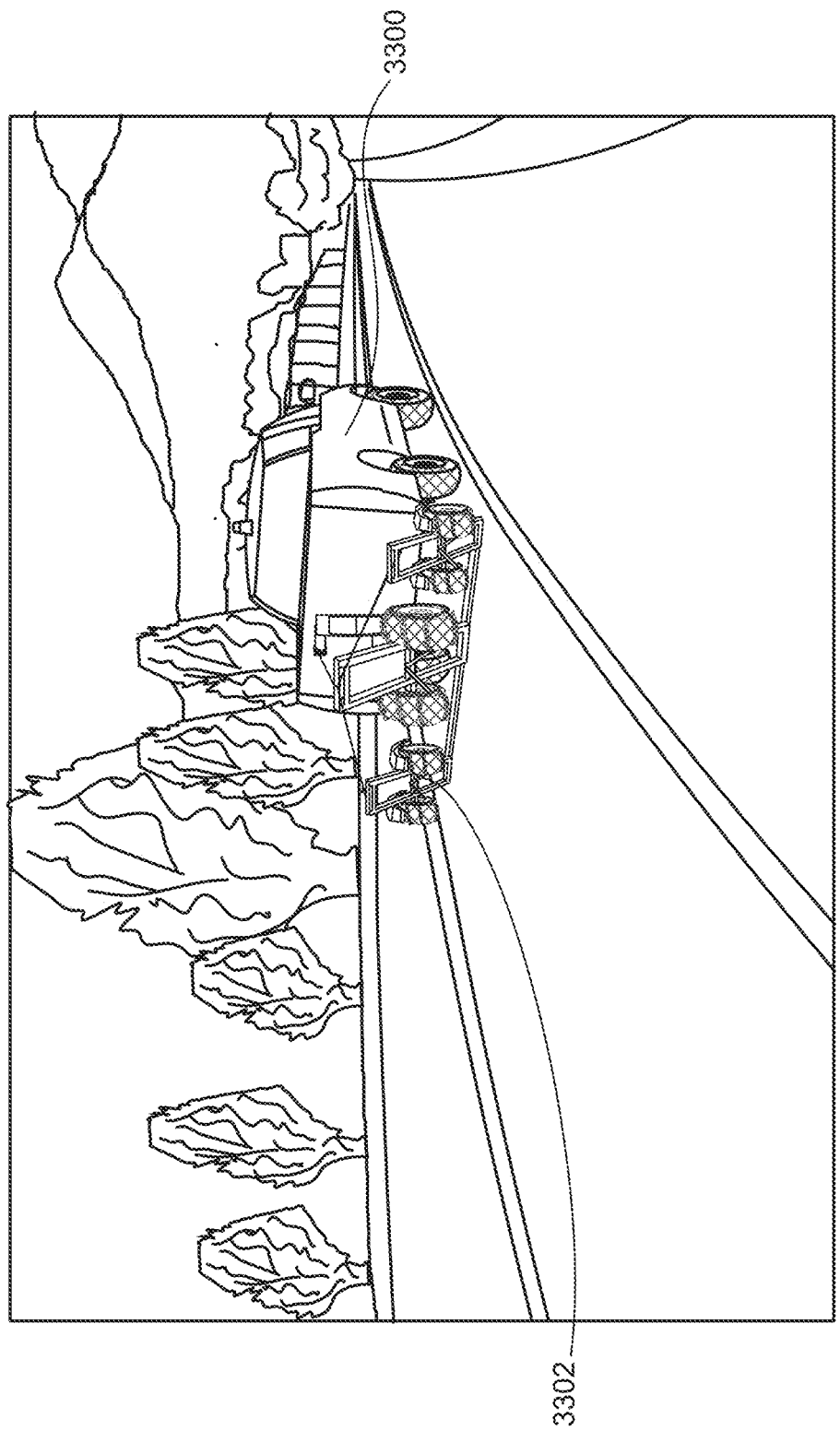
Figure 33C:
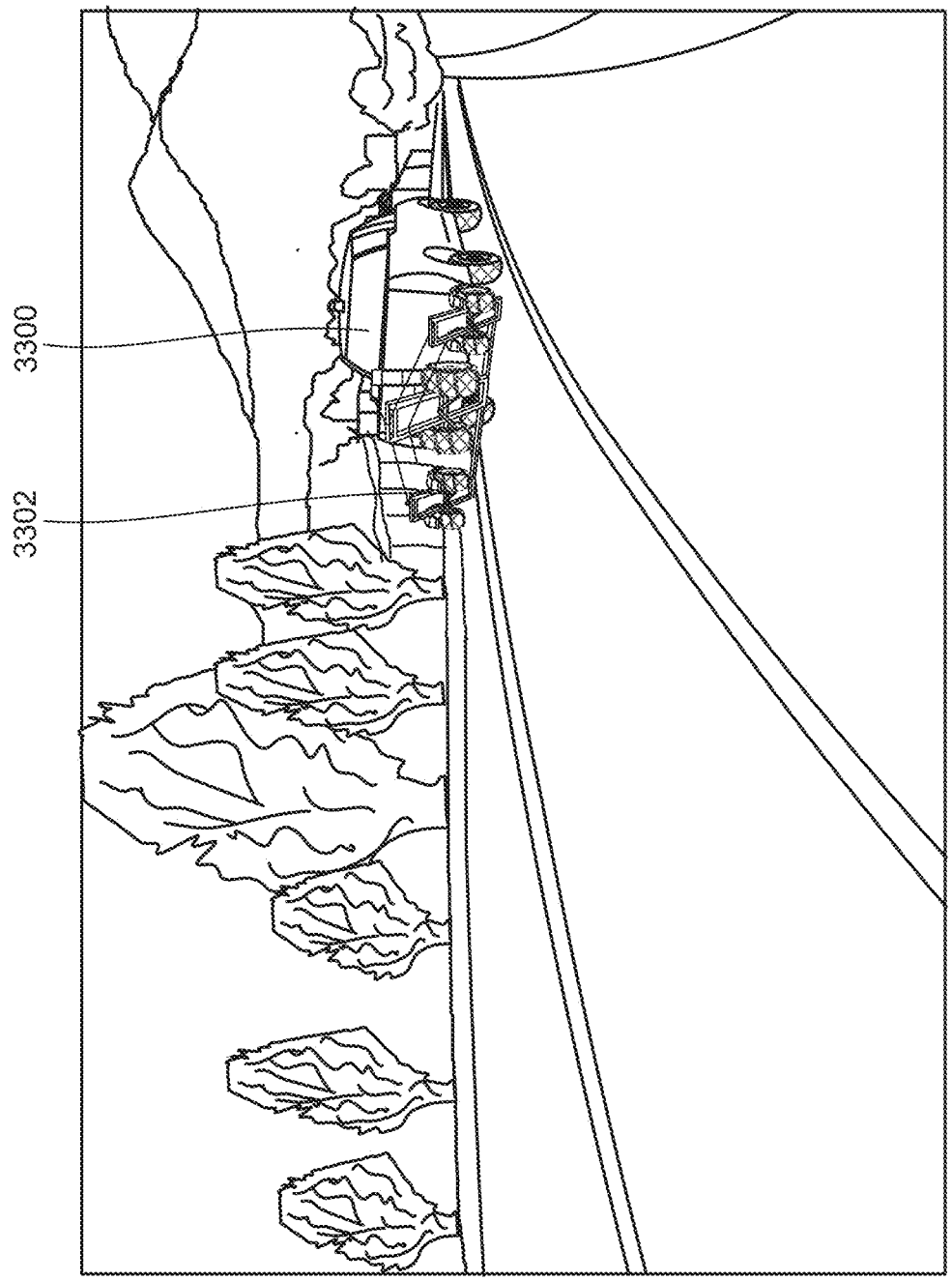
Figure 33D:
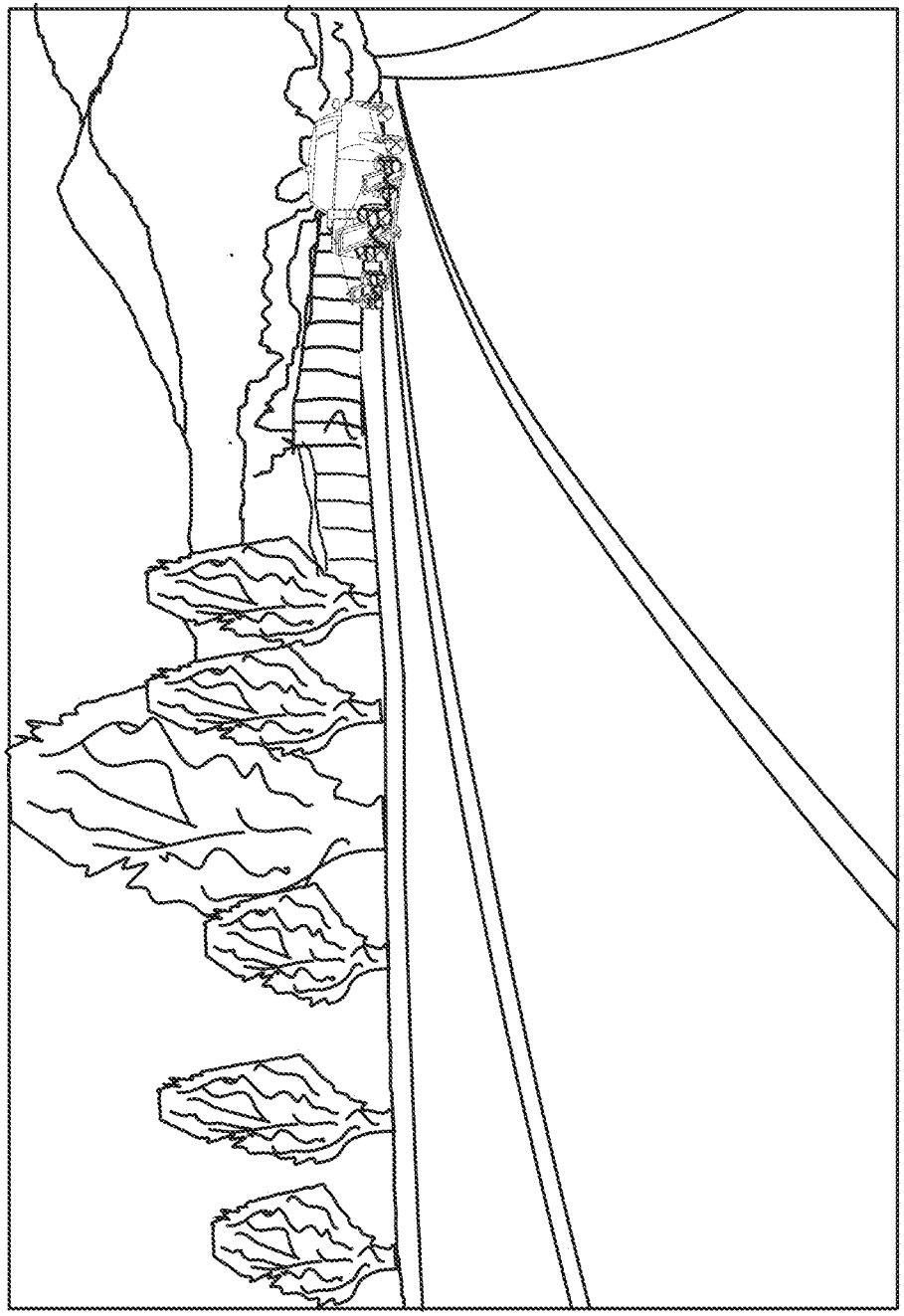

From FIG. 33A to FIG. 33D, the trailer 3302 changes from first suspending the acoustic exciters 3304 in the air (e.g., FIG. 33A) to then allowing them to contact the road surface (e.g., FIG. 33D). In some implementations, the trailer can be lowered and raised without personnel leaving the truck cab, for example by using a remotely controlled actuator.

FIGS. 34A-G show other examples of images from a run. From FIG. 34A to FIG. 34G, the trailer 3302 changes from first allowing the acoustic exciters 3304 to contact the road surface (e.g., FIG. 34A) to then suspending them in the air (e.g., FIG. 34G).

Figure 34A:
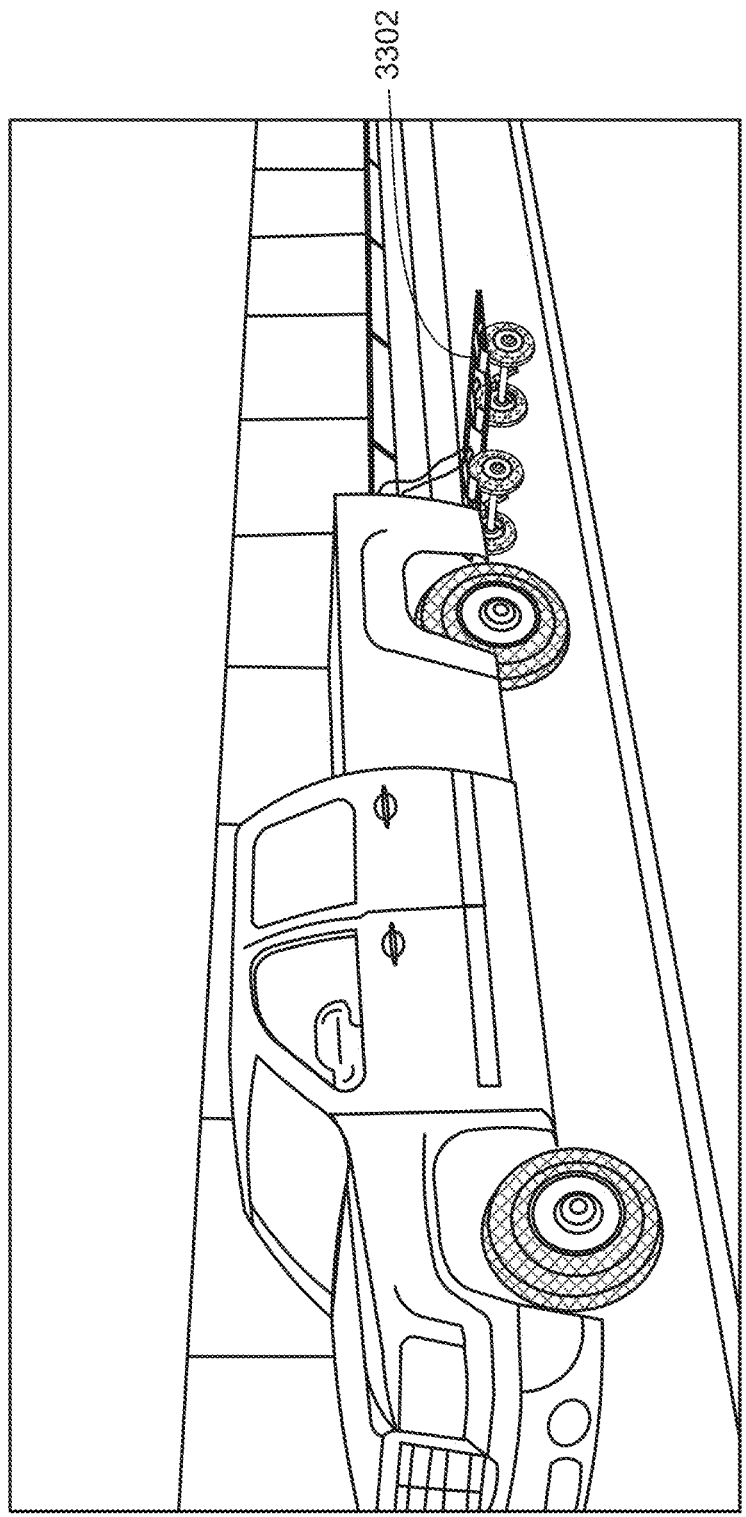
FIGS. 34A-G show other examples of images from a run.
Figure 34B:
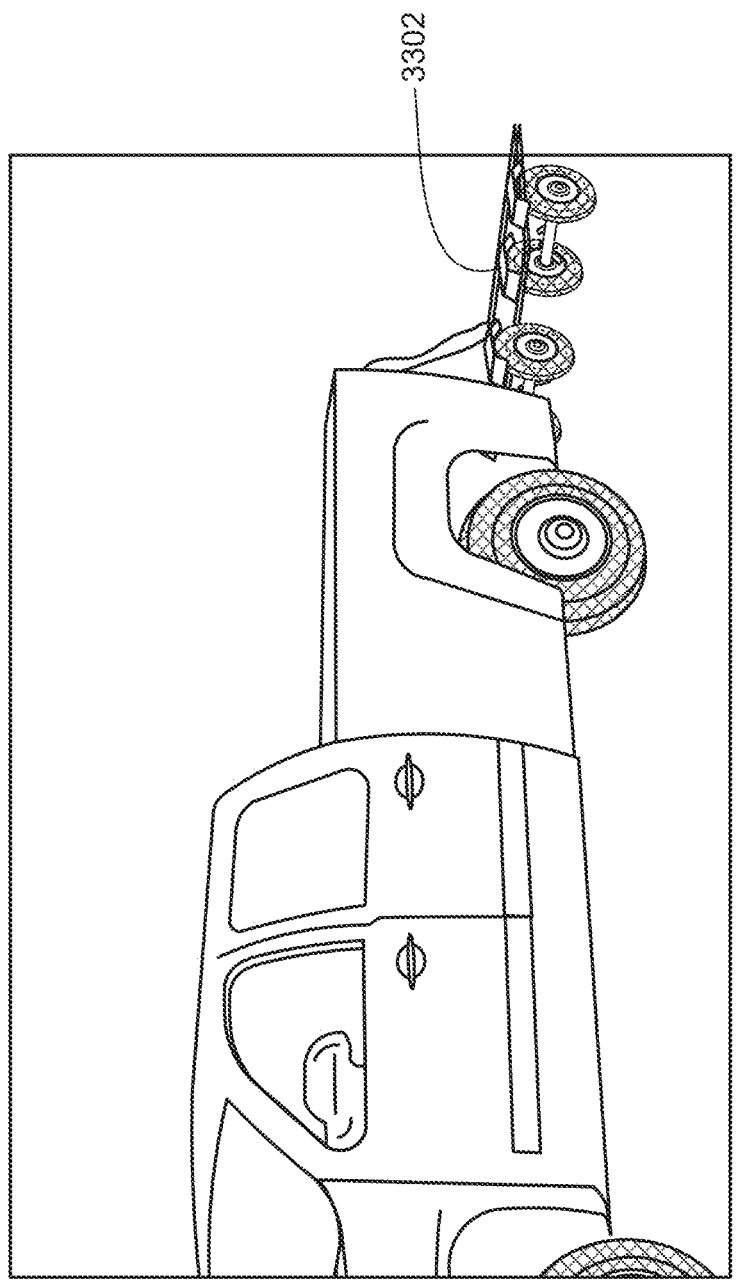
Figure 34C:
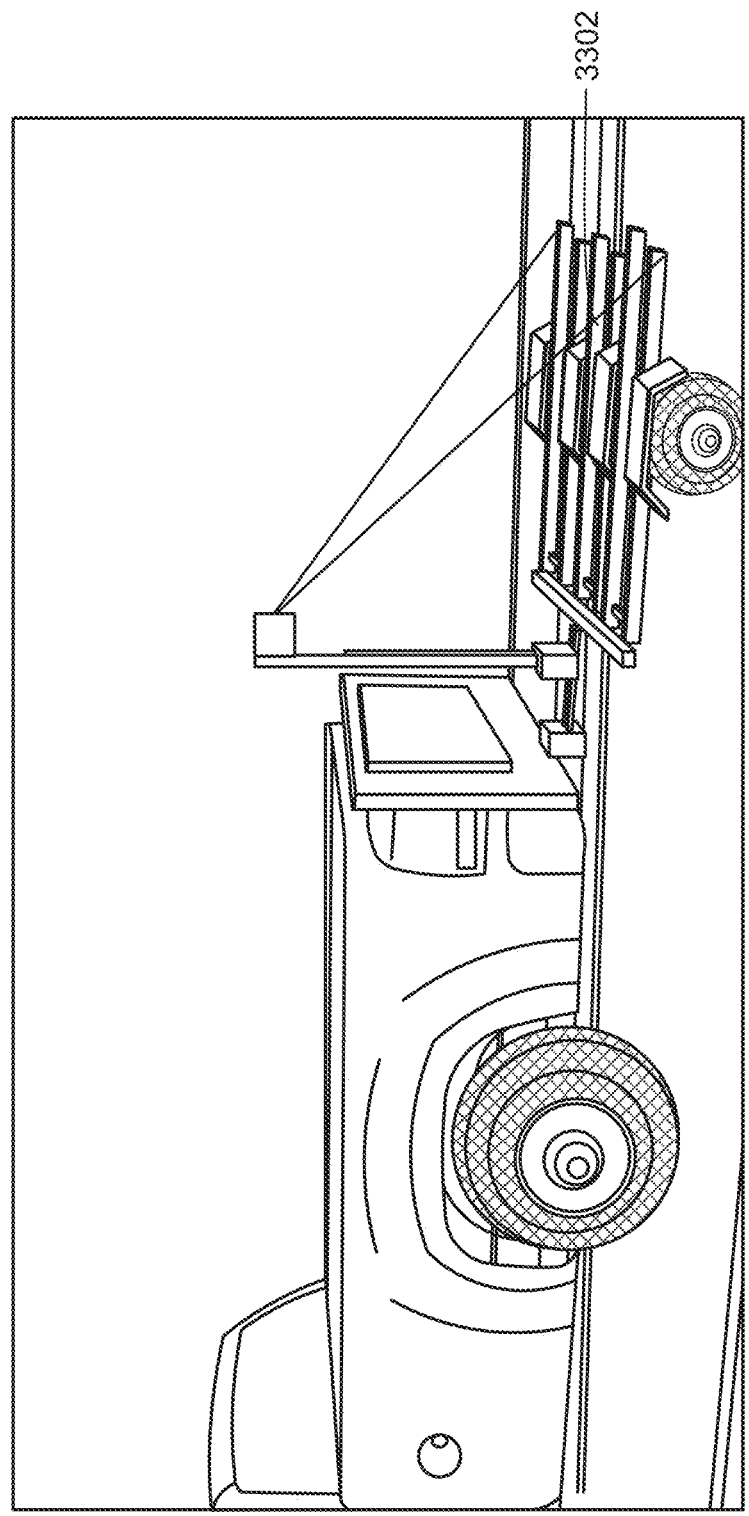
Figure 34D:
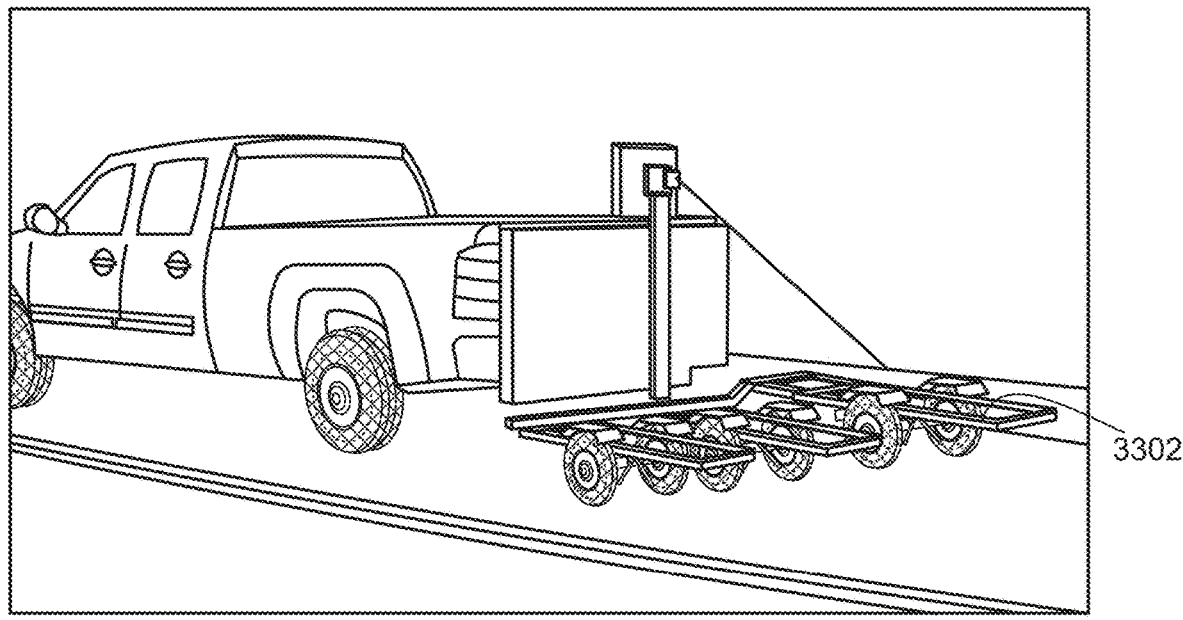
Figure 34E:
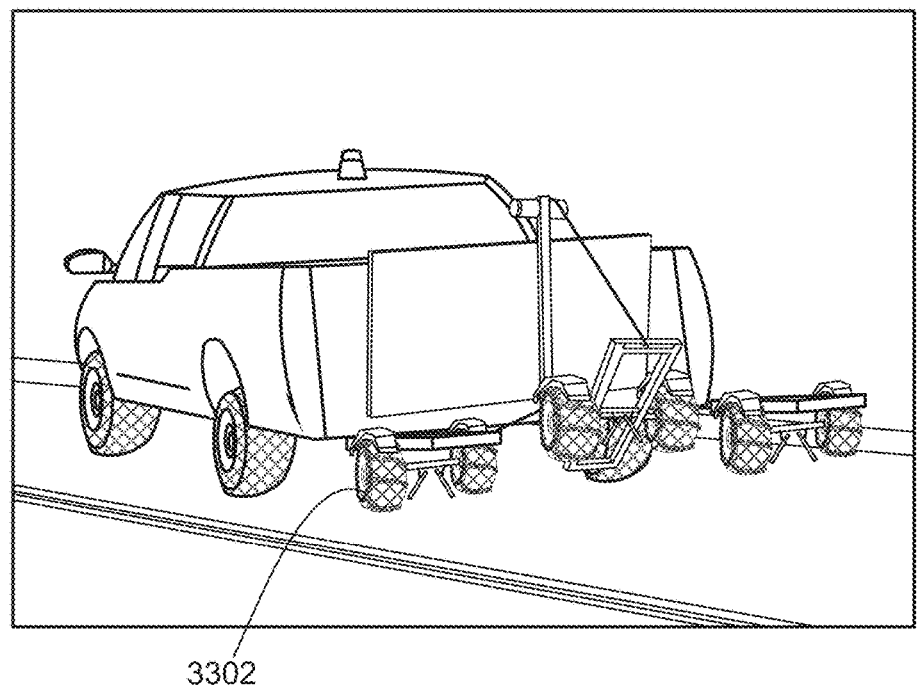
Figure 34F:
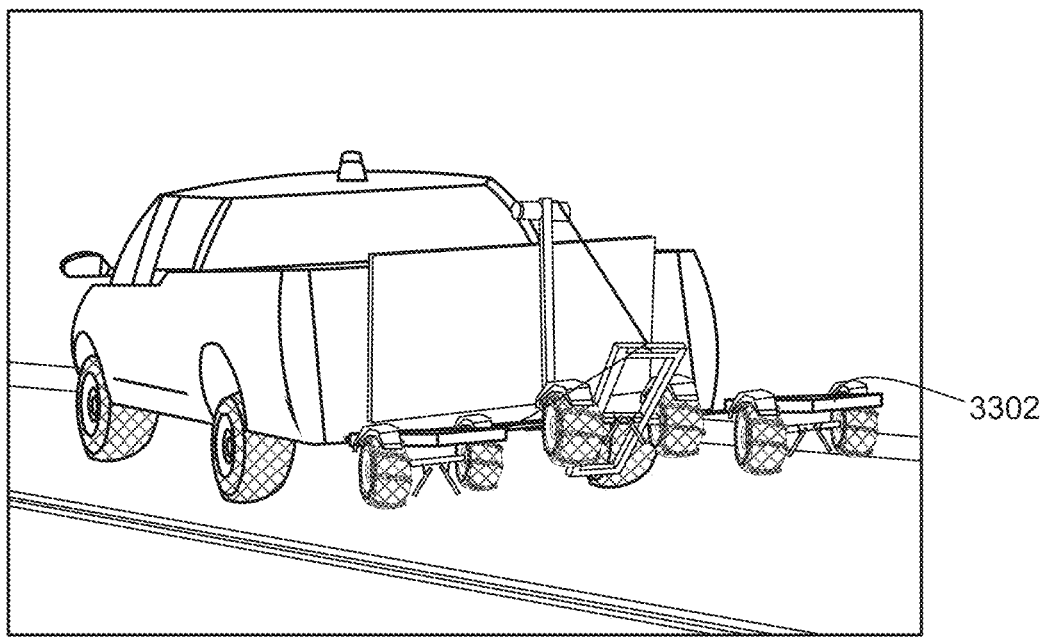
Figure 34G:
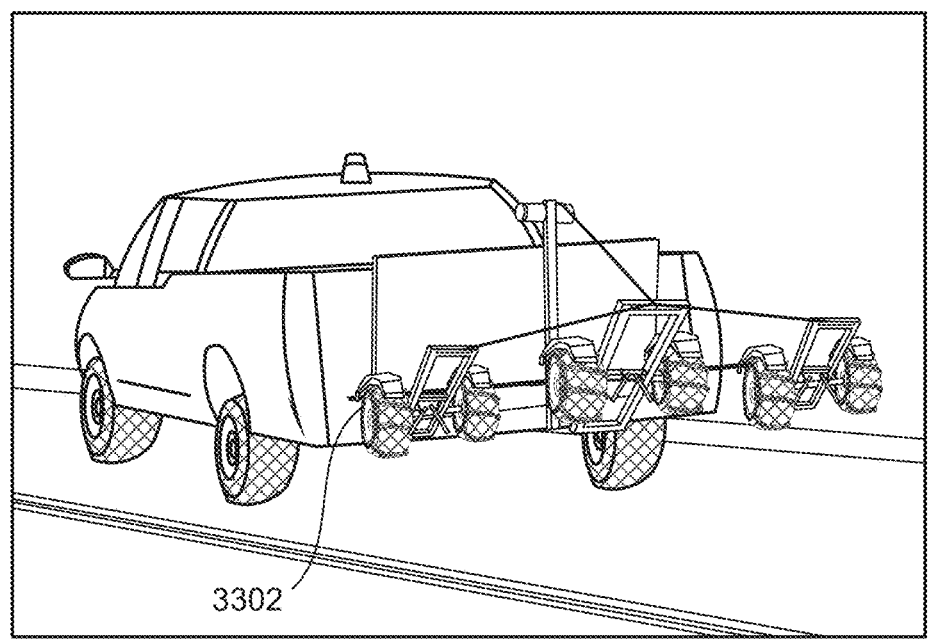
Figure 34H:
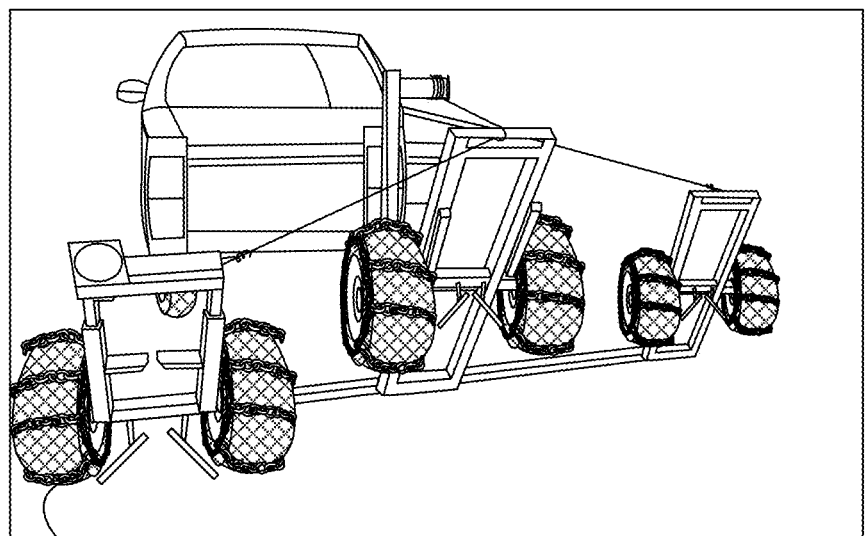
FIGS. 34H-L show examples of a trailer.

FIGS. 34H-K show examples of the trailer 3302. FIG. 34H shows all the different elements of the acoustic exciters 3304 in a raised, stowed configuration. For example, this configuration can be used for transport to a bridge deck or other surface to be interrogated, and/or to facilitate service of the acoustic exciters 3304 or other system components.

Figure 34I:
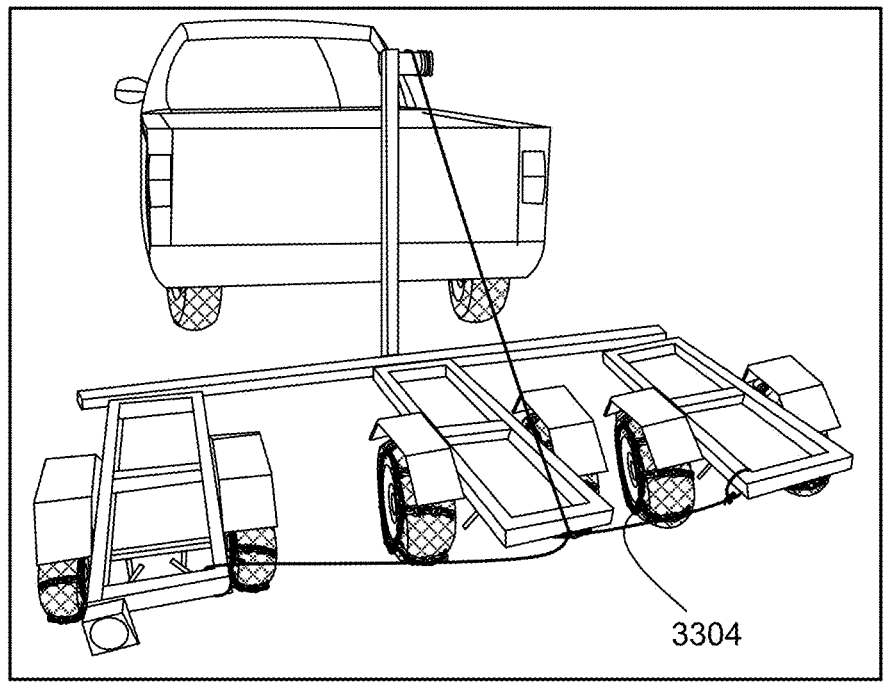

FIG. 34I shows a deployed configuration of a trailer with six channels on the ground. For example, the acoustic exciters 3304 can then be resting against the ground surface. In some implementations, the channels can have some independence of movement. For example, some or all of the channels can have separate hinges. In some implementations, the trailer can be adjustable in width. For example, the outer channel(s) can be slid between a fully-extended position and at least one less extended position (such as a stowed position). Bolts on the main rail can keep the channels (i.e., the acoustic exciters 3304) in those extended positions. However, they can slide inward for more compact storage or to reduce the width of the trailer. Steel cables can allow for raising and lowering of the trailer.

Figure 34J:
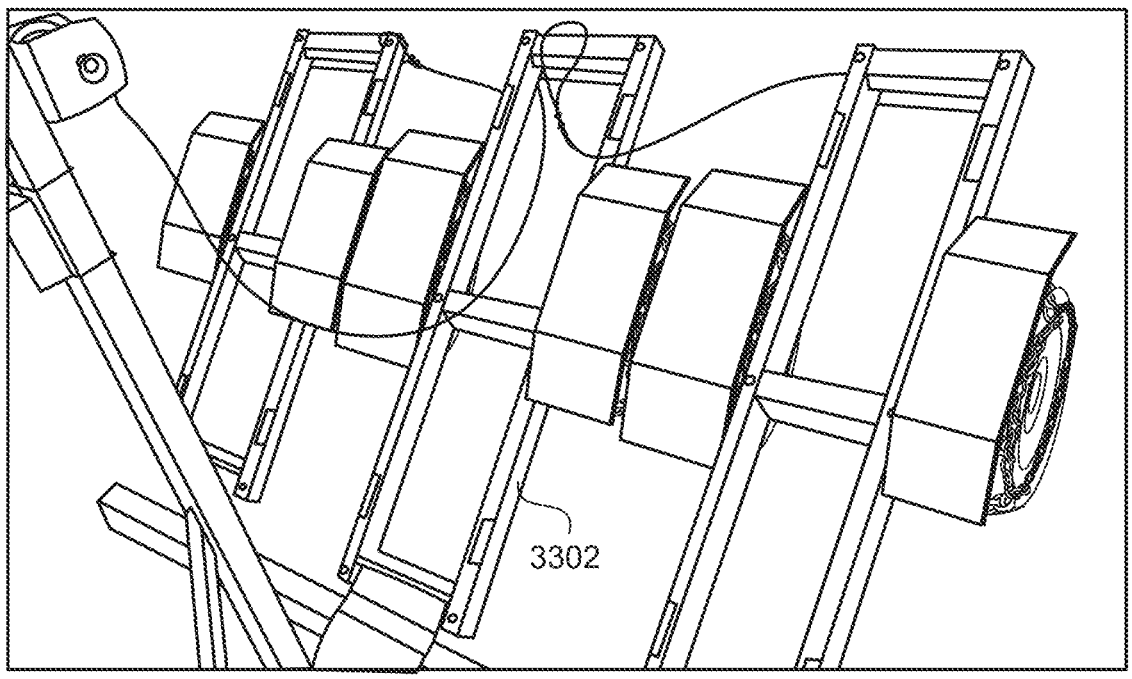
Figure 34K:
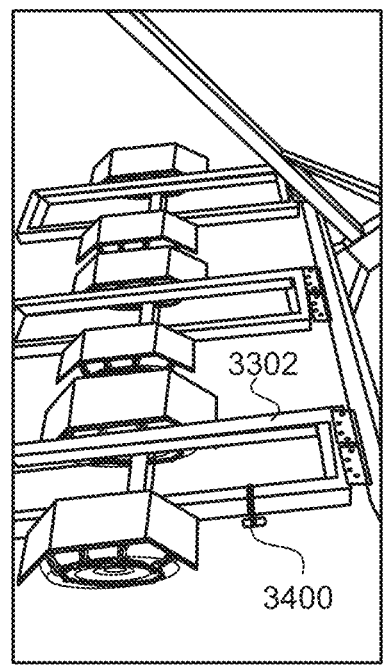

FIG. 34J shows the trailer 3302. Here, the trailer 3302 is not in the extended state so that it can be stored in a much narrower space. FIG. 34K shows the trailer 3302 resting on the ground. A LiDAR unit 3400 is mounted on a segment. For example, the LiDAR unit can facilitate location determination, such as to estimate the position of the trailer 3302 on a bridge deck or other structure.

Figure 34L:
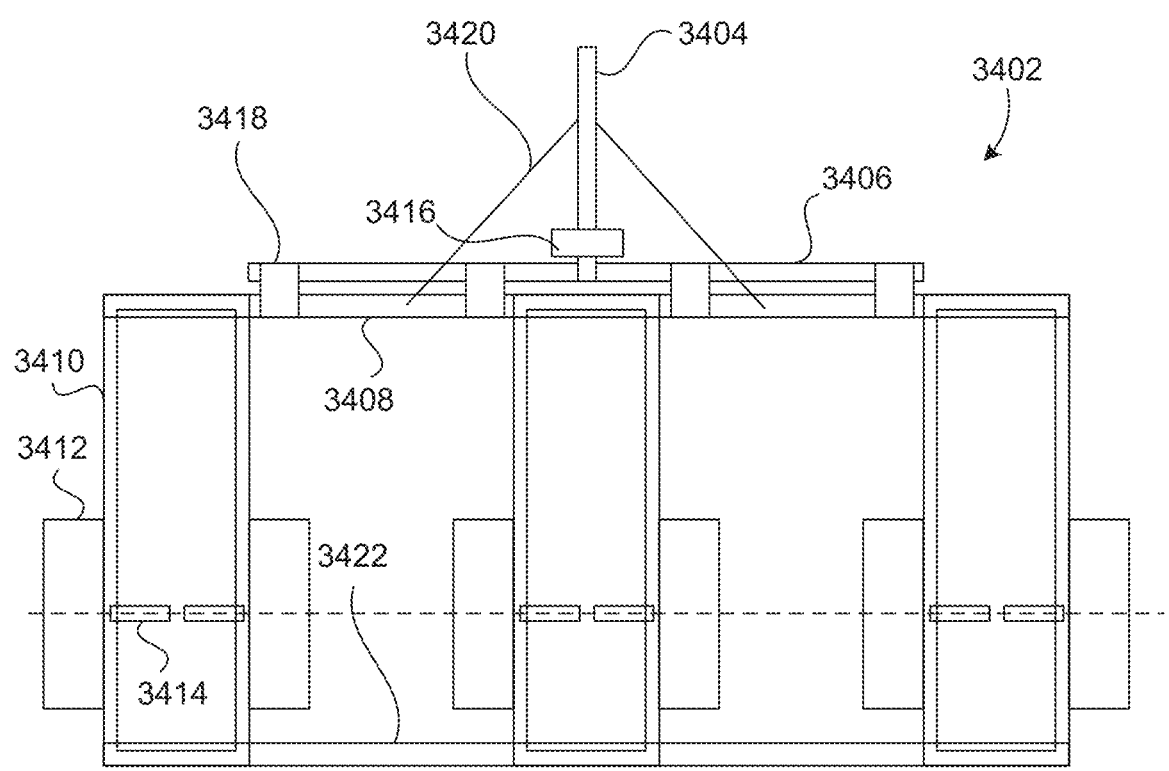

FIG. 34L shows a system 3402 that can allow for multiple channels of interrogation and could be towed safely behind a utility vehicle. The system 3402 includes a vehicle attachment 3404 (e.g., a tow hook or a corresponding ring or eye). The system 3402 includes a crossbar 3406 coupled to the vehicle attachment 3404 (for example, in a perpendicular fashion). The system 3402 includes a crossbar 3408 coupled to at least the crossbar 3406. One or more channel frames 3410 can be connected to at least the crossbar 3408. Here, three channel frames 3410 are used, but more or fewer channel frames can be used in some implementations. The channel frame 3410 can have one or more acoustic exciters 3412 mounted thereon. Here, the channel frame 3410 has two acoustic exciters 3412, but more or fewer can be used. For example, the acoustic exciter 3412 can be rotatable about a shaft 3414 (e.g., a wheel axis). Any suitable dimensions of structural components can be used. For example, the width of the channel frame 3410 is here approximately twice that of the acoustic exciter 3412. For example, the length of the channel frame 3410 is here somewhat greater than three times its width. For example, the spacing between two adjacent channel frames 3410 is here approximately four times the width of the individual acoustic exciter 3412.

A winch 3416 can be mounted on the system 3402, such as on either or both of the crossbars 3406 and 3408. The crossbars 3406 and 3408 can be coupled to each other by one or more hinges 3418. For example, this can allow the winch 3416 to actuate the acoustic exciter(s) 3412 relative to the rest of the vehicle attachment 3404 (e.g., to raise or lower the acoustic exciter(s) 3412).

One or more microphones or other sensors can be provided for each of the acoustic exciter(s) 3412. For example, one microphone per each can be provided.

The system 3402 can include one or more safety chains 3420. A bar 3422 holding all the channels rigidly together can be optional. Without such a bar 3422, the pairs of channels could float relatively independently with the different interrogated surfaces because of differences in camber that might exist on a bridge deck and thereby provide more consistent contact by some elements if an individual element lost contact with the deck due to a collision or other event.

While in some embodiments (e.g., FIGS. 33A-D and 34A-L) the rotating elements (i.e., the acoustic exciters 3304) receive their rotation passively, i.e. the tires with chains are dragged, it is possible to use an active source such as a motor to rotate the elements, in which case they can actively acoustically excite the surface under their own power, without being towed. In addition, it may be advantageous to actively spin the wheels to tangential speeds that approximately match the towing speed before the wheels make contact with the deck surface; this approach can decrease the initial shearing that takes place as the chained tires come in contact with the deck or other tested surface.

Figure 35:
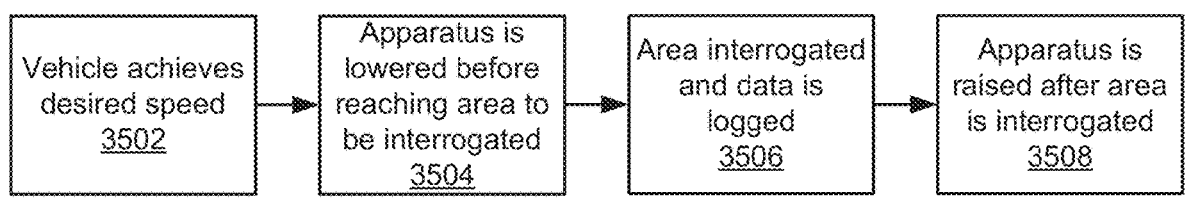
FIG. 35 shows an example of a method of operation to deploy an apparatus from a continuously moving vehicle.

FIG. 35 shows an example of a method 3500 of operation to deploy an apparatus from a continuously moving vehicle. Data in the field can be collected according to the method 3500. A bridge can be selected and appropriate permissions obtained to perform testing. The trailer described herein can then be driven to the bridge of interest. The DGPS unit can be constantly active and report data at a frequency of 10 Hz. The towing vehicle can be driven towards the bridge deck at the prescribed speed. At 3502, it can be determined whether the vehicle achieves the desired speed. At 3504, the apparatus (e.g., the trailer 3302 and/or the acoustic exciters 3304) can be lowered before the truck reaches the area to be interrogated. The trailer can be lowered while the vehicle is in motion. Then, before the vehicle reaches the bridge deck, audio data acquisition can be initiated. At 3506, the area can be interrogated, and the data can be logged. When the vehicle leaves the deck on the opposite side of the bridge, audio data acquisition can be stopped. At 3508, the apparatus (e.g., the trailer 3302 and/or the acoustic exciters 3304) can be raised after the area is interrogated. The trailer can be raised while the vehicle is still in motion. The towing vehicle can then reach a safe location at which it can be turned around and then driven over the bridge using the same protocol but in the opposite direction.

Active signaling to other drivers can be used when using some implementations. In some implementations, a rotating hazard light or a variable message board mounted on top of or behind the vehicle during testing can be used. Additional signaling is desirable when using this equipment to warn drivers of the apparatus being deployed.

All aspects of data collection may be automated, including but not limited to lowering and raising of the apparatus and starting and stopping of data collection. The automated system can perform these tasks based on the estimated position of the apparatus (in the longitudinal or transverse direction), for example, by lowering the apparatus and starting recording while approaching a bridge and then stopping recording and raising the apparatus after passing over the bridge. The apparatus may determine if a particular lane needs to be scanned or if it has already been scanned and lower or raise the apparatus accordingly. If the system is operated in this fashion, a single driver can accomplish all tasks because all of the data collection aspects can be controlled by a computer. The driver can simply make sure the vehicle is in the proper lane during travel while the apparatus automatically deploys itself.

A camera system similar to, for example, a backup camera can be used to monitor the condition of the apparatus and to make sure that adequate contact is made between all elements of the apparatus and the roadway or other structure surface. This can help ensure collection of viable data and also monitor for any conditions, such as a chain break, that may occur after normal operation is executed for a significant period of time.

Figure 37:
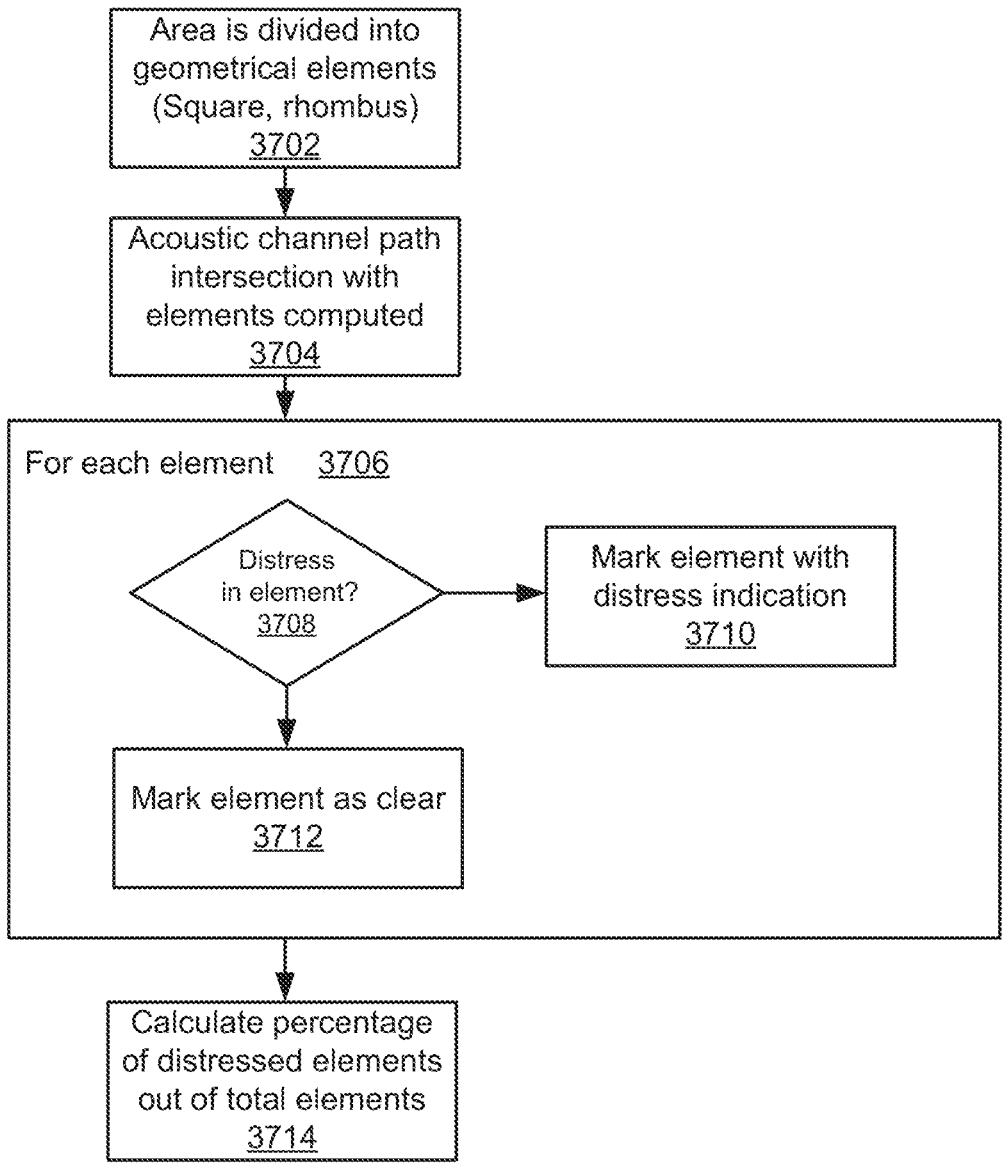
FIG. 37 shows an example schematic of a delamination percentage computation algorithm.

Once the data are obtained (for example, as described above), the following procedure can be used to then estimate percentages of delamination in a deck. Each part of the bridge deck can be divided into geometric elements (also can be, in general, parallelograms or elements that capture the curvature of the bridge or any skew), such as squares (in this case, 1 meter×1 meter). Then, if an impact that is associated with a delamination occurs within that element, the element can be marked in a darker shade. If the channel also passes through that square but no delamination occurs, then the square can be marked in a lighter shade. By computing the number of squares that are marked, estimates of the delamination percentage are possible as shown in Table 1 below, where the grid area was 1 meter×1 meter. The computation diagram is shown in FIG. 37.

TABLE 1

| Scan Area (m^2) | Delam Area (m^2) | Delam % | IE Over Area (m^2) | Delam in Overlap (m^2) | Delam % in IE Overlap | IE Total Estimate (%) |
|---|---|---|---|---|---|---|
| 288 | 16 | 5.5556 | 288 | 13 | 4.5139 | 5.3391 |
| 308 | 13 | 4.2208 | 308 | 21 | 6.8182 | 5.3391 |
| 245 | 11 | 4.4898 | 245 | 9 | 3.6735 | 5.3391 |
| 298 | 13 | 4.3624 | 298 | 21 | 7.047 | 5.3391 |
| 253 | 15 | 5.9289 | 253 | 12 | 4.7431 | 5.3391 |
| 294 | 10 | 3.4014 | 294 | 21 | 7.1429 | 5.3391 |
| 308 | 11 | 3.5714 | 308 | 15 | 4.8701 | 5.3391 |
| 307 | 11 | 3.5831 | 307 | 21 | 6.8404 | 5.3391 |
| 252 | 16 | 6.3492 | 252 | 9 | 3.5714 | 5.3391 |
| 292 | 16 | 5.4795 | 292 | 21 | 7.1918 | 5.3391 |
| 308 | 21 | 6.8182 | 308 | 12 | 3.8961 | 5.3391 |
| 245 | 10 | 4.0816 | 231 | 18 | 7.7922 | 5.3391 |
| 231 | 21 | 9.0909 | 231 | 11 | 4.7619 | 5.3391 |
| 231 | 10 | 4.329 | 231 | 18 | 7.7922 | 5.3391 |

Table 1 shows the estimates of the delaminated area from an apparatus as compared with the impact-echo apparatus. The estimates are consistent and show that an apparatus can accurately estimate delaminated area on a bridge deck.

Figure 36:
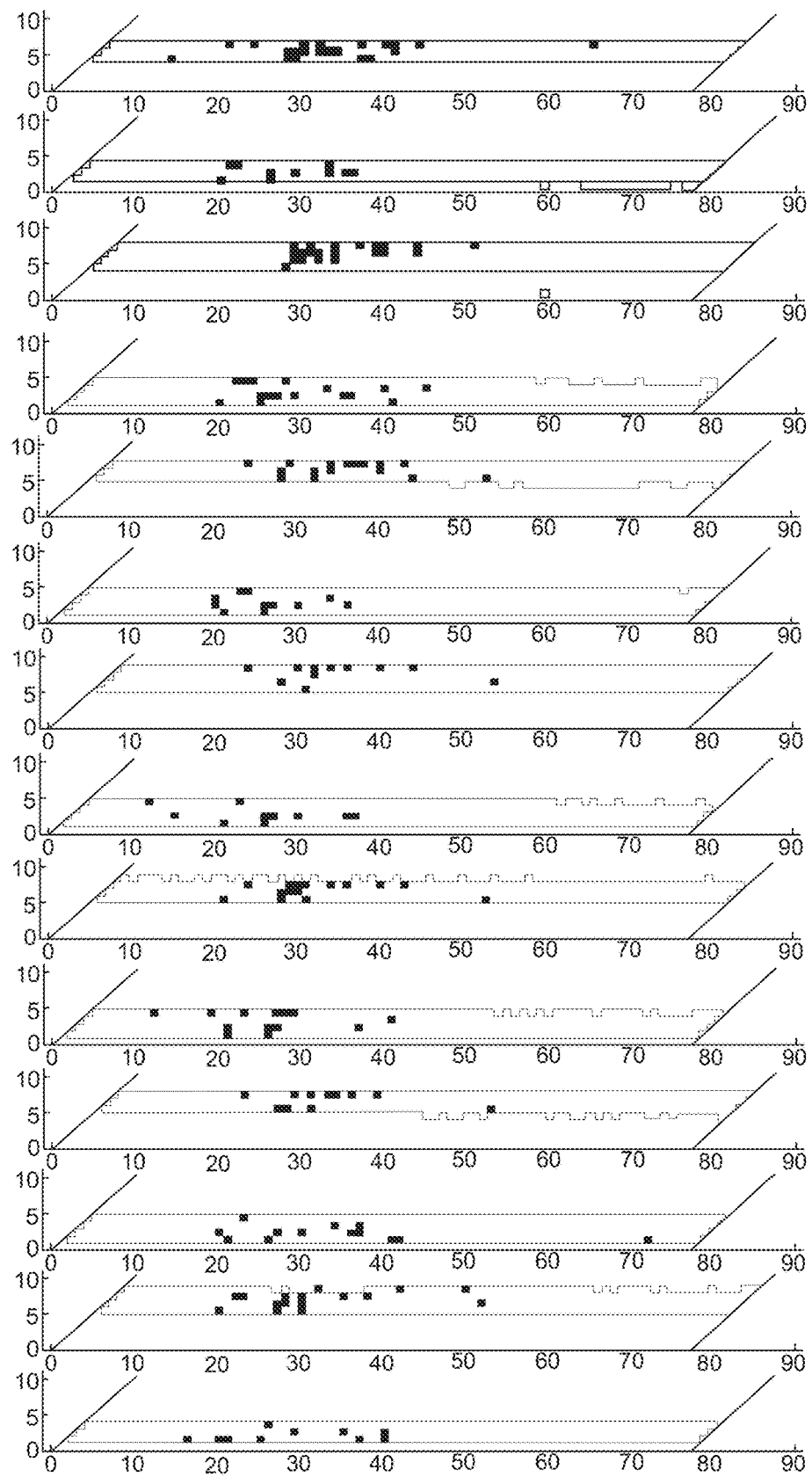
FIG. 36 shows examples of maps of delaminated areas from 14 passes of a multi-channel trailer.

FIG. 36 shows examples of maps of delaminated areas from 14 passes of a multi-channel trailer. This map can be generated using the procedure described herein, which assigns delaminations to geometrical elements (squares, rectangles, rhombuses, curves) that are used to make up the interrogated area.

FIG. 37 shows an example schematic of a delamination percentage computation algorithm 3700. At 3702, an area can be divided into geometrical elements. For example, squares and/or rhombuses can be used, to name just two examples. At 3704, an acoustic channel path intersection with the elements can be computed. At 3706, a procedure can be performed for each element. At 3708, it can be determined whether distress is detected in the element. If so, then at 3710 the element can be marked with a distress indication. If no distress in the element is detected at 3708, then at 3712 the element can be marked as clear. Following the operations 3706, a calculation of the percentage of distressed elements out of the total elements can be performed at 3714.

Figure 38:
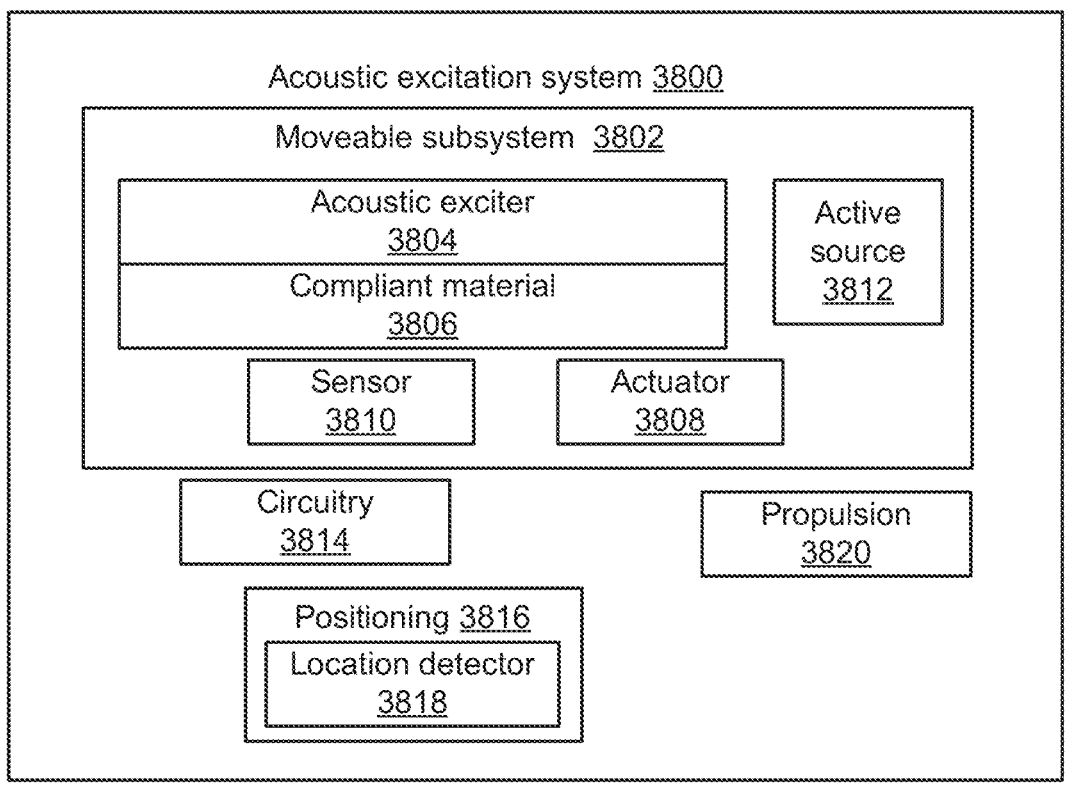
FIG. 38 shows an example of a system.

As indicated herein, multiple components can interact or otherwise cooperate with each other to perform acoustic excitation and record and analyze acoustic responses thereof. FIG. 38 shows an example of a system 3800. Here, the system 3800 is an acoustic excitation system. The system 3800 can include a movable subsystem 3802. In some implementations, the movable subsystem 3802 can include one or more acoustic exciters 3804 and one or more compliant materials 3806. The acoustic exciters 3804 can include any acoustic exciter, impactor and/or contact element described herein and can serve for triggering acoustic excitation in at least part of a material. The acoustic exciters 3804 can be attached via the compliant material 3806 to allow the acoustic exciters 3804 to acoustically excite a material and resonate from the acoustic response, but without the acoustic exciters 3804 unduly leaving the measured surface. The movable subsystem 3802 can facilitate placement of the acoustic exciters 3804 into and out of contact with the interrogated surface. An actuator 3808 can move the movable subsystem 3802. For example, a winch can raise and lower a hinged trailer. Other actuators can be used.

The following components can be part of the movable subsystem 3802 or can otherwise be a part of the system 3800. One or more sensors 3810 can be used. For example, this can include a microphone. In multi-channel implementations, several sensors 3810 can be used.

An active source 3812 can be configured to drive a wheel. The source could be a tow vehicle that pulls the acoustic testing device, or the device could have its own drive mechanism. Its own drive mechanism may be needed only temporarily to spin the wheel(s) such that the tangential speed of the perimeter of the wheel(s) approximately matches the forward travel speed of the tow vehicle or acoustic testing device before the wheel(s) comes in contact with the tested surface.

While in some implementations rotating elements receive their rotation passively, i.e. the tires with chains are dragged, it is possible to use the active source 3812 (such as a motor) to rotate the elements, in which case they can actively acoustically excite the surface under their own power, without being towed. In addition, it may be advantageous to actively spin the wheels to tangential speeds that approximately match the towing speed before the wheels make contact with the deck or other tested surface. For example, this approach can decrease the initial shearing that takes place as the chained tires come in contact with the deck.

For example, the active source 3812 can include a motor (e.g., an electric motor) that begins spinning the wheel of an acoustic exciter (e.g., the wheel that includes the tire 2502 in FIG. 25) before placing the wheel in contact with the moving roadway. This can eliminate wear on the acoustic exciter and on the measured surface.

The system 3800 can include circuitry 3814 that is configured to determine at least one characteristic of the substrate (e.g., the roadway or other material) using the acoustic response. For example, the circuitry can include a combination of software, firmware, and hardware that receives and stores signals from sensors and that processes the data to determine characteristics. For example, the circuitry 3814 can determine whether a substrate is delaminated.

The system 3800 can include a positioning system 3816. In some implementations, the positioning system 3816 includes one or more location detectors 3818. For example, positioning in the implementations described herein can include, but is not limited to, use of DGPS and LiDAR. Positioning can be achieved by many different methods including GPS, DGPS, RTK-GPS, odometry, computer vision, optics, radar, LiDAR, LEDdar, and a variety of other techniques, including computed telemetry in post-processing and simultaneous localization and mapping (SLAM) methods that can generate position data or generate maps as data are collected. These methods can be used to obtain the position information necessary to be able to generate maps either in real time or in post-processing conditions.

The positioning system 3816 can identify when the movable subsystem 3802 is at the area to be interrogated (e.g., when the vehicle is about to reach the bridge deck. The positioning system 3816 can be used for correlating acoustic responses with the structure or surface that was measured. For example, when the response data indicates a possible delamination, data from the positioning system 3816 can be used to determine where on the measured substrate or object the delamination is located. As such, the system 3800 can identify the substrate using input from the location detector 3818.

The system 3800 can include a propulsion component 3820. For example, the propulsion component 3820 can include a vehicle towing a trailer that carries or forms the movable subsystem 3802.

Figure 39A:
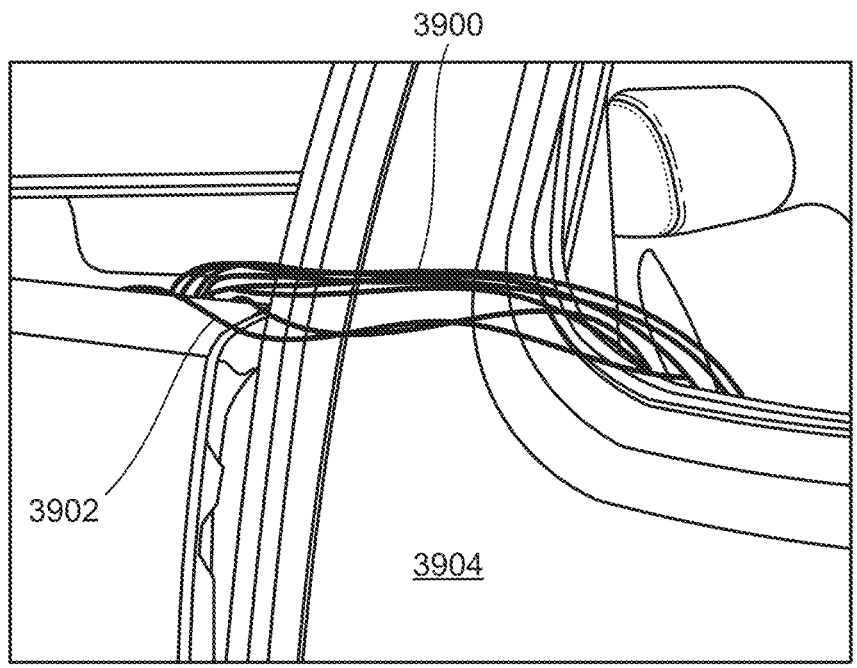
FIGS. 39A-I show examples of a system or components thereof.

FIGS. 39A-I show examples of the system 3800 or components thereof. FIG. 39A shows audio cables 3900 and a USB cable 3902 leading from a cab of a vehicle 3904 to the back of the vehicle. This bundle can connect all the microphones or other sensors to an audio interface unit in the cab of the vehicle 3904.

Figure 39B:
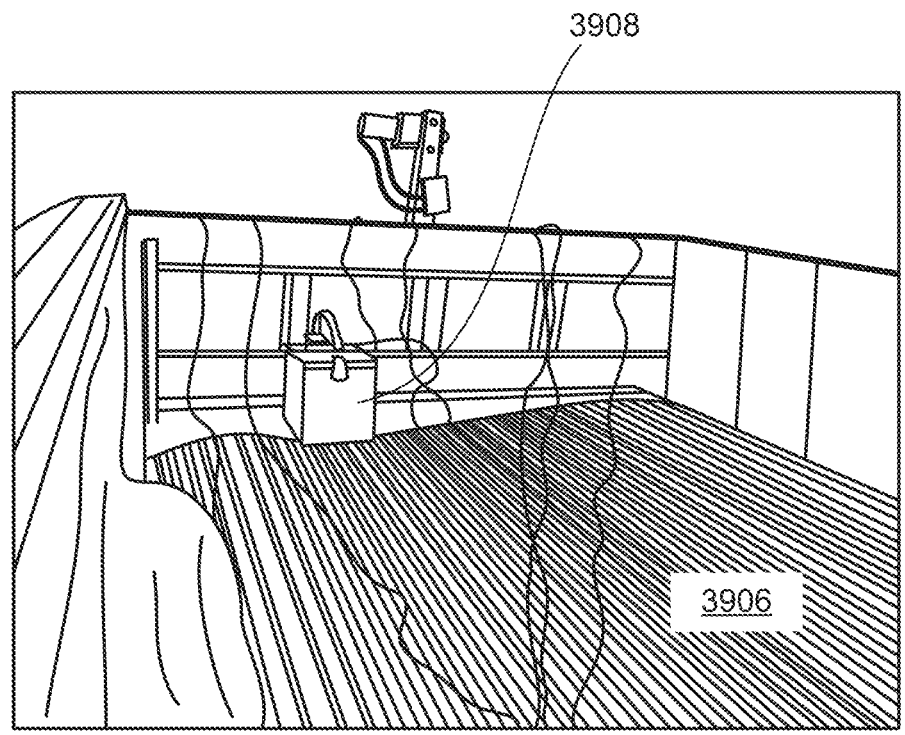

FIG. 39B shows a bed 3906 of the vehicle 3904 with a battery 3908 to power a winch or other actuator for a trailer. For example, the winch/actuator can be remotely operated wirelessly from inside the cab of the vehicle. The daisy chain of cables (e.g., USB cords) includes cables (e.g., XLR cables) leading out to microphones or other sensors.

Figure 39C:
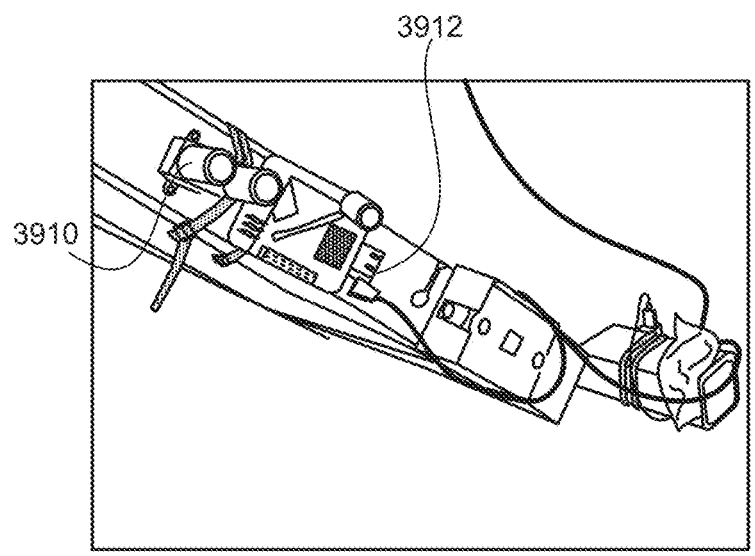

FIG. 39C shows a LiDAR unit 3910 connected to a microcontroller board 3912 for communication via a USB cord to a main computer. This unit provides lateral distance information from the parapet wall of a bridge. It can supplement the DGPS information obtained from the GPS system.

Figure 39D:
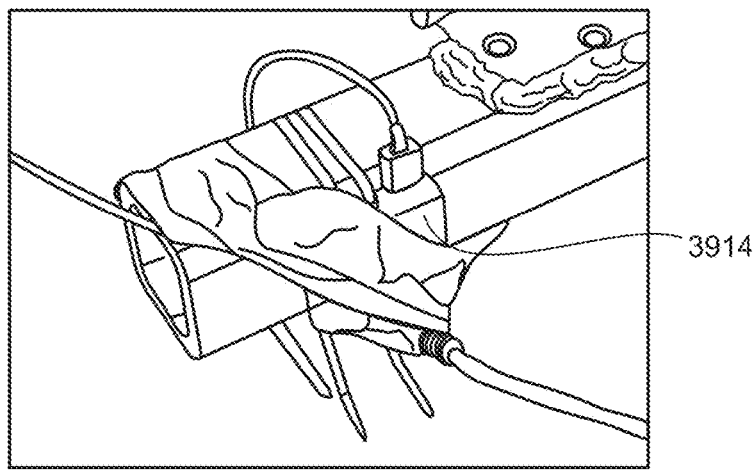

FIG. 39D shows a USB hub 3914 that provides a port with which to connect and power the microcontroller/LiDAR unit.

Figure 39E:
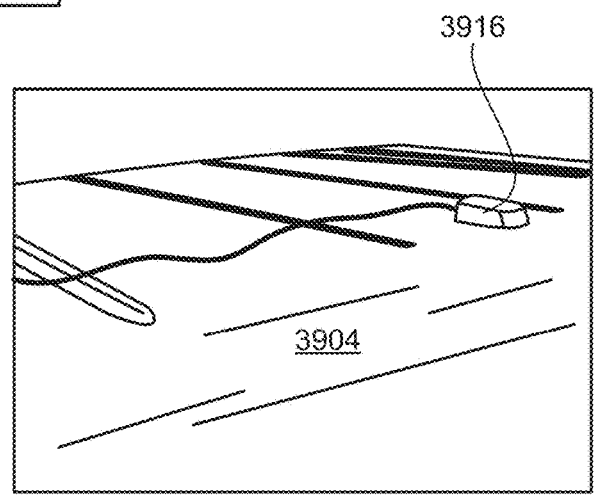

FIG. 39E shows a GPS antenna 3916 on a roof of the vehicle 3904. The distance to the trailer and relative positions of the microphones can be known for mapping tasks.

Figure 39F:
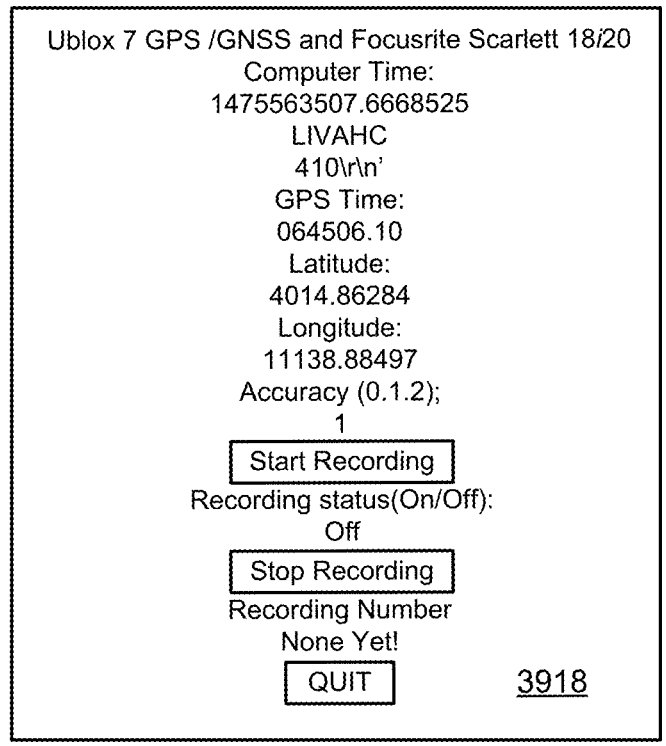

FIG. 39F shows a screenshot 3918 of a Python control interface that controls the GPS, the audio interface, and the LiDAR unit. This allows for simultaneous acquisition of all the various pieces of information (position, LiDAR, and multi-channel audio) during data acquisition. All data are synchronized to the computer time.

Figure 39G:
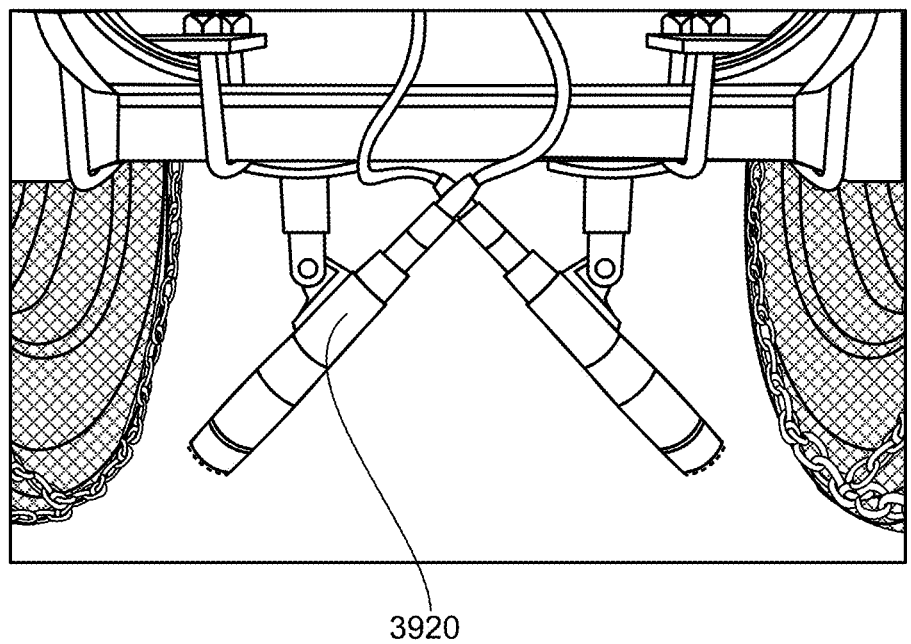

FIG. 39G shows directional microphones 3920 mounted so that they pick up the impacts of the chains from each tire. They are mounted relatively close to the floor or ground so that they pick up the impact response from the concrete that is being interrogated. Each of the channels is numbered.

Figure 39H:
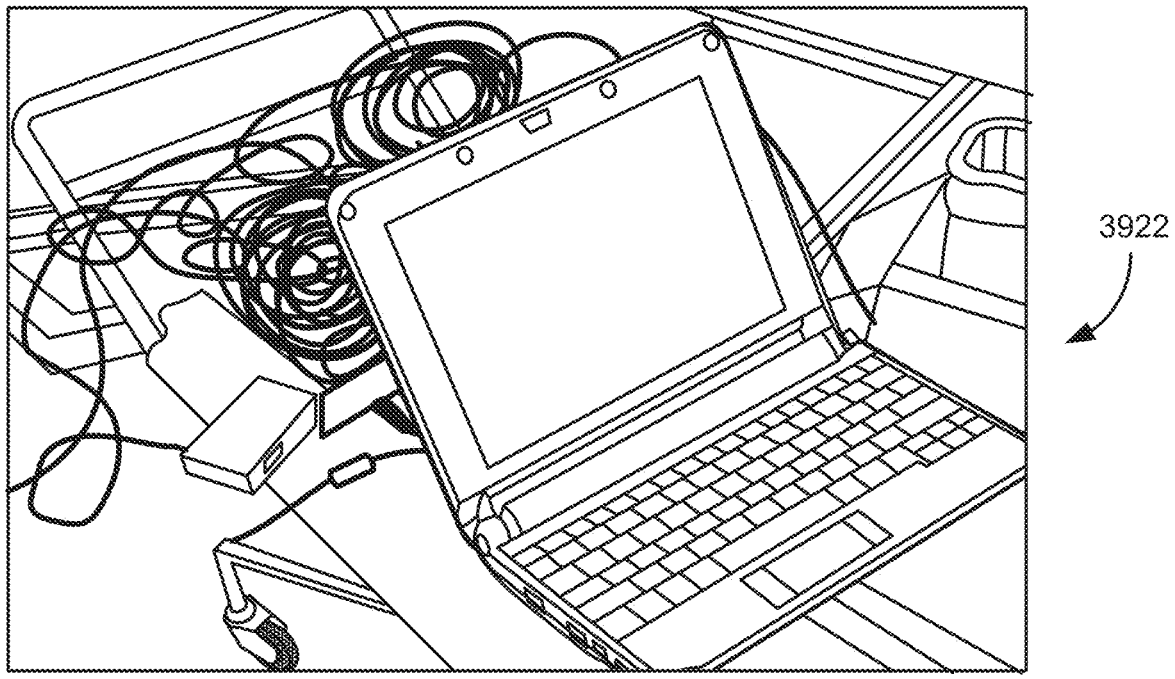

FIG. 39H shows a computer system 3922 controlling the apparatus in the laboratory. For example, the computer system 3922 can include a computer (e.g., a laptop or a PC) that executes software in accordance with one or more examples herein. The GPS unit and audio interface and LiDAR microcontroller unit are each connected via one of the three USB cables that are shown attached to the laptop system.

Figure 39I:
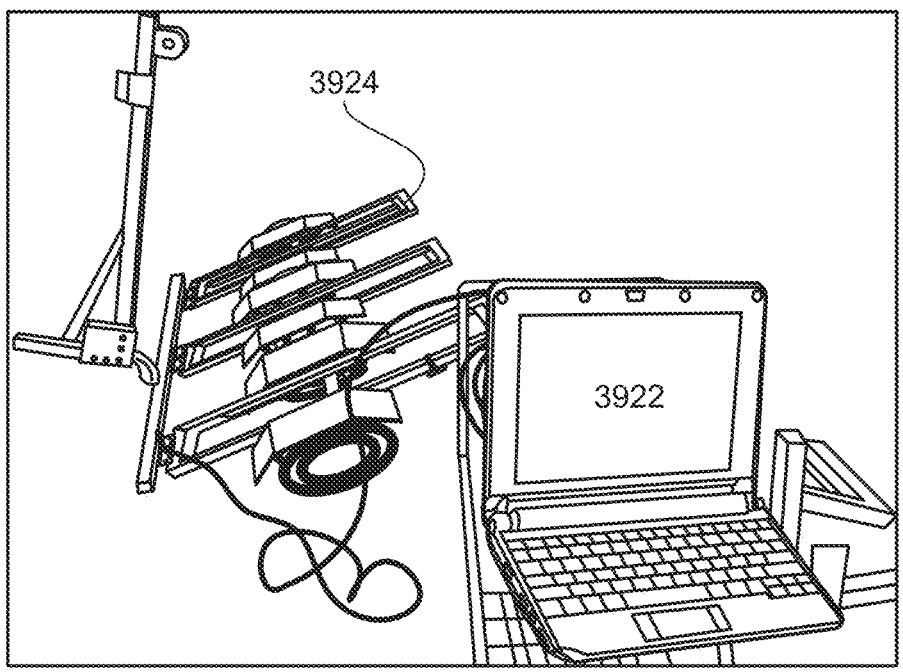

FIG. 39I shows a trailer 3924 connected to the computer system 3922. For example, the trailer 3924 can include the acoustic exciters 3804, the compliant materials 3806, and the sensors 3810 of the system 3800 in FIG. 38.

FIG. 39J shows a snapshot of a log file 3926. The log file 3926 can be used to synchronize the GPS, LiDAR, and acoustic recordings according to the computer times.

The above examples illustrate that a system can include a movable subsystem (e.g., the movable subsystem 3802) that includes at least the acoustic exciter(s) (e.g., the acoustic exciters 3804) and a compliant material (the compliant materials 3806), the movable subsystem configured to facilitate placement of the acoustic exciter(s) in and out of contact with a substrate.

The above examples illustrate that a system can include multiple acoustic exciters (e.g., the acoustic exciters 3804) and multiple sensors (e.g., the directional microphones 3920), wherein circuitry (e.g., the circuitry 3814) is configured for multi-channel registration of respective acoustic responses received by the multiple sensors.

Figure 40:
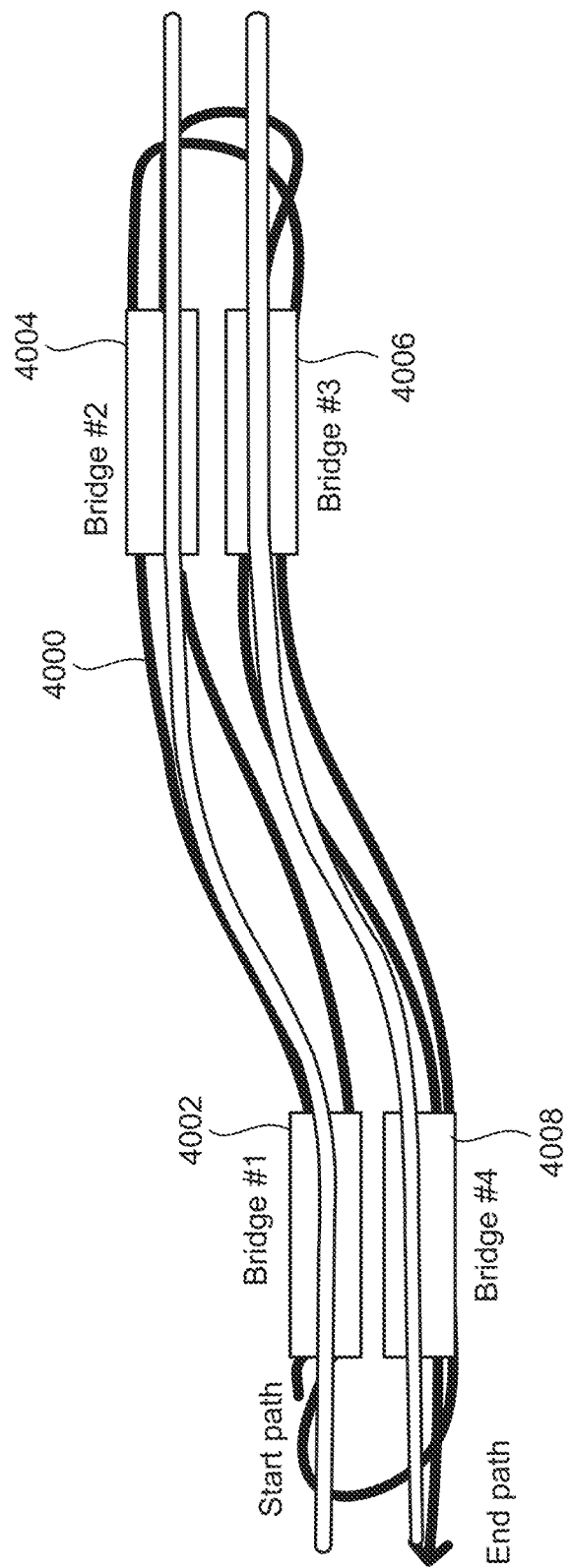
FIG. 40 shows an example of a path of a vehicle as it performs interrogation of four areas.

The following examples relate to batch processing of data from multiple interrogated areas. FIG. 40 shows an example of a path 4000 of a vehicle as it performs interrogation of four areas 4002 to 4008. For example, the areas 4002 to 4008 correspond to four bridges. Each time the vehicle passes over a bridge (one or more of the areas 4002 to 4008) it interrogates a different lane or shoulder of the bridge.

For field work, it is often desirable to traverse multiple bridges (or structural elements, such as sections in a concrete parking structure or group of parking structures) in a loop that may span multiple bridges in a single direction. It is often impractical to reverse direction on a bridge due to traffic considerations, and only a single-lane width can be interrogated at a time using the disclosed implementation. Thus, after one lane or shoulder is interrogated with all the elements, the vehicle can be turned around for possibly inspecting sister bridges and/or other structural elements on the way back before returning to inspect a different lane or shoulder of the original bridge(s). For multiple bridges or structural elements, the path 4000 should traverse the four areas 4002 to 4008 (e.g., different bridge decks) for interrogation and mapping (any number of areas could be interrogated). Thus, the path 4000 can be chosen to provide interrogation of two different lanes or shoulders on each of the areas 4002 to 4008. This path 4000 may be chosen due to the availability of turn-around locations or other traffic considerations.

Because not all of the bridge data for a single bridge deck will be acquired before moving to a second (or a third, or other) bridge, all of the data for a single bridge map may be acquired in a non-sequential fashion. Because positioning data will be acquired while all acoustic data are acquired, this data can then be associated with a particular bridge element in a post-processing algorithm.

Figure 41A:
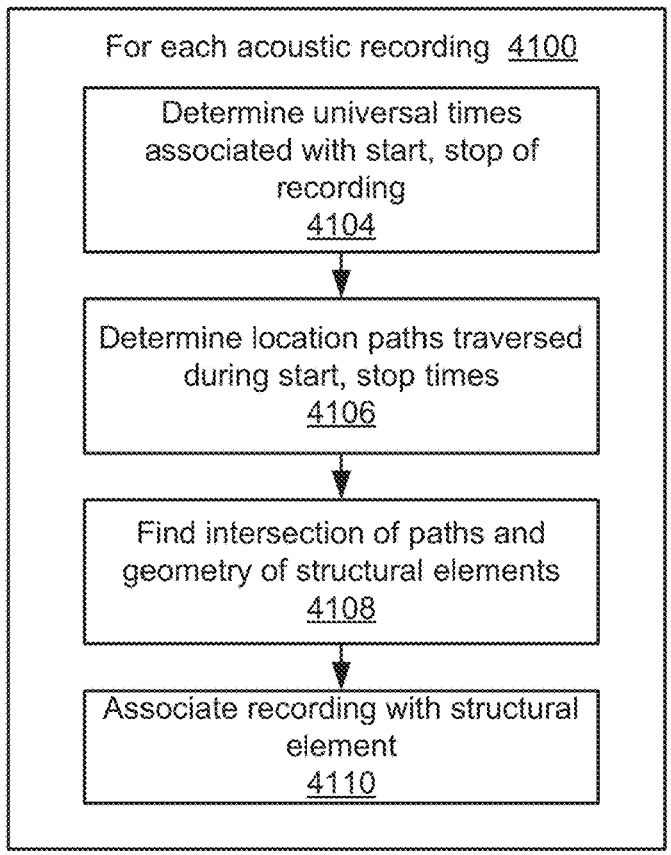
FIGS. 41A-B show examples of an algorithm that associates each acoustic recording with a structural element.
Figure 41B:
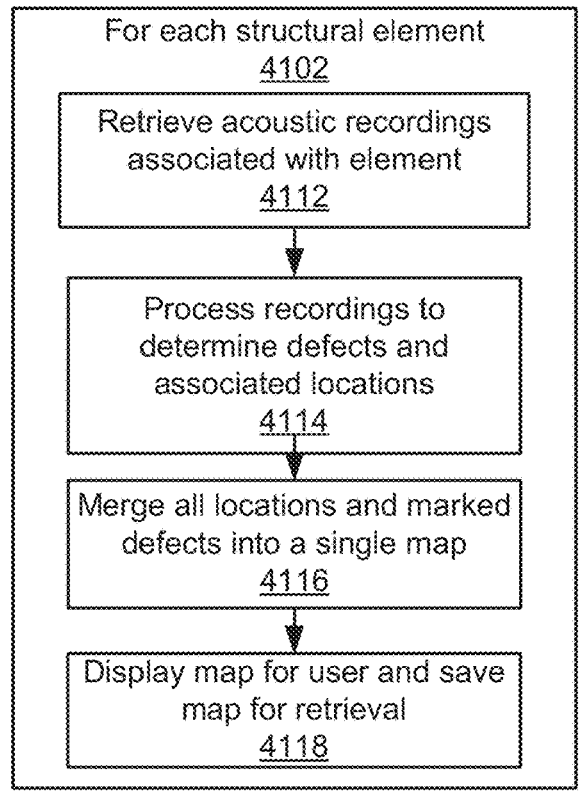

FIGS. 41A-B show examples of algorithms 4100 and 4102. The algorithms 4100 and 4102 associate each acoustic recording with a structural element. In some implementations, it is also advantageous to store the path for each recording that is then used for processing the data subsequently so that those paths do not need to be recalculated again when performing the processing. For each structural element, the associated recordings will be processed, and the data will be merged.

A list of structural elements (for example, the four corners of a rectangular element representing a bridge or other structural element, or more elements that define the curve or a bridge) is compiled. Each (one at a minimum) of the acoustic recordings acquired in the field is associated with one or more structural elements, and the algorithm 4100 can serve for this purpose. For example, if the structural element boundaries of interest are adjacent or overlapping, a single recording may span multiple elements.

In some implementations, the algorithm 4100 can include, at 4104, determining universal times associated with the start(s) and stop(s) of the recording. At 4106, there can be determined one or more location paths traversed during the start and stop time(s). At 4108, there can be found one or more intersections of paths and the geometry of structural elements. At 4110, the recording(s) can be associated with the structural element(s).

For each structural element of interest, the associated recordings are processed so that a single map with the defects is produced, and the algorithm 4102 can serve for this purpose. This procedure can allow for multiple passes over a single structural element to be processed and merged, even though the data for a single element may be acquired non-sequentially.

In some implementations, the algorithm 4102 can include, at 4112, retrieving one or more acoustic recordings associated with this element. At 4114, the recording(s) can be processed to determine defects and associated locations. At 4116, the location(s) and the marked defect(s) can be merged, for example into a single map. At 4118, the map(s) can be displayed or otherwise made available to a user, and/or the map(s) can be saved for retrieval.

This procedure and data post-processing can be implemented for scanning multiple structural elements in loops, particularly those found on interstate corridors, where multiple elements may need to be scanned and structural elements may be visited multiple times, possibly with other testing taking place between scans. The time between scans may be minutes, hours, days, months, or years.

Figure 42A:
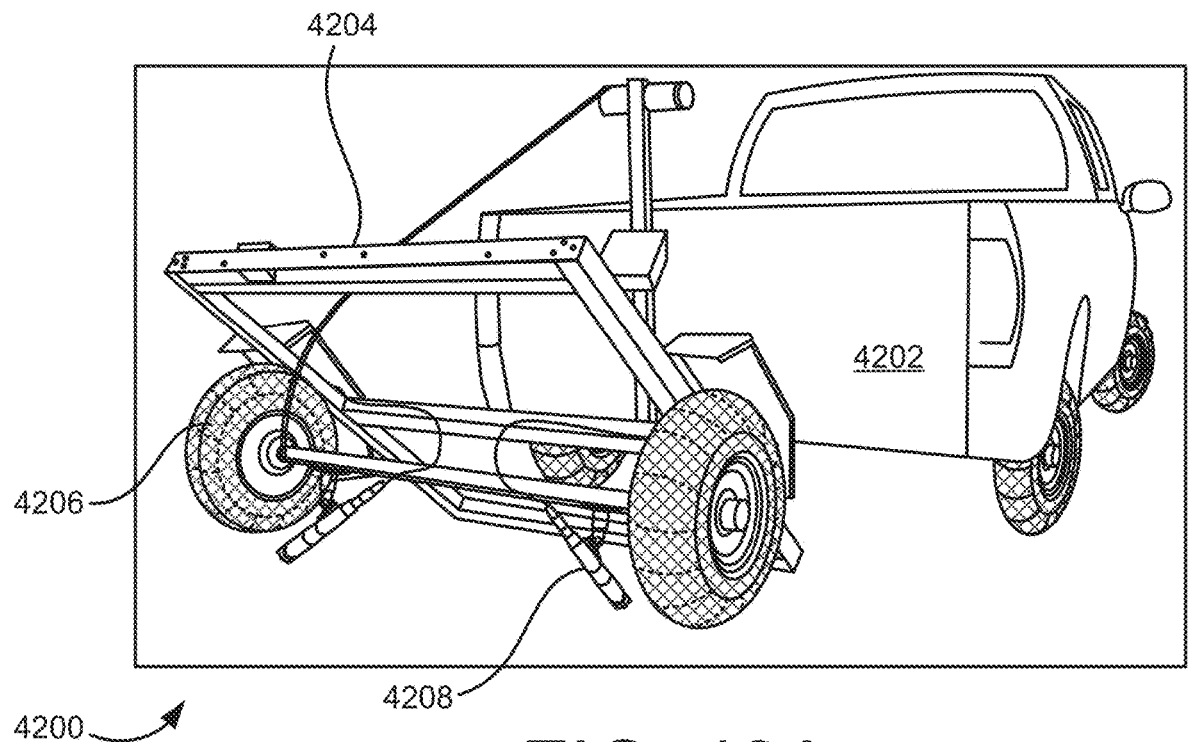
FIGS. 42A-G show examples of a two-channel apparatus.
Figure 42B:
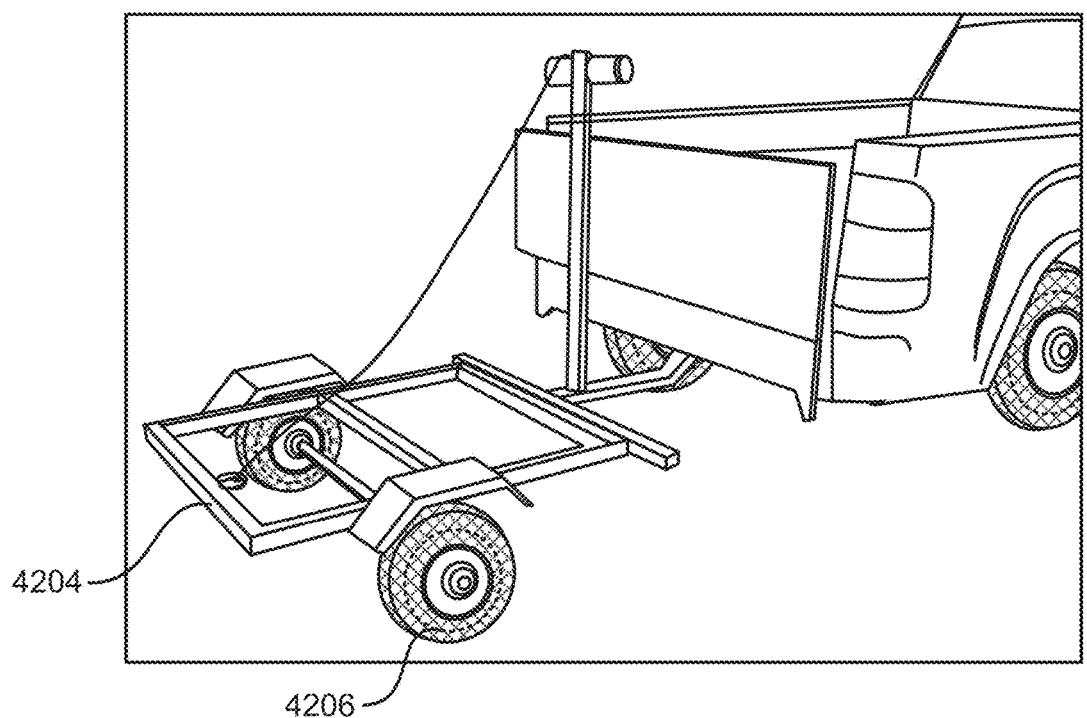
Figure 42C:
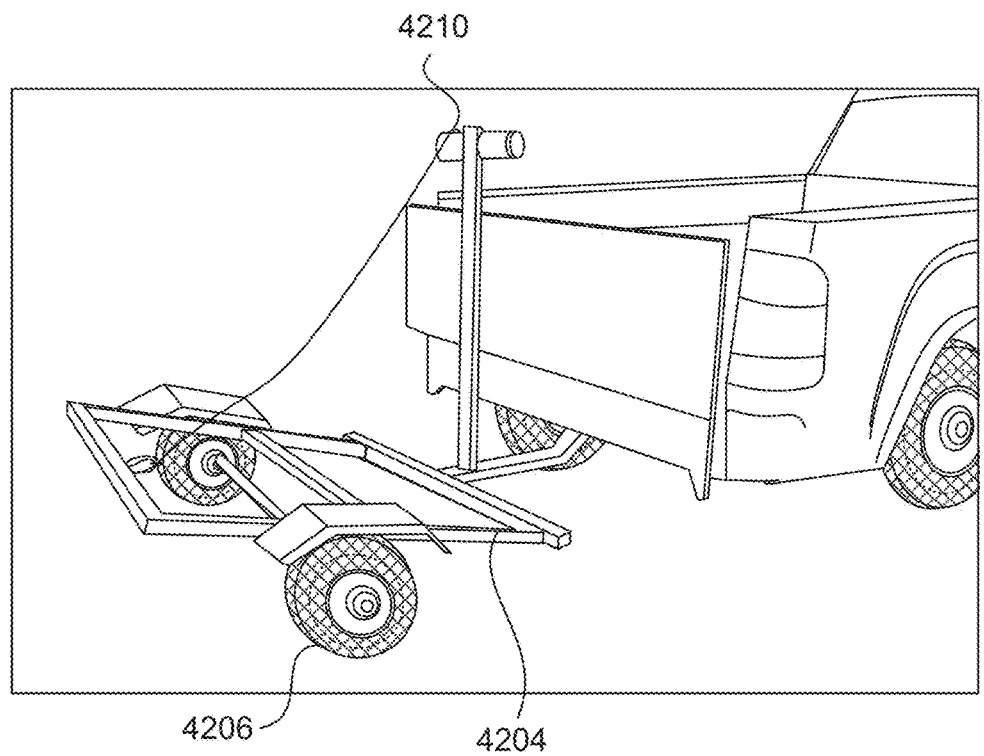
Figure 42D:
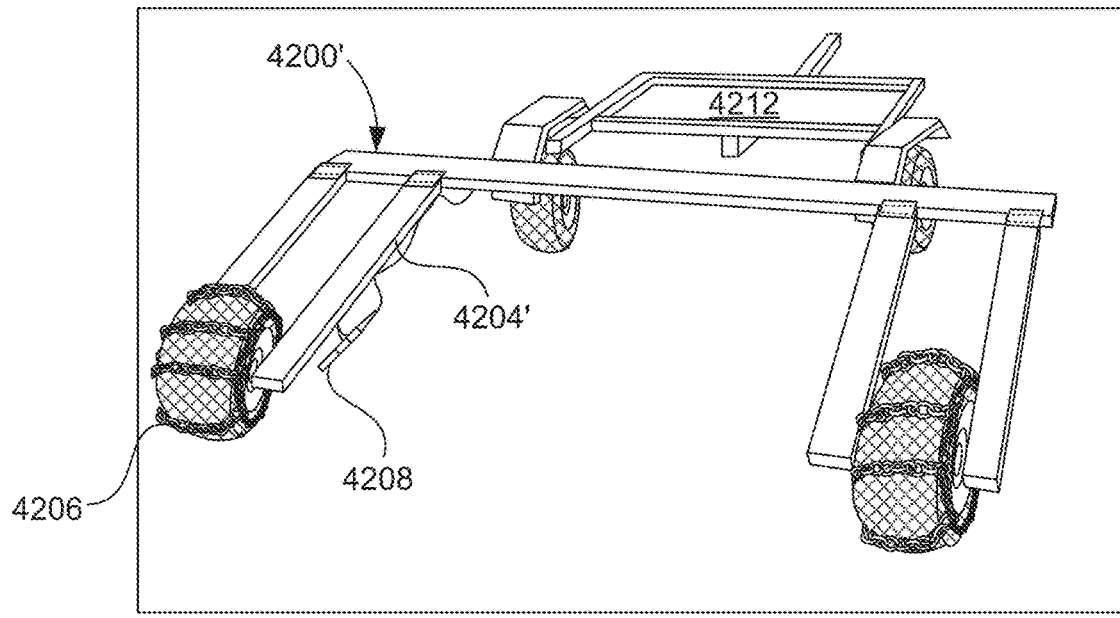

Some examples described above have involved six channels (e.g., those described with reference to FIGS. 33A-D and 34A-K). More or fewer channels can be included in a system. For example, FIGS. 42A-G show examples of a two-channel apparatus 4200. The two-channel apparatus 4200 as shown in FIGS. 42A-C includes a vehicle 4202 to which is attached a trailer 4204. On the trailer 4204 are mounted two acoustic exciters 4206. In some implementations, each of the acoustic exciters 4206 includes one or more contact elements as described herein, such as an impactor. For example, each of the acoustic exciters 4206 can include a wheel (e.g., a pneumatic tire) and one or more chain links arranged on the wheel for triggering an acoustic excitation of at least part of a surface (e.g., the ground). One or more microphones 4208 or other sensor can be included in the two-channel apparatus 4200. For example, each of the acoustic exciters 4206 can have a corresponding microphone 4208. FIG. 42C shows the trailer 4204 being raised using a winch 4210.

In some implementations, the trailer 4204 is based on a readily available trailer without significant modification. For example, the trailer 4204 can have hinge to attach to a bar that could be mounted on a truck receiver hitch on the vehicle 4202. The two microphones 4208 are shown directed towards the two tires. The suspension on this trailer and its weight can significantly reduce the bouncing of the tires.

Figure 42E:
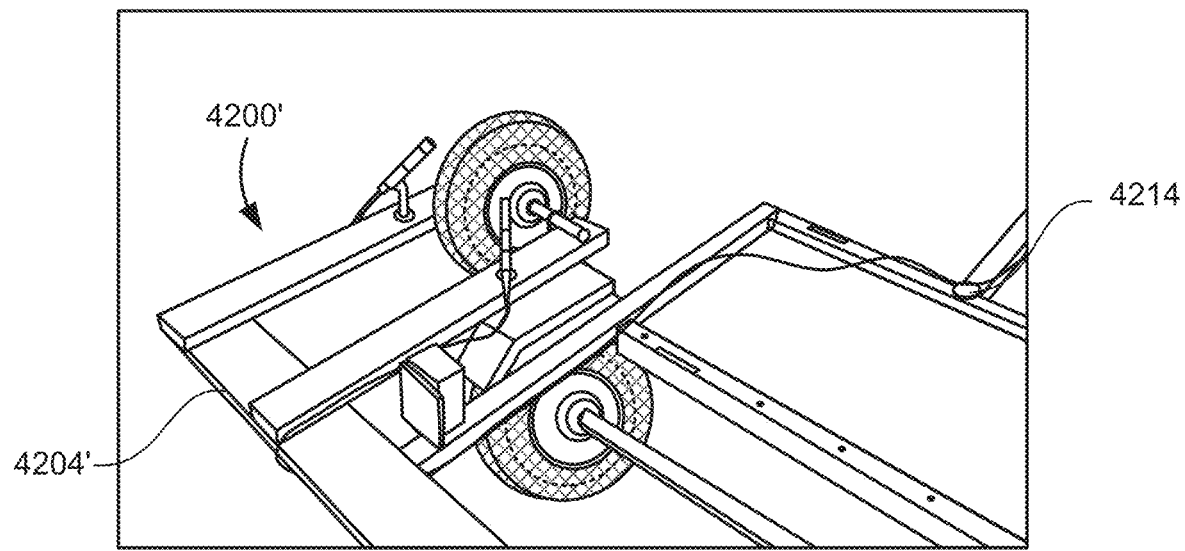
Figure 42F:
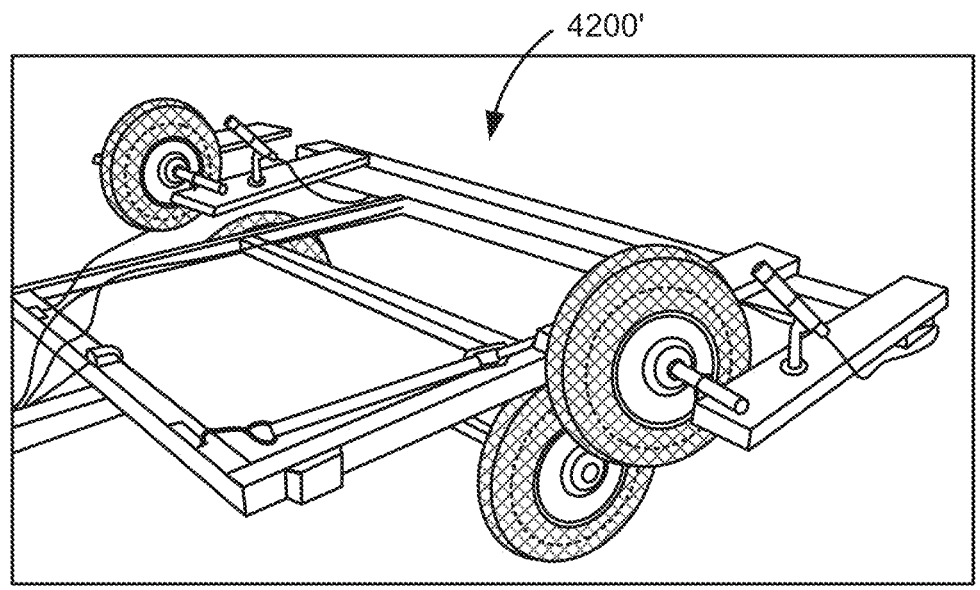
Figure 42G:
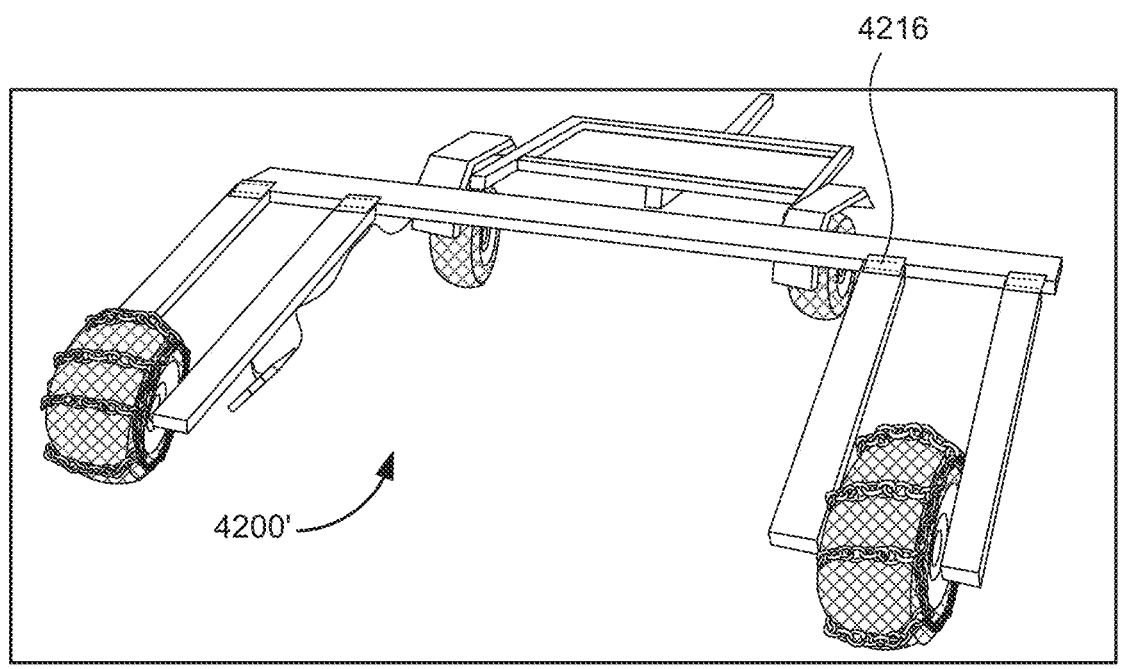

FIGS. 42D-G show a system 4200' where a trailer 4204' is instead used. The trailer 4204' can be towed by a vehicle, including, but not limited to, a trailer 4212. The trailer 4204' is here shown in a deployed configuration. The trailer 4204' can have one or more (here, two) of the acoustic exciters 4206 and one or more (here, two) of the microphones 4208 for each of the acoustic exciters 4206. That is, this example has four of the microphones 4208 for two of the acoustic exciters 4206. FIG. 42E shows the trailer 4204' in a folded (e.g., stowed) configuration. A GPS receiver 4214 can be part of the system 4200' and/or of the two-channel apparatus 4200. FIG. 42F shows the system 4200' in stowed, traveling configuration. In some implementations, the system 4200' can be used to generate preliminary data about the effectiveness of techniques described herein. As shown, an operator may leave the safety of the vehicle to deploy the apparatus. A winch system can be used to raise and lower apparatus. FIG. 42G shows that the system 4200' can have one or more hinges 4216.

Figure 43A:
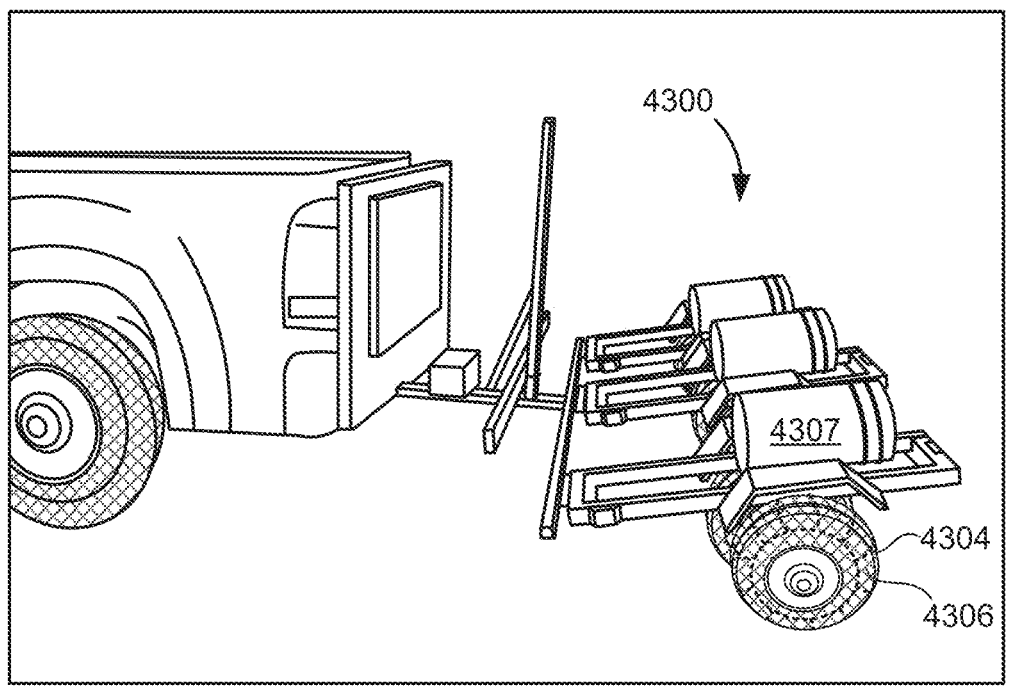
FIGS. 43A-B shows examples of a system with circumferential bands of acoustic exciters.
Figure 43B:
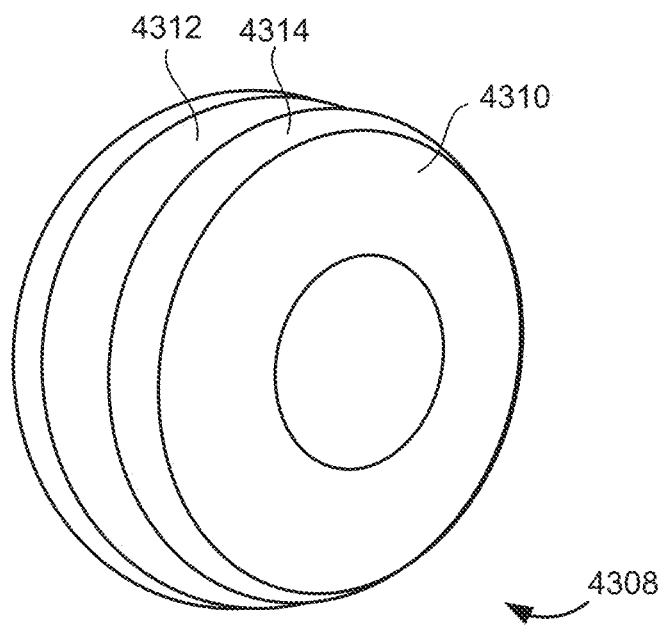

FIGS. 43A-B show examples of a system with circumferential bands of acoustic exciters. FIG. 43A shows a trailer 4300 with acoustic exciters 4302. The acoustic exciters 4302 can serve for triggering acoustic excitation of at least part of a surface (e.g., the ground). The trailer 4300 here has six of the acoustic exciters 4302, each including a wheel with impactors (e.g., chain links) applied to a tire thereof. Other numbers of acoustic exciters 4302 can be used.

The trailer 4300 can include one or more dampers 4307. In some implementations, the damper(s) 4307 can damp vertical movement of the trailer 4300, for example in traversing a bump in the road. The damper(s) 4307 can include any component of sufficient mass and rigidity to provide the damping that is suitable for a particular implementation. The trailer 4300 here includes three of the dampers 4307, each centered above a respective pair of the acoustic exciters 4302. For example, the damper(s) 4307 can include a container (e.g., a bucket) holding an amount of a high-density material, such as, but not limited to, sand and/or gravel.

Different sizes of impactors or other contact elements can be used. Small chains and/or small chain links may not work well in all situations. For example, they may not produce sufficiently low frequencies in the acoustic excitation. Larger chains (e.g., as shown here) may work well. Having acoustic exciters around the periphery of the wheel can be advantageous. For example, instead of having chain links that are perhaps 100 to 125 mm apart (e.g., as in FIG. 42G), a wheel may have an impactor or contact element at every 25 mm or closer. For example, if one is looking for defects that are deeper in the structure (e.g., 150 or 200 or 330 mm deep), one may need to input more energy to obtain the flexural vibrations in the material (e.g., concrete). However, if the investigated characteristic (e.g., a potential delamination) is at a top mat of reinforcing steel, not at a lower mat or the bottom mat, the investigation at about 75 to 100 mm can be adequate. The depth of investigation and/or the efficiency of the acoustic excitation can depend on the stiffness or modulus of the layer or substrate.

Here, circumferential bands 4304 are mounted around the periphery of the wheels of the acoustic exciters 4302. Cross ties 4306 are coupled to the circumferential bands 4304. For example, the cross ties 4306 are tied across the peripheral surface of the wheel, and the circumferential bands 4304 are then run around the entire periphery of the wheel and are coupled to (e.g., by metal wire) to the cross ties 4306. In some implementations, zero circumferential bands, one circumferential band, and more than two circumferential bands could be used.

FIG. 43B schematically shows an acoustic exciter 4308 that includes a wheel 4310 having a peripheral surface 4312. The acoustic exciter 4308 has an impactor 4314 positioned on the peripheral surface 4312. For example, the impactor 4314 can include any of the contact elements described herein. The acoustic exciter 4308 can have one or more of the impactors 4314. For example, one of the impactors 4314 can be positioned adjacent respective edges of the peripheral surface 4312.

The above examples illustrate that a system can have an acoustic exciter (e.g., the circumferential bands 4304 and/or the impactor 4314) that forms a circumferential band on the perimeter of the wheel (e.g., the wheel 4310). The above examples illustrate that a system can have cross ties (e.g., the cross ties 4306) to which the circumferential band is coupled. The above examples illustrate that a system can have a wheel (e.g., the wheel 4310 that includes a peripheral surface (e.g., the peripheral surface 4312) that has an approximately circular cross section, and that a circumferential band (e.g., the circumferential band(s) 4304) is positioned around the peripheral surface. The above examples illustrate that a system can include cross ties (e.g., the cross ties 4306) traversing the peripheral surface, the acoustic exciters (e.g., the circumferential band(s) 4304) coupled to the cross ties.

The above examples illustrate that an apparatus can include a wheel (e.g., the wheel 4310) including a compliant material (e.g., the tire of the wheel), and one or more circumferential bands (e.g., the circumferential bands 4304 and/or the impactor 4314) of acoustic exciters positioned around a periphery of the wheel. The compliant material can configure the acoustic exciters for triggering acoustic excitation of at least part of a substrate. The above examples illustrate that an apparatus can have at least two circumferential bands of the acoustic exciters (e.g., the circumferential bands 4304 and/or the impactor 4314) positioned adjacent respective edges of the peripheral surface 4312.

Figure 44:
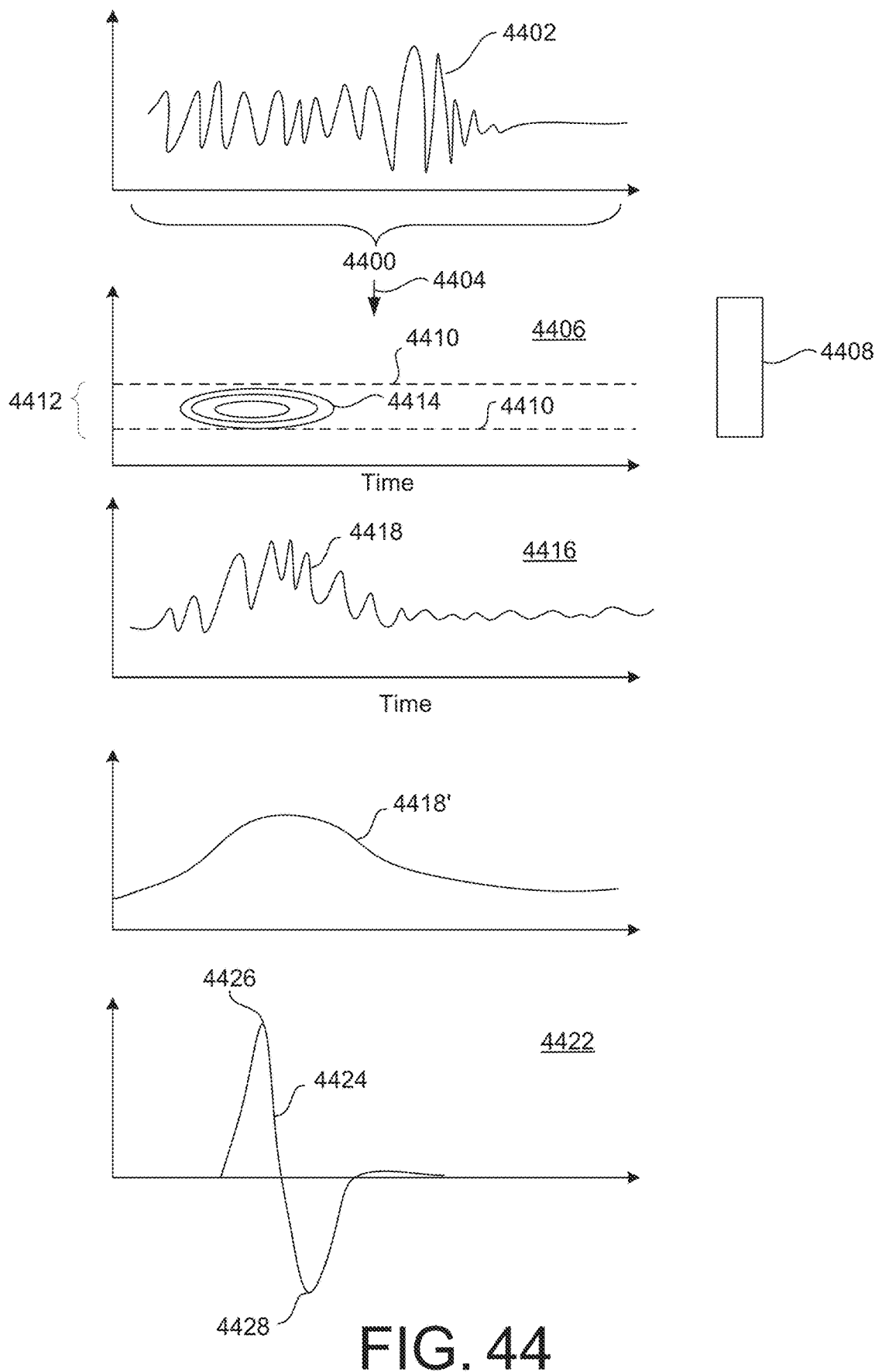
FIG. 44 shows an example of data processing.

FIG. 44 shows an example of data processing. A waveform 4400 includes raw data 4402. For example, the raw data 4402 can be collected using one or microphones and comprises an acoustic response of an acoustic excitation triggered by one or more impactors or other contact elements attached via a compliant material. Here, the raw data 4402 is a time-domain waveform. As indicated by an arrow 4404, the waveform 4400 can be used in generating a spectrogram 4406. For example, a Fast Fourier transform can be performed. The spectrogram 4406 represents data using frequency on a vertical axis and time on a horizontal axis. Intensity can be indicated using another parameter (including, but not limited to, color) as indicated by a legend 4408. Dashed lines 4410 here serve to define a frequency band 4412 that represents the band of energy that will be sampled in time. Here, frequency components 4414 in the spectrogram 4406 represent aspects of the raw data 4402 that lie within the frequency band 4412.

The energy of the frequency band—here, the frequency components 4414—is then plotted in an energy plot 4416. For example, the energy plot 4416 represents energy on the vertical axis and time on the horizontal axis. The energy plot 4416 includes an energy graph 4418 that has a jagged appearance in this example. For example, the energy graph 4418 includes relatively much noise.

Some or all the noise can be removed. In some implementations, a low-pass filter can be applied to the energy graph 4418. This can generate an energy graph 4418' as shown in an energy plot 4420. That is, the low-pass filter can be applied to facilitate observation of the energy associated with the particular frequency band 4412.

A derivative of the energy graph 4418' can be determined. For example, a graph 4422 represents the derivative of the energy graph 4418' and includes a derivative graph 4424. The derivative can be scaled to the intensity. For example, the derivative can be normalized. Abrupt changes in band energy can indicate a particular physical characteristic of an interrogated substrate. For example, local or global extremities 4426 and/or 4428 can indicate that a delamination was encountered at the corresponding time of that acoustic recording. Accordingly, the processing that results in the identification of the local or global extremities 4426 and/or 4428 can be performed to, in a sense, look for abrupt changes in the sound of the acoustic response generated by the interrogated material. The determined characteristic(s) can then be used as a basis for flagging the interrogated structure, such as the particular identified portion thereof.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium) for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special-purpose logic circuitry (e.g., an FPGA (field programmable gate array) or an ASIC (application-specific integrated circuit)).

Processors suitable for the processing of a computer program include, by way of example, both general and special-purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices; magnetic disks (e.g., internal hard disks or removable disks); magneto-optical disks; and CD-ROM and DVD-ROM disks. The processor and the memory may be supplemented by, or incorporated in special-purpose logic circuitry.

To provide for interaction with a user, implementations may be implemented on a computer having a display device (e.g., a cathode ray tube (CRT), a light emitting diode (LED), or liquid crystal display (LCD) device) for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback (e.g., visual feedback, auditory feedback, or tactile feedback), and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation), or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

It will also be understood that when an element, such as a layer, a region, or a substrate, is referred to as being on, connected to, electrically connected to, coupled to, or electrically coupled to another element, it may be directly on, connected to, or coupled to the other element, or one or more intervening elements may be present. In contrast, when an element is referred to as being directly on, directly connected to, or directly coupled to another element or layer, there are no intervening elements or layers present. Although the terms directly on, directly connected to, or directly coupled to may not be used throughout the detailed description, elements that are shown as being directly on, directly connected, or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes, and equivalents will now occur to those skilled in the art. It is, therefore, to be understood that claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A system comprising:
   an acoustic exciter configured for triggering acoustic excitation of at least part of a substrate, the acoustic exciter including a circumferential band around a rotating element;
   a sensor configured to receive an acoustic response of the acoustic excitation;
   circuitry configured to determine at least one characteristic of the substrate using the acoustic response,
      the system being configured to be attached to a vehicle for traversing the substrate with the acoustic exciter,
      the acoustic exciter being included in a plurality of acoustic exciters; and
   cross ties to which the circumferential band is coupled.

2. The system of claim 1, further comprising an active source configured to drive the rotating element.

3. The system of claim 1, further comprising a movable subsystem that includes at least the acoustic exciter, the movable subsystem configured to facilitate placement of the acoustic exciter in and out of contact with the substrate.

4. The system of claim 1, wherein the acoustic exciter is included in a plurality of acoustic exciters, the circuitry is configured for multi-channel registration of respective acoustic responses received by a plurality of sensors.

5. The system of claim 1, further comprising a location detector, wherein the circuitry is further configured to identify the substrate using input from the location detector.

6. The system of claim 1, wherein the sensor includes a microphone.

7. The system of claim 1, wherein the system is configured to traverse the substrate with the acoustic exciter when coupled to a vehicle.

8. A system comprising:
   an acoustic exciter configured for triggering acoustic excitation of at least part of a substrate, the acoustic exciter including a circumferential band around a rotating element;
   a sensor configured to receive an acoustic response of the acoustic excitation; and
   circuitry configured to determine at least one characteristic of the substrate using the acoustic response,
      the system being configured to be attached to a vehicle for traversing the substrate with the acoustic exciter,
      the acoustic exciter including a contact element configured for triggering the acoustic excitation, the contact element being coupled to the circumferential band and extending from at least one side of the rotating element.

9. The system of claim 8, wherein the contact element is included in a plurality of contact elements, the plurality of contact elements are individually movable.

10. The system of claim 9, wherein at least some of the plurality of contact elements are chain links.

11. The system of claim 8, wherein the contact element is spherical.

12. The system of claim 8, further comprising a spring in contact with the contact element.

13. The system of claim 8, further comprising an adhesive material in contact with the contact element.

14. An apparatus comprising:
   at least one rotating element; and
   at least one circumferential band positioned around a periphery of the at least one rotating element;
   a plurality of acoustic exciters extending from the at least one circumferential band, the at least one rotating element configures the plurality of acoustic exciters for triggering acoustic excitation of at least part of a substrate,
      the at least one rotating element configured to be attached to a vehicle for traversing the substrate with the plurality of acoustic exciters,
      the at least one rotating element including a peripheral surface that has an approximately circular cross section, and the at least one circumferential band being positioned around the peripheral surface; and cross ties traversing the peripheral surface, the plurality of acoustic exciters being coupled to the cross ties.

15. The apparatus of claim 14, further comprising an active source configured to drive the at least one rotating element.

16. The apparatus of claim 14, wherein the at least one circumferential band is included in at least two circumferential bands positioned adjacent respective edges of the peripheral surface.

17. A system comprising:

an acoustic exciter configured for triggering acoustic excitation of at least part of a substrate, the acoustic exciter including a circumferential band around a rotating element;

a sensor configured to receive an acoustic response of the acoustic excitation; and circuitry configured to determine at least one characteristic of the substrate using the acoustic response, the system being configured to be attached to a vehicle for traversing the substrate with the acoustic exciter, the circumferential band being around a sidewall of the rotating element.

18. A system comprising:

an acoustic exciter configured for triggering acoustic excitation of at least part of a substrate, the acoustic exciter including a circumferential band and configured to extend radially from a rotating element when the rotating element is rotated;

a sensor configured to receive an acoustic response of the acoustic excitation; and circuitry configured to determine at least one characteristic of the substrate using the acoustic response, the system configured to traverse the substrate with the acoustic exciter, the circumferential band being around a sidewall of the rotating element.

\* \* \* \* \*